US012323855B2

(12) United States Patent
Wang et al.

(10) Patent No.: US 12,323,855 B2
(45) Date of Patent: Jun. 3, 2025

(54) TSC-5G QOS MAPPING WITH CONSIDERATION OF ASSISTANCE TRAFFIC INFORMATION AND PCC RULES FOR TSC TRAFFIC MAPPING AND 5G QOS FLOWS BINDING

(71) Applicant: Telefonaktiebolaget LM Ericsson (publ), Stockholm (SE)

(72) Inventors: Kun Wang, Solna (SE); Marilet De Andrade Jardim, Kista (SE); György Miklós, Pilisborosjenö (HU); Maria Belen Pancorbo Marcos, Madrid (ES); Shabnam Sultana, Montreal (CA); Kefeng Zhang, Beijing (CN)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 360 days.

(21) Appl. No.: 17/783,303

(22) PCT Filed: Jan. 7, 2021

(86) PCT No.: PCT/IB2021/050097
§ 371 (c)(1),
(2) Date: Jun. 8, 2022

(87) PCT Pub. No.: WO2021/140464
PCT Pub. Date: Jul. 15, 2021

(65) Prior Publication Data
US 2023/0019215 A1    Jan. 19, 2023

Related U.S. Application Data

(60) Provisional application No. 62/958,060, filed on Jan. 7, 2020.

(51) Int. Cl.
*H04W 28/08* (2023.01)
*H04M 15/00* (2006.01)
*H04W 28/02* (2009.01)

(52) U.S. Cl.
CPC ....... *H04W 28/0908* (2020.05); *H04M 15/66* (2013.01); *H04W 28/0268* (2013.01)

(58) Field of Classification Search
CPC ......... H04W 28/0908; H04W 28/0268; H04M 15/66
See application file for complete search history.

(56) References Cited

U.S. PATENT DOCUMENTS

2020/0267785 A1 * 8/2020 Talebi Fard ........ H04W 40/248
2021/0337404 A1 * 10/2021 Sun ................... H04W 28/0925

OTHER PUBLICATIONS

Author Unknown, "Technical Specification Group Services and System Aspects; System Architecture for the 5G System; Stage 2 (Release 15)," Technical Specification 23.501, Version 1.0.0, Jun. 2017, 3GPP Organizational Partners, 146 pages.

(Continued)

*Primary Examiner* — Kevin M Cunningham
(74) *Attorney, Agent, or Firm* — Sage Patent Group

(57) ABSTRACT

Systems and methods are disclosed herein that relate to Time Sensitive Communication (TSC) to Fifth Generation (5G) Quality of Service (QoS) mapping and associated QoS binding. In one embodiment, a method for QoS mapping in a 5G System (5GS) for a virtual Time Sensitive Networking (TSN) bridge comprises, at a first network function, obtaining information from a TSN Application Function (AF) comprising baseline TSC QoS parameters and one or more additional parameters comprising either or both of: (a) one or more additional TSC QoS attributes and (b) one or more additional traffic attributes. The method further comprises, at the first network function, generating one or more Policy and Charging Control (PCC) rules based on the obtained infor- (Continued)

mation and providing the one or more PCC rules to a second network function. The method further comprises, at the second network function, performing QoS binding based on the one or more PCC rules.

18 Claims, 30 Drawing Sheets

(56) References Cited

OTHER PUBLICATIONS

Author Unknown, "Technical Specification Group Services and System Aspects; System Architecture for the 5G System (5GS); Stage 2 (Release 16)," Technical Specification 23.501, Version 16.2.0, Sep. 2019, 3GPP Organizational Partners, 396 pages.
Author Unknown, "Technical Specification Group Services and System Aspects; System architecture for the 5G System (5GS); Stage 2 (Release 16)," Technical Specification 23.501, Version 16.3.0, Dec. 2019, 3GPP Organizational Partners, 417 pages.
Author Unknown, "Technical Specification Group Services and System Aspects; Procedures for the 5G System (5GS); Stage 2 (Release 16)," Technical Specification 23.502, Version 16.2.0, Sep. 2019, 3GPP Organizational Partners, 528 pages.
Author Unknown, "Technical Specification Group Services and System Aspects; Policy and Charging Control Framework for the 5G System (5GS); Stage 2 (Release 16)," Technical Specification 23.503, Version 16.2.0, Sep. 2019, 3GPP Organizational Partners, 107 pages.
Author Unknown, "Technical Specification Group Services and System Aspects; Policy and charging control framework for the 5G System (5GS); Stage 2 (Release 16)," Technical Specification 23.503, Version 16.3.0, Dec. 2019, 3GPP Organizational Partners, 112 pages.
Author Unknown, "Technical Specification Group Services and System Aspects; Study on enhancement of 5G System (5GS) for vertical and Local Area Network (LAN) services (Release 16)," Technical Report 23.734, Version 16.2.0, Jun. 2019, 3GPP Organizational Partners, 117 pages.
Nokia, et al., "S2-1910758: TSCAI granularity," 3GPP SA WG2 Meeting #135, Oct. 14-18, 2019, Split, Croatia, 4 pages.
Ericsson, "S2-1909403: Solving EN on UL configuration issue," 3GPP SA WG2 Meeting #S2-135, Oct. 14-18, 2019, Split, Croatia, 4 pages.
Ericsson, "S2-20xxxx: Mapping TSN streams to QoS flows," 3GPP SA WG2 Meeting #S2-136AH, Jan. 13-17, 2020, Incheon, Korea, 14 pages.
Huawei, et al., "S2-1911556: Definition for TSC traffic forwarding rule," 3GPP TSG-WG SA2 Meeting #136, Nov. 18-22, 2019, Reno, Nevada, 6 pages.
International Search Report and Written Opinion for International Patent Application No. PCT/IB2021/050097, mailed Mar. 29, 2021, 24 pages.

* cited by examiner

| | NUMBER OF AVAILABLE TRAFFIC CLASSES | | | | | | | |
|---|---|---|---|---|---|---|---|---|
| | | 1 | 2 | 3 | 4 | 5 | 6 | 7 | 8 |
| PRIORITY | 0 (Default) | 0 | 0 | 0 | 0 | 0 | 1 | 1 | 1 |
| | 1 | 0 | 0 | 0 | 0 | 0 | 0 | 0 | 0 |
| | 2 | 0 | 0 | 0 | 1 | 1 | 2 | 2 | 2 |
| | 3 | 0 | 0 | 0 | 1 | 1 | 2 | 3 | 3 |
| | 4 | 0 | 1 | 1 | 2 | 2 | 3 | 4 | 4 |
| | 5 | 0 | 1 | 1 | 2 | 2 | 3 | 4 | 5 |
| | 6 | 0 | 1 | 2 | 3 | 3 | 4 | 5 | 6 |
| | 7 | 0 | 1 | 2 | 3 | 4 | 5 | 6 | 7 |

| Aggregation Group | | 5QI Num. | 5QI PDB | 5QI Packet Error Rate | 5QI Priority | 5QI MDBV |
|---|---|---|---|---|---|---|
| AG1 | | X2 | 8 ms | 10E-5 | 2 | 300 |
| AG2 | | X3 | 8 ms | 10E-6 | 1 | 300 |
| AG3 | | X3 | 8 ms | 10E-6 | 1 | 200 |
| AG0/- | | Y | 15 ms | 10E-3 | 4 | 1000 |

*FIG. 15*

| Traffic Class# | DS-TT portID | NW-TT portID | StreamID (e.g. VID + dstMAC) | Traffic Attribute Periodicity | Group Flag |
|---|---|---|---|---|---|
| TC#7 | MAC dstt1 | MAC nwtt1 | StreamID#1 | 15 ms | GF1 |
| | | | StreamID#2 | 15 ms | GF1 |
| | | | StreamID#3 | 15 ms | GF1 |
| | | | StreamID#4 | 15 ms | GF1 |
| | | | StreamID#5 | 20 ms | GF2 |
| | | | StreamID#6 | 20 ms | GF2 |

*FIG. 16*

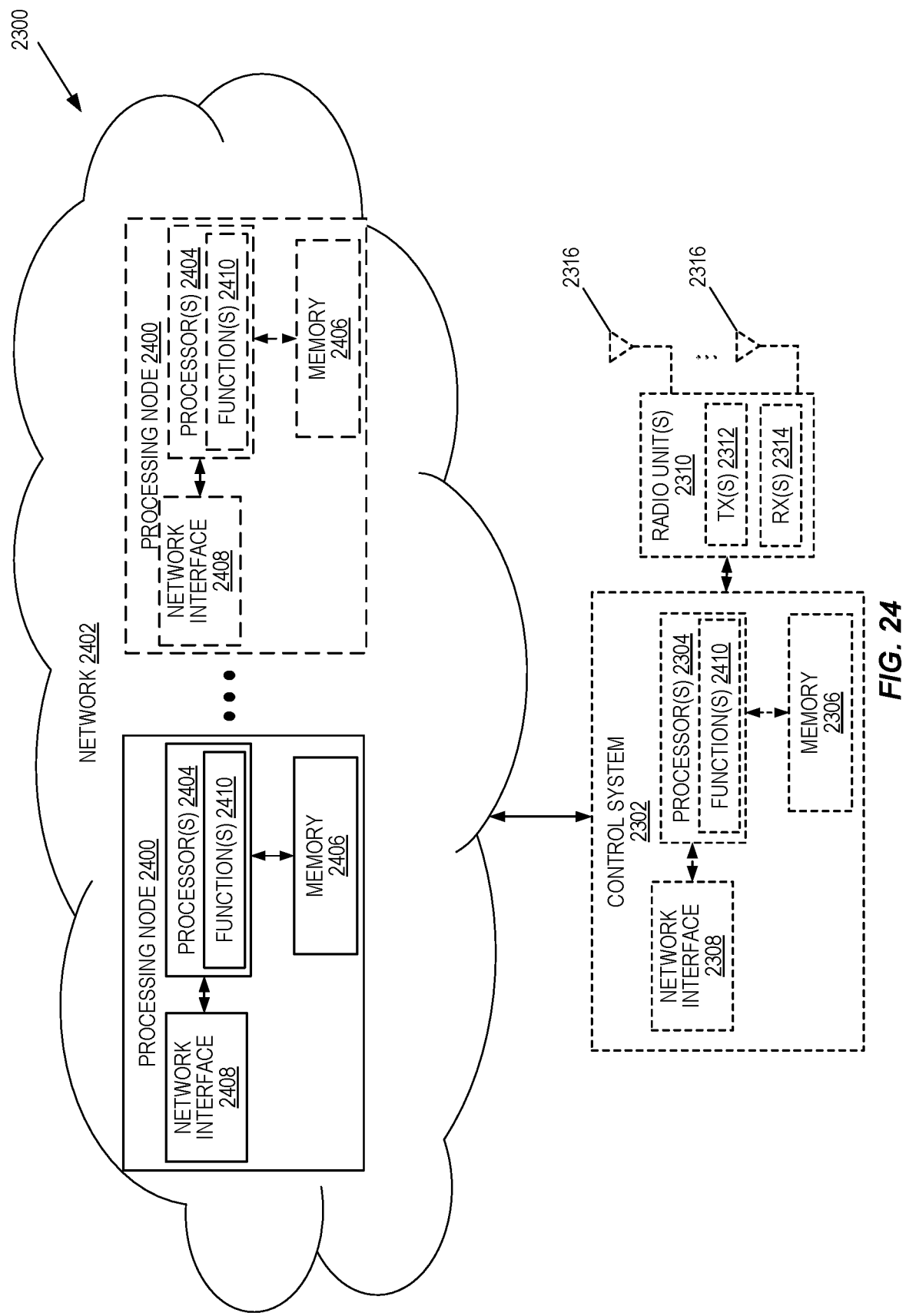

TSC-5G QOS MAPPING WITH CONSIDERATION OF ASSISTANCE TRAFFIC INFORMATION AND PCC RULES FOR TSC TRAFFIC MAPPING AND 5G QOS FLOWS BINDING

This application is a 35 U.S.C. § 371 national phase filing of International Application No. PCT/IB2021/050097, filed Jan. 7, 2021, which claims the benefit of provisional patent application Ser. No. 62/958,060, filed Jan. 7, 2020, the disclosures of which are hereby incorporated herein by reference in their entireties.

TECHNICAL FIELD

The present disclosure relates to operation of a Fifth Generation System (5GS) as a virtual Time Sensitive Networking (TSN) bridge.

BACKGROUND

For Time Sensitive Networking (TSN)—Fifth Generation (5G) integration, the Third Generation Partnership Project (3GPP) Technical Report (TR) 23.734 V16.2.0 has agreed on a model in which the 5G System (5GS) is modeled as a virtual TSN bridge or several virtual TSN bridges. 3GPP Technical Specification (TS) 23.501 V16.3.0, Clause 4.4.8 states:

The 5G System is integrated with the external network as a TSN bridge. This "logical" TSN bridge (see FIG. 4.4.8.2-1) includes TSN Translator functionality for interoperation between TSN System and 5G System both for user plane and control plane.

Clause 4.4.8 of 3GPP TS 23.501 V16.3.0 is reproduced below.

---

4.4.8 Time Sensitive Communication

---

4.4.8.1 General
The 5G System is extended to support Time sensitive communication as defined in
IEEE P802.1Qcc [95].
IEEE TSN is a set of standards to define mechanisms for the time-sensitive (i.e. deterministic)
transmission of data over Ethernet networks as in Time-Sensitive Networking (TSN) of the
IEEE P802.1Qcc [95]. Integration of 5G System with TSN networks that are based on IEEE TSN
(IEEE P802.1Qcc [95]) is supported.
In this Release of the specification, it is about integration of 5G System with IEEE TSN
(IEEE P802.1Qcc [95]).
4.4.8.2 Architecture to support Time Sensitive Communication
The 5G System is integrated with the external network as a TSN bridge. This "logical" TSN
bridge (see FIG. 4.4.8.2-1) includes TSN Translator functionality for interoperation between
TSN System and 5G System both for user plane and control plane. 5GS TSN translator
functionality consists of Device-side TSN translator (DS-TT) and Network-side TSN translator
(NW-TT). 5G System specific procedures in 5GC and RAN, wireless communication links, etc.
remain hidden from the TSN network. To achieve such transparency to the TSN network and the
5GS to appear as any other TSN Bridge, the 5GS provides TSN ingress and egress ports via DS-
TT and NW-TT. DS-TT and NW-TT optionally support:
    hold and forward functionality for the purpose of de-jittering;
    per-stream filtering and policing as defined in IEEE 802.1Q [98] clause 8.6.5.1.
DS-TT optionally supports link layer connectivity discovery and reporting as defined in IEEE
802.1AB [97] for discovery of Ethernet devices attached to DS-TT. NW-TT supports link layer
connectivity discovery and reporting as defined in IEEE 802.1AB [97] for discovery of Ethernet
devices attached to NW-TT. If a DS-TT does not support link layer connectivity discovery and
reporting, then NW-TT performs link layer connectivity discovery and reporting as defined in
IEEE 802.1AB [97] for discovery of Ethernet devices attached to DS-TT on behalf of DS-TT.
    NOTE 1: If NW-TT performs link layer connectivity discovery and reporting on behalf of
        DS-TT, it is assumed that LLDP frames are transmitted between NW-TT and UE on
        the default QoS flow. Alternatively, SMF can establish a dedicated QoS flow
        matching on the Ethertype defined for LLDP (IEEE 802.1AB [97]).
There are three TSN configuration models defined in IEEE P802.1Qcc [95]. Amongst the three
models:
    fully centralized model is supported in this release of the specification;
    fully distributed model is not supported in this release of the specification;
    hybrid model is not supported in this Release of the specification.
NOTE 2: This release only supports interworking with TSN using IEEE 802.1Qbv [96]
based QoS scheduling and IEEE 802.1Q [98] clause 8.6.5.1 based per-stream filtering and policy.
        [REPRODUCED HEREIN AS FIG. 28]
    FIG. 4.4.8.2-1: System architecture view with 5GS appearing as TSN bridge
    NOTE 3: Whether DS-TT and UE are combined or are separate is up to implementation.

When the 5GS is modeled as a virtual bridge, the 5GS needs to be modeled with certain bridge/switch functions. The bridge and port modeling of the 5GS is described at 3GPP TS 23.501 V16.3.0, Clause 5.28.1, which is reproduced below.

---

5.28.1 5GS logical TSN bridge management

---

5GS functions acts as one or more TSN Bridges of the TSN network. The 5GS Bridge is composed of the ports on a single UPF (i.e. PSA) side, the user plane tunnel between the UE and UPF, and the ports on the DS-TT side. For each 5GS Bridge of a TSN network, the ports on NW-TT support the connectivity to the TSN network, the ports on DS-TT side are associated to the PDU Session providing connectivity to the TSN network.
The granularity of the logical TSN bridge is per UPF. The bridge ID of the logical TSN bridge is bound to the UPF ID of the UPF as identified in TS 23.502 [3]. The TSN AF stores the binding relationship between a port on UE/DS-TT side, a port on UPF/NW-TT side, and a PDU Session during reporting of logical TSN bridge information.
There is only one PDU Session per DS-TT port for a given UPF. All PDU Sessions which connect to the same TSN network via a specific UPF are grouped into a single virtual bridge. The capabilities of each port on UE/DS-TT side and UPF/NW-TT side are integrated as part of the configuration of the 5G virtual bridge and are notified to TSN AF and delivered to CNC for TSN bridge registration and modification.
  NOTE 1: It is assumed that all PDU sessions which connect to the same TSN network via a
      specific UPF are handled by the same TSN AF.
      [REPRODUCED HEREIN AS FIG. 29]
      FIG. 5.28.1-1: Per UPF based virtual bridge
  NOTE 2: If a UE establishes multiple PDU Sessions terminating in different UPFs, then the
      UE is represented by multiple logical TSN bridges.
In order to support TSN traffic scheduling over 5GS Bridge, the 5GS supports the following functions:
    Report the bridge information of 5GS Bridge to TSN network.
    Map the configuration information obtained from TSN network into 5GS QoS information
    (e.g. 5QI, TSC Assistance Information) of a QoS flow in corresponding PDU Session for
    efficient time-aware scheduling, as defined at clause 5.28.2.
The bridge information of 5GS Bridge is used by the TSN network to make appropriate management configuration for the 5GS Bridge. The bridge information of 5GS Bridge includes at least the following:
    Information for 5GS Bridge:
      Bridge Address (unique MAC address that identifies the bridge used to derive the bridge
      ID);
      Bridge Name;
      Number of Ports;
      list of port numbers.
    Capabilities of 5GS Bridge as defined in 802.1Qcc [95]:
      5GS Bridge delay per port pair per traffic class, including 5GS Bridge delay (dependent
      and independent of frame size, and their maximum and minimum values:
      independentDelayMax, independentDelayMin, dependentDelayMax,
      dependentDelayMin), ingress port number, egress port number and traffic class.
      Propagation delay per port (txPropagationDelay), including transmission propagation
      delay, egress port number.
    Topology of 5GS Bridge as defined in IEEE 802.1AB [97]:
      Chassis ID subtype and Chassis ID of the 5GS Bridge.
    Traffic classes and their priorities per port as defined in IEEE 802.1Q [98].
The following parameters: independentDelayMax and independentDelayMin, how to calculate them is left to implementation and not defined in this specification.
Bridge ID of the 5GS Bridge, port numbers of the Ethernet in NW-TT could be preconfigured on the UPF. The UPF is selected for a PDU Session serving TSC based on subscribed DNN, traffic classes and VLANs. Port number of Ethernet port on the DS-TT for the PDU Session is assigned by the UPF during PDU session establishment and stored at the SMF. SMF provides the port numbers and MAC addresses of the Ethernet ports in DS-TT and NW-TT of the related PDU session to the TSN AF via PCF. If a PDU session for which SMF has reported port numbers to TSN AF is released, then SMF informs TSN AF accordingly.
The AF is responsible to receive the bridge information of 5GS Bridge from 5GS, as well as register or update this information to the TSN network.

---

For a typical TSN bridge, IEEE 802.1Q clause 8.6.6 states:

The Forwarding Process provides one or more queues for a given Bridge Port, each corresponding to a distinct traffic class. Each frame is mapped to a traffic class using the Traffic Class Table for the Port and the frame's priority. Traffic class tables may be managed.

FIG. 1 illustrates the IEEE 802.1Q mapping table between Traffic Classes (TCs) and Priority. In an Ethernet switch, every port (depending on hardware implementation) has a fixed number of queues, where each queue can be used for a TC. Every port may be provided with a mapping table between TC and priority. For example, according to FIG. 1:
  If Port 1 has eight queues, then the maximum number of TCs for Port 1 is eight and thus and there is a 1:1 mapping between Priority and Traffic classes (e.g., Priority #0 is mapped to TC #1, Priority #1 is mapped to TC #0, Priority #2 is mapped to TC #2, etc.).
  If Port 2 has five queues, then the maximum number of TCs for Port 2 is five and thus, according to FIG. 1, Priority #0 and Priority #1 are mapped to TC #0, Priority #1 and Priority #2 are mapped to TC #1, ..., Priority #6 is mapped to TC #6, and Priority #7 is mapped to TC #7.

FIG. 2 shows an example of how an ethernet bridge/switch handles an incoming ethernet frame in accordance with mapping table of FIG. 1. In this example, incoming Frame1 has a priority of "7". The ethernet port has eight queues which means it supports eight TCs and, as such, the mapping table between TC and priority guides Frame1 to Queue8. If the port has less than eight queues, the mapping table provides corresponding mapping rules.

One aspect of modeling the 5GS as a virtual TSN bridge(s) relates to how to provide the binding mechanism that associates a Service Data Flow (SDF), which is defined in a Policy and Charging Control (PCC) rule by means of an SDF template, to a Quality of Service (QoS) flow deemed to transport the SDF when modeling the 5GS as a virtual TSN bridge(s). As described in 3GPP TS 23.503 V16.3.0 clause 6.1.3.2, the binding mechanism includes three steps:
1. Session binding,
2. PCC rule authorization, and
3. QoS flow binding.

3GPP TS 23.503 V16.3.0 clause 6.1.3.2.2 states:
> Session binding is the association of the AF session information to one and only one PDU Session.

With respect to PCC rule authorization, 3GPP TS 23.503 V16.3.0 clause 6.1.3.2.3 states:
> For the authorization of a PCC rule the PCF shall consider any 5GC specific restrictions, subscription information and other information available to the PCF. Each PCC rule receives a set of QoS parameters that are supported by the specific Access Network.

With respect to QoS flow binding, 3GPP TS 23.503 V16.3.0 clause 6.1.3.2.4 states:

---

6.1.3.2.4 QoS Flow binding

QoS Flow binding is the association of a PCC rule to a QoS Flow within a PDU Session. The binding is performed using the following binding parameters:
- 5QI;
- ARP;
- QNC (if available in the PCC rule);
- Priority Level (if available in the PCC rule);
- Averaging Window (if available in the PCC rule);
- Maximum Data Burst Volume (if available in the PCC rule).

When the PCF provisions a PCC Rule, the SMF shall evaluate whether a QoS Flow with QoS parameters identical to the binding parameters exists unless the PCF requests to bind the PCC rule to the QoS Flow associated with the default QoS rule. If no such QoS Flow exists, the SMF derives the QoS parameters, using the parameters in the PCC Rule, for a new QoS Flow, binds the PCC Rule to the QoS Flow and then proceeds as described TS 23.501 [2] clause 5.7. If a QoS Flow with QoS parameters identical to the binding parameters exists, the SMF updates the QoS Flow, so that the new PCC Rule is bound to this QoS Flow.

> NOTE 1: For PCC rules containing a delay critical GBR 5QI value, the SMF can bind PCC Rules with the same binding parameters to different QoS Flows to ensure that the GFBR of the QoS Flow can be achieved with the Maximum Data Burst Volume of the QoS Flow.

The SMF shall identify the QoS Flow associated with the default QoS rule based on the fact that the PCC rule(s) bound to this QoS Flow contain:
- 5QI and ARP values that are identical to the PDU Session related information Authorized default 5QI/ARP; or
- a Bind to QoS Flow associated with the default QoS rule and apply PCC rule parameters Indication.

> NOTE 2: The Bind to QoS Flow associated with the default QoS rule and apply PCC rule parameters Indication has to be used whenever the PDU Session related information Authorized default 5QI/ARP (as described in clause 6.3.1) cannot be directly used as the QoS parameters of the QoS Flow associated with the default QoS rule, for example when a GBR 5QI is used or the 5QI priority level has to be changed.

When a QoS Flow associated with the default QoS rule exists, the PCF can request that a PCC rule is bound to this QoS Flow by including the Bind to QoS Flow associated with the default QoS rule Indication in a dynamic PCC rule. In this case, the SMF shall bind the dynamic PCC rule to the QoS Flow associated with the default QoS rule (i.e. ignoring the binding parameters) and keep the binding as long as this indication remains set. When the PCF removes the association of a PCC rule to the QoS Flow associated with the default QoS rule, a new binding may need to be created between this PCC rule and the QoS Flow as described above.

The binding created between a PCC Rule and a QoS Flow causes the downlink part of the service data flow to be directed to the associated QoS Flow at the UPF (as described in TS 23.501 [2] clause 5.7.1). In the UE, the QoS rule associated with the QoS Flow (which is generated by the SMF and explicitly signalled to the UE as described in TS 23.501 [2] clause 5.7.1) instructs the UE to direct the uplink part of the service data flow to the QoS Flow in the binding.

Whenever the authorized QoS of a PCC rule changes, the existing bindings shall be re-evaluated. The re-evaluation may, for a service data flow, require a new binding with another QoS Flow.

> NOTE 2: A QoS change of the PDU Session related information Authorized default 5QI/ARP values doesn't cause the QoS Flow rebinding for PCC rules with the Bind to QoS Flow associated with the default QoS rule Indication set.

When the PCF removes a PCC Rule, the SMF shall remove the association of the PCC Rule to the QoS Flow.

The SMF shall report to the PCF that the PCC Rules bound to a QoS Flow are removed when the corresponding QoS Flow is removed.

When specifying support for integration with TSN, 3GPP TS 23.503 V16.3.0, clause 6.1.3.23 (emphasis added) states:

---

6.1.3.23 Support of integration with Time Sensitive Networking

Time Sensitive Networking (TSN) support is defined in TS 23.501 [2], where the 5GS represents virtual TSN bridge(s) based on the defined granularity model. The TSN AF and PCF interact to perform QoS mapping as described in clause 5.28.4 of TS 23.501 [2].
The PCF provides the following parameters to the TSN AF: Port Management Container, port numbers associated with the NW-TT and DS-TT, and a UE MAC address (i.e. MAC address of the DS-TT port). The TSN AF may use this information to construct IEEE managed objects, to interwork with IEEE TSN networks.
The TSN AF decides the TSN QoS information (i.e. priority and delay) based on the received the configuration information of 5GS Bridge from the CNC as defined in clause 5.28.2 of TS 23.501 [2] and the bridge delay information at the TSN AF.
The PCF receives a request from the TSN AF that includes UE MAC address (i.e. MAC address of the DS-TT port) for PDU session and the TSN QoS parameters, i.e. priority and delay. The PCF performs Session binding using the UE MAC address, and then the PCF derives the TSN QoS parameters into a 5QI. The PCF generates a PCC Rule with service data flow filter containing the UE MAC address and the mapped 5QI. The SMF binds the PCC Rule to a QoS Flow as defined in clause 6.1.3.2.4.

---

The PCC rule includes the priority (Priority Code Point (PCP)) within the SDF to allow identification of ethernet frames and QoS enforcement according to the QoS profile in the PCC rule.

SUMMARY

Systems and methods are disclosed herein that relate to Time Sensitive Communication (TSC) to Fifth Generation (5G) Quality of Service (QoS) mapping and associated QoS binding. In one embodiment, a method for QoS mapping in a 5G System (5GS) for a virtual Time Sensitive Networking (TSN) bridge comprises, at a first network function, obtaining information from a TSN Application Function (AF), where the information comprises baseline TSC QoS parameters and one or more additional parameters comprising either or both of: (a) one or more additional TSC QoS attributes and (b) one or more additional traffic attributes. The method further comprises, at the first network function, generating one or more Policy and Charging Control (PCC) rules based on the obtained information and providing the one or more PCC rules to a second network function. The method further comprises, at the second network function, receiving the one or more PCC rules from the first network function and performing QoS binding based on the one or more PCC rules such that each PCC rule of the one or more PCC rules is associated to a respective QoS flow of a respective Protocol Data Unit (PDU) session. By considering the one or more additional parameters, performance is improved.

In one embodiment, a method performed by a first network function for QoS mapping in a 5GS for a virtual TSN bridge comprises obtaining information from a TSN AF, where the information comprises baseline TSC QoS parameters and one or more additional parameters comprising either or both of: (a) one or more additional TSC QoS attributes and (b) one or more additional traffic attributes. The method further comprises generating one or more PCC rules based on the obtained information providing the one or more PCC rules to a second network function.

In one embodiment, the one or more PCC rules provide a QoS mapping for a TSC traffic class, the TSC traffic class consists of a plurality of TSC streams, and the one or more PCC rules are such that the TSC traffic class is mapped to N QoS flows in the 5GS based on at least one of the one or more additional parameters, wherein N is an integer number greater than 1.

In one embodiment, the one or more PCC rules provide a QoS mapping for a TSC traffic class, the TSC traffic class consists of a plurality of TSC streams, and the one or more PCC rules are such that different groups of the plurality of TSC streams are mapped to different QoS flows in the 5GS, where the different groups of the plurality of streams are defined based on at least one of the one or more additional parameters.

In one embodiment, the one or more PCC rules provide a QoS mapping for a TSC traffic class, the TSC traffic class consists of a plurality of TSC streams, and the one or more PCC rules associate a first group of TSC streams from the plurality of TSC streams in the TSC traffic class to a first 5G QoS Identifier (5QI) and associate a second group of TSC streams from the plurality of TSC streams in the TSC traffic class to a second 5QI, and at least one first parameter from the one or more additional parameters is comprised in QoS profiles indicated by the first and second 5QIs. In one embodiment, at least one of the first and second groups of TSC streams comprises two or more TSC streams.

In one embodiment, the one or more PCC rules provide a QoS mapping for a TSC traffic class, the TSC traffic class consists of a plurality of TSC streams, the plurality of TSC streams are divided into two or more groups of TSC streams based on at least one first parameter from the one or more additional parameters, and the one or more PCC rules associate at least two of the two or more groups of TSC streams to: (a) a same 5QI and (b) different values of the at least one first parameter. In one embodiment, at least one of the two or more groups of TSC streams comprises two or more TSC streams.

In one embodiment, the at least one first parameter comprises a reliability parameter. In one embodiment, the at least one first parameter comprises a maximum burst size parameter.

In one embodiment, the one or more PCC rules provide a QoS mapping for a TSC traffic class and comprise at least one parameter from the one or more additional parameters. In one embodiment, the at least one parameter comprises reliability, maximum burst size, periodicity parameter, or any combination of one or more thereof.

In one embodiment, the baseline TSC QoS parameters consist of priority and delay related parameters. In one embodiment, the baseline TSC QoS parameters consist of priority and delay related parameters and a TSC traffic class number.

In one embodiment, the one or more additional TSC QoS attributes comprise a reliability parameter, a maximum burst size parameter, or both the reliability parameter and the maximum burst size parameter. In one embodiment, the one or more additional traffic attributes comprise periodicity.

In one embodiment, the method further comprises receiving, from another network node, an indication of at least one of the one or more additional parameters to use for QoS mapping.

In one embodiment, TSC stream Identifiers (IDs) are included in the one or more PCC rules.

In one embodiment, the first network function is a Policy Control Function (PCF).

In one embodiment, the second network function is a Session Management Function (SMF).

Corresponding embodiments of a first network function are also disclosed. In one embodiment, a first network function for QoS mapping in a 5GS for a virtual TSN bridge is adapted to obtain information from a TSN AF, where the information comprises baseline TSC QoS parameters and one or more additional parameters comprising either or both of: (a) one or more additional TSC QoS attributes and (b) one or more additional traffic attributes. In one embodiment, the first network function is further adapted to generate one or more PCC rules based on the obtained information and provide the one or more PCC rules to a second network function.

In one embodiment, a network node that implements a first network function for QoS mapping in a 5GS for a virtual TSN bridge comprises processing circuitry that, in order to provide the functionality of the first network function, is configured to cause the network node to obtain information from a TSN AF, where the information comprises baseline TSC QoS parameters and one or more additional parameters comprising either or both of: (a) one or more additional TSC QoS attributes and (b) one or more additional traffic attributes. In one embodiment, processing circuitry is further configured to cause the network node to generate one or more PCC rules based on the obtained information and provide the one or more PCC rules to a second network function.

Embodiments of a computer program comprising instructions which, when executed by at least one process, cause the at least one process to carry out any of the embodiments of the first network node described herein. Embodiments of a carrier containing the computer program are also disclosed, wherein the carrier is one of an electronic signal, an optical signal, a radio signal, or a computer readable storage medium.

Embodiments of a non-transitory computer readable medium comprising instructions executable by processing circuitry of a network node are also disclosed. In one embodiment, a non-transitory computer readable medium comprising instructions executable by processing circuitry of a network node whereby the network node is operable to, in order to provide functionality of a first network function for QoS mapping in a 5GS for a virtual TSN bridge, obtain information from a TSN AF, where the information comprises baseline TSC QoS parameters and one or more additional parameters comprising either or both of: (a) one or more additional TSC QoS attributes and (b) one or more additional traffic attributes. Via execution of the instructions by the processing circuitry, the network node is further operable to generate one or more PCC rules based on the obtained information and provide the one or more PCC rules to a second network function.

Embodiments of a method performed by a second network function are also disclosed. In one embodiment, a method performed by a second network function for QoS binding in a 5GS for a virtual TSN bridge comprises receiving one or more PCC rules from a first network function, the one or more PCC rules comprising information that enables QoS mapping from a TSC traffic class to N QoS flows in the 5GS based on a plurality of parameters, wherein N is an integer number greater than 1. The plurality of parameters comprise baseline QoS parameters and one or more additional parameters comprising either or both of: (a) one or more additional TSC QoS attributes and (b) one or more additional traffic attributes. The method further comprises performing QoS binding based on the one or more PCC rules such that each PCC rule of the one or more PCC rules is associated to a respective QoS flow of a respective PDU session.

In one embodiment, the one or more PCC rules provide a QoS mapping for a TSC traffic class, the TSC traffic class consists of a plurality of TSC streams, and the one or more PCC rules are such that the TSC traffic class is mapped to N QoS flows in the PDU session based on at least one of the one or more additional parameters, wherein N is an integer number greater than 1.

In one embodiment, the one or more PCC rules provide a QoS mapping for a TSC traffic class, the TSC traffic class consists of a plurality of TSC streams, and the one or more PCC rules are such that different groups of the plurality of TSC streams are mapped to different QoS flows in the PDU session, the different groups of the plurality of streams being defined based on at least one of the one or more additional parameters.

In one embodiment, the one or more PCC rules provide a QoS mapping for a TSC traffic class, the TSC traffic class consists of a plurality of TSC streams, the one or more PCC rules associate a first group of TSC streams from the plurality of TSC streams in the TSC traffic class to a first 5QI and associate a second group of TSC streams from the plurality of TSC streams in the TSC traffic class to a second 5QI, and at least one first parameter from the one or more additional parameters is comprised in QoS profiles indicated by the first and second 5QIs. In one embodiment, at least one of the first and second groups of TSC streams comprises two or more TSC streams.

In one embodiment, the one or more PCC rules provide a QoS mapping for a TSC traffic class, the TSC traffic class consists of a plurality of TSC streams, the plurality of TSC streams are divided into two or more groups of TSC streams based on at least one first parameter from the one or more additional parameters, and the one or more PCC rules associate at least two of the two or more groups of TSC streams to: (a) a same 5QI and (b) different values of the at least one first parameter. In one embodiment, at least one of the two or more groups of TSC streams comprises two or more TSC streams.

In one embodiment, the at least one first parameter comprises a reliability parameter. In one embodiment, the at least one first parameter comprises a maximum burst size parameter.

In one embodiment, the one or more PCC rules provide a QoS mapping for a TSC traffic class and comprise at least one parameter from the one or more additional parameters. In one embodiment, the at least one parameter comprises reliability, maximum burst size, periodicity, or any combination of one or more thereof.

In one embodiment, the baseline TSC QoS parameters consist of priority and delay related parameters. In one embodiment, the baseline TSC QoS parameters consist of priority and delay related parameters and a TSC traffic class number.

In one embodiment, the one or more additional TSC QoS attributes comprise a reliability parameter, a maximum burst size parameter, or both the reliability parameter and the maximum burst size parameter. In one embodiment, the one or more additional traffic attributes comprise periodicity.

In one embodiment, TSC stream IDs are included in the one or more PCC rules.

In one embodiment, the first network function is a PCF. In one embodiment, the second network function is an SMF.

Corresponding embodiments of a second network function are also disclosed. In one embodiment, a second network function for QoS binding in a 5GS for a virtual TSN bridge is adapted to receive one or more PCC rules from a first network function, the one or more PCC rules comprising information that enables QoS mapping from a TSC traffic class to N QoS flows in the 5GS based on a plurality of parameters, wherein N is an integer number greater than 1. The plurality of parameters comprise baseline QoS parameters and one or more additional parameters comprising either or both of: (a) one or more additional TSC QoS attributes and (b) one or more additional traffic attributes. The second network function is further adapted to perform QoS binding based on the one or more PCC rules such that each PCC rule of the one or more PCC rules is associated to a respective QoS flow of a respective PDU session.

In one embodiment, a network node that implements a second network function for QoS binding in a 5GS for a virtual TSN bridge comprises processing circuitry configured to cause the network node to receive one or more PCC rules from a first network function, the one or more PCC rules comprising information that enables QoS mapping from a TSC traffic class to N QoS flows in the 5GS based on a plurality of parameters, wherein N is an integer number greater than 1. The plurality of parameters comprise baseline QoS parameters and one or more additional parameters comprising either or both of: (a) one or more additional TSC QoS attributes and (b) one or more additional traffic attributes. The processing circuitry is further configured to cause the network node to perform QoS binding based on the one or more PCC rules such that each PCC rule of the one or more PCC rules is associated to a respective QoS flow of a respective PDU session.

Embodiments of a computer program comprising instructions which, when executed on at least one processor, cause the at least one processor to carry out the method of operation of a second node according to any of the embodiments described herein are also disclosed. Embodiments of a carrier containing the computer program are also disclosed, wherein the carrier is one of an electronic signal, an optical signal, a radio signal, or a computer readable storage medium.

Embodiments of a non-transitory computer readable medium comprising instructions executable by processing circuitry of a network node are also disclosed. In one embodiment, a non-transitory computer readable medium comprising instructions executable by processing circuitry of a network node whereby the network node is operable to, in order to provide functionality of a second network function for QoS mapping in a 5GS for a virtual TSN bridge, receive one or more PCC rules from a first network function, the one or more PCC rules comprising information that enables QoS mapping from a TSC traffic class to N QoS flows in the 5GS based on a plurality of parameters, wherein N is an integer number greater than 1. The plurality of parameters comprise baseline QoS parameters and one or more additional parameters comprising either or both of: (a) one or more additional TSC QoS attributes and (b) one or more additional traffic attributes. Via execution of the instructions by the at least one processor, the network node is further operable to perform QoS binding based on the one or more PCC rules such that each PCC rule of the one or more PCC rules is associated to a respective QoS flow of a respective PDU session.

Embodiments of a method performed by an AF for flow binding in a 5GS that provides a virtual TSN bridge comprises obtaining port information for the virtual TSN bridge, wherein the port information comprises at least two Traffic Classes (TCs) associated with a port of the virtual TSN bridge assigned to a PDU session. The method further comprises determining a mapping of application data to a TC from the at least two TCs based on the obtained port information and application data characteristics and providing the mapping to a network function in a core network of a 5GS.

In one embodiment, the network function is a PCF. In one embodiment, the mapping comprises providing the mapping to the PCF to be used for deriving policy control rules.

In one embodiment, the mapping is to be applied by a User Plane Function (UPF) anchoring the PDU session.

In one embodiment, the network function is a UPF anchoring the PDU session. In one embodiment, providing the mapping comprises transmitting a packet or frame to the UPF anchoring the PDU session, wherein the mapping in comprised in a header of the packet or frame as the packet or frame is encapsulated for transmission.

Embodiments of an AF for flow binding in a 5GS that provides a virtual TSN bridge are also disclosed. In one embodiment, the AF is adapted to obtain port information for the virtual TSN bridge, the port information comprising at least two TCs associated with a port of the virtual TSN bridge assigned to a PDU session. The AF is further adapted to determine a mapping of application data to a TC from the at least two TCs based on the obtained port information and application data characteristics and provide the mapping to a network function in a core network of a 5GS.

In one embodiment, a network node that implements an AF for flow binding in a 5GS that provides a virtual TSN bridge comprises processing circuitry that, in order to provide functionality of the AF, is configured to cause the network node to obtain port information for the virtual TSN bridge, the port information comprising at least two TCs associated with a port of the virtual TSN bridge assigned to a PDU session. The network node is further adapted to determine a mapping of application data to a TC from the at least two TCs based on the obtained port information and application data characteristics and provide the mapping to a network function in a core network of a 5GS.

Embodiments of a computer program comprising instructions which, when executed on at least one processor, cause the at least one processor to carry out the method of operation of an AF according to any of the embodiments described herein are also disclosed. Embodiments of a carrier containing the computer program are also disclosed, wherein the carrier is one of an electronic signal, an optical signal, a radio signal, or a computer readable storage medium.

Embodiments of a non-transitory computer readable medium comprising instructions executable by processing circuitry of a network node are also disclosed. In one embodiment, a non-transitory computer readable medium comprising instructions executable by processing circuitry of a network node whereby the network node is operable to, in order to provide functionality of an AF for QoS mapping in a 5GS for a virtual TSN bridge, obtain port information for the virtual TSN bridge, the port information comprising at least two TCs associated with a port of the virtual TSN bridge assigned to a PDU session. Via execution of the instructions, the network node is further operable to determine a mapping of application data to a TC from the at least two TCs based on the obtained port information and application data characteristics and provide the mapping to a network function in a core network of a 5GS.

Embodiments of a method performed by a PCF in a 5GS that provides a virtual TSN bridge comprises obtaining downstream application data characteristics from a TSN AF, determining a mapping of the application data characteristics to a TC based on port information for the virtual TSN bridge, the port information comprising at least two TCs associated with a port of the virtual TSN bridge assigned to a PDU session, and providing the mapping to another network function.

In one embodiment, the other network function is an SMF. In one embodiment, providing the mapping comprises providing one or more PCC rules including the mapping to the SMF.

In one embodiment, the mapping is to be used by a UPF that anchors the PDU session.

Embodiments of a PCF for a 5GS that provides a virtual TSN bridge is adapted to obtain downstream application data characteristics from a TSN AF, determine a mapping of the application data characteristics to a TC based on port information for the virtual TSN bridge, the port information comprising at least two TCs associated with a port of the virtual TSN bridge assigned to a PDU session, and provide the mapping to another network function.

In one embodiment, a network node that implements a PCF for a 5GS that provides a virtual TSN bridge comprises processing circuitry that, in order to provide functionality of the PCF, is configured to cause the network node to obtain downstream application data characteristics from a TSN AF, determine a mapping of the application data characteristics to a TC based on port information for the virtual TSN bridge, the port information comprising at least two TCs associated with a port of the virtual TSN bridge assigned to a PDU session, and provide the mapping to another network function.

Embodiments of a computer program comprising instructions are also disclosed. In one embodiment, a computer program comprises instructions which, when executed on at least one processor, cause the at least one processor to carry out the method of operation of a PCF according to any of the embodiments disclosed herein. In one embodiment, a carrier containing the computer program is provided, wherein the carrier is one of an electronic signal, an optical signal, a radio signal, or a computer readable storage medium.

In one embodiment, a non-transitory computer readable medium comprising instructions executable by processing circuitry of a network node is discussed. By execution of the instructions by the processing circuitry, the network node is operable to, in order to provide functionality of a PCF for a 5GS for a virtual TSN, obtain application data characteristics from a TSN AF, determine a mapping of the application data characteristics to a TC based on port information for the virtual TSN bridge, the port information comprising at least two TCs associated with a port of the virtual TSN bridge assigned to a PDU session, and provide the mapping to another network function.

BRIEF DESCRIPTION OF THE DRAWINGS

The accompanying drawing figures incorporated in and forming a part of this specification illustrate several aspects of the disclosure, and together with the description serve to explain the principles of the disclosure.

FIG. 15 illustrates an example of a mapping table in accordance with an embodiment of the present disclosure;

FIG. 16 illustrates an example of information for use when the TSN AF decides if a TC needs aggregation or not based on TSC traffic attributes;

FIGS. 23 through 25 are schematic block diagrams of example embodiments of a network node;

DETAILED DESCRIPTION

Figures 1, 2:
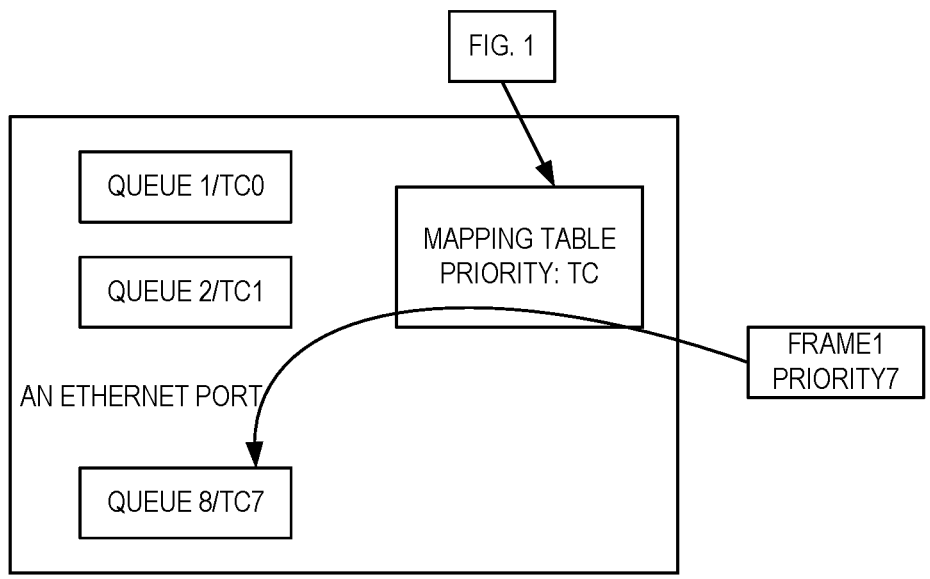
FIG. 1 illustrates the IEEE 802.1Q mapping table between Traffic Classes (TCs) and Priority.
FIG. 2 shows an example of how an ethernet bridge/switch handles an incoming ethernet frame in accordance with the mapping table of FIG. 1.

The embodiments set forth below represent information to enable those skilled in the art to practice the embodiments and illustrate the best mode of practicing the embodiments. Upon reading the following description in light of the accompanying drawing figures, those skilled in the art will understand the concepts of the disclosure and will recognize applications of these concepts not particularly addressed herein. It should be understood that these concepts and applications fall within the scope of the disclosure.

Generally, all terms used herein are to be interpreted according to their ordinary meaning in the relevant technical field, unless a different meaning is clearly given and/or is implied from the context in which it is used. All references to a/an/the element, apparatus, component, means, step, etc. are to be interpreted openly as referring to at least one instance of the element, apparatus, component, means, step, etc., unless explicitly stated otherwise. The steps of any methods disclosed herein do not have to be performed in the exact order disclosed, unless a step is explicitly described as following or preceding another step and/or where it is implicit that a step must follow or precede another step. Any feature of any of the embodiments disclosed herein may be applied to any other embodiment, wherever appropriate. Likewise, any advantage of any of the embodiments may apply to any other embodiments, and vice versa. Other objectives, features, and advantages of the enclosed embodiments will be apparent from the following description.

Radio Node: As used herein, a "radio node" is either a radio access node or a wireless device.

Radio Access Node: As used herein, a "radio access node" or "radio network node" is any node in a Radio Access Network (RAN) of a cellular communications network that operates to wirelessly transmit and/or receive signals. Some examples of a radio access node include, but are not limited to, a base station (e.g., a New Radio (NR) base station (gNB) in a Third Generation Partnership Project (3GPP) Fifth Generation (5G) NR network or an enhanced or evolved Node B (eNB) in a 3GPP Long Term Evolution (LTE) network), a high-power or macro base station, a low-power base station (e.g., a micro base station, a pico base station, a home eNB, or the like), and a relay node.

Core Network Node: As used herein, a "core network node" is any type of node in a core network or any node that implements a core network function. Some examples of a core network node include, e.g., a Mobility Management Entity (MME), a Packet Data Network Gateway (P-GW), a Service Capability Exposure Function (SCEF), a Home Subscriber Server (HSS), or the like. Some other examples of a core network node include a node implementing an Access and Mobility Management Function (AMF), a User Plane Function (UPF), a Session Management Function (SMF), an Authentication Server Function (AUSF), a Network Slice Selection Function (NSSF), a Network Exposure Function (NEF), a Network Function (NF) Repository Function (NRF), a Policy Control Function (PCF), a Unified Data Management (UDM), or the like.

Wireless Device: As used herein, a "wireless device" is any type of device that has access to (i.e., is served by) a cellular communications network by wirelessly transmitting and/or receiving signals to a radio access node(s). Some examples of a wireless device include, but are not limited to, a User Equipment device (UE) in a 3GPP network and a Machine Type Communication (MTC) device.

Network Node: As used herein, a "network node" is any node that is either part of the RAN or the core network of a cellular communications network/system.

Note that the description given herein focuses on a 3GPP cellular communications system and, as such, 3GPP terminology or terminology similar to 3GPP terminology is oftentimes used. However, the concepts disclosed herein are not limited to a 3GPP system.

Note that, in the description herein, reference may be made to the term "cell"; however, particularly with respect to 5G NR concepts, beams may be used instead of cells and, as such, it is important to note that the concepts described herein are equally applicable to both cells and beams.

For Time Sensitive Networking (TSN)-5G integration, 3GPP Technical Report (TR) 23.734 V16.2.0 has agreed on a model in which the 5G System (5GS) is modeled as a virtual TSN bridge or several virtual TSN bridges. 3GPP TR 23.734 Solution #18 describes Quality of Service (QoS) negotiation between the 3GPP and TSN networks. The control plane based QoS negotiation includes two stages (also referred to herein as "steps"):

1. Stage 1—Bridge Capability Report Phase: TSN capabilities reporting (also called bridge onboarding phase) for 5GS TSN bridge (3GPP TR 23.734 section 6.18.1.2.1).
2. Stage 2—Bridge Configuration Phase: Solution #30 proposed a procedure of "TSN related QoS configuration for 5G virtual bridge" which can be an alternative to the Solution #18 "TSN-aware QoS profile generation" (3GPP TR 23.734 section 6.18.1.2.2).

Figure 3:
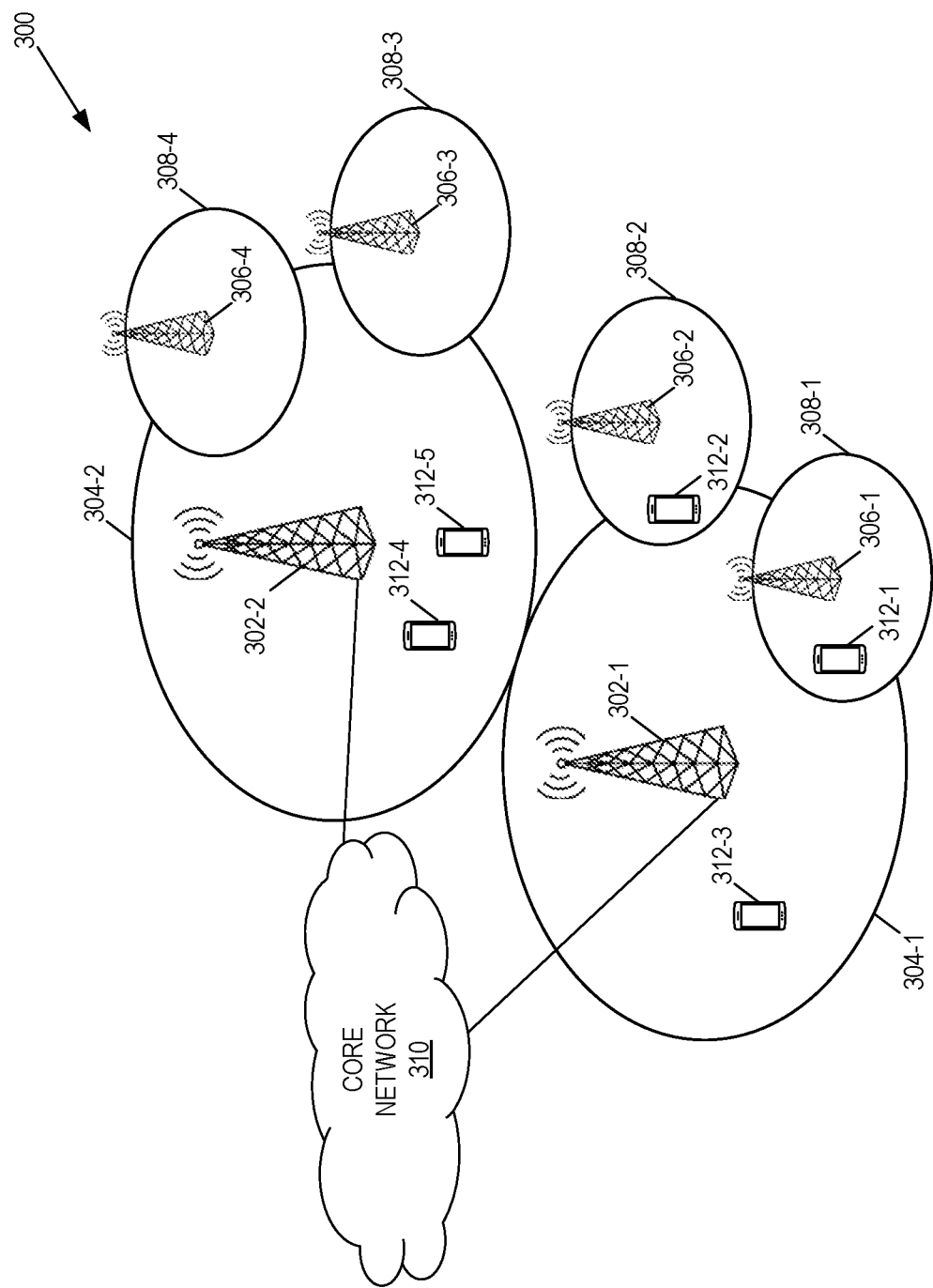
FIG. 3 illustrates one example of a cellular communications system in which embodiments of the present disclosure may be implemented.

Prior to describing embodiments of the present disclosure in detail, a brief discussion of the 5GS is beneficial. In this regard, FIG. 3 illustrates one example of a cellular communications system 300 in which embodiments of the present disclosure may be implemented. In the embodiments described herein, the cellular communications system 300 is a 5GS including a NR RAN (also referred to as a Next Generation (NG) RAN). In this example, the RAN includes base stations 302-1 and 302-2, which in the 5GS are referred to as gNBs, controlling corresponding (macro) cells 304-1 and 304-2. The base stations 302-1 and 302-2 are generally referred to herein collectively as base stations 302 and individually as base station 302. Likewise, the (macro) cells 304-1 and 304-2 are generally referred to herein collectively as (macro) cells 304 and individually as (macro) cell 304. The RAN may also include a number of low power nodes 306-1 through 306-4 controlling corresponding small cells 308-1 through 308-4. The low power nodes 306-1 through 306-4 can be small base stations (such as pico or femto base stations) or Remote Radio Heads (RRHs), or the like. Notably, while not illustrated, one or more of the small cells 308-1 through 308-4 may alternatively be provided by the base stations 302. The low power nodes 306-1 through 306-4 are generally referred to herein collectively as low power nodes 306 and individually as low power node 306. Likewise, the small cells 308-1 through 308-4 are generally referred to herein collectively as small cells 308 and individually as small cell 308. The cellular communications system 300 also includes a core network 310, which in the 5GS is referred to as the 5G Core (5GC). The base stations 302 (and optionally the low power nodes 306) are connected to the core network 310.

The base stations 302 and the low power nodes 306 provide service to wireless devices 312-1 through 312-5 in the corresponding cells 304 and 308. The wireless devices 312-1 through 312-5 are generally referred to herein collectively as wireless devices 312 and individually as wireless device 312. The wireless devices 312 are also sometimes referred to herein as UEs.

Figure 4:
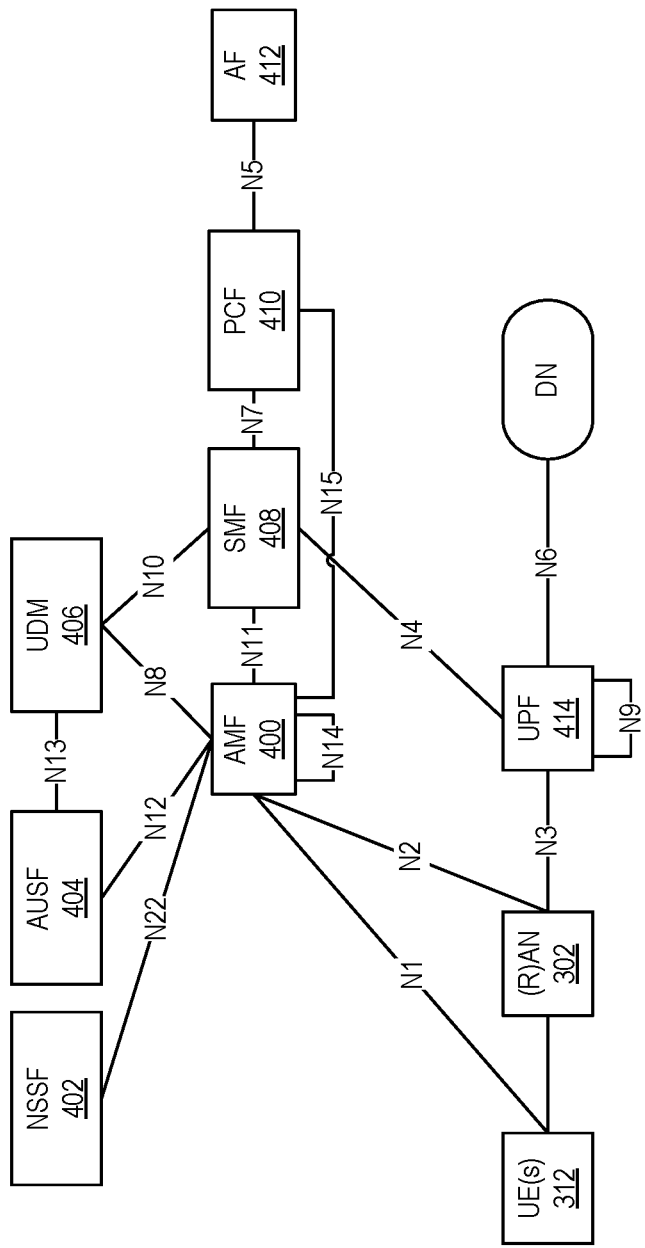
FIG. 4 illustrates a wireless communication system represented as a Fifth Generation (5G) network architecture composed of core Network Functions (NFs), where interaction between any two NFs is represented by a point-to-point reference point/interface.

FIG. 4 illustrates a wireless communication system represented as a 5G network architecture composed of core Network Functions (NFs), where interaction between any two NFs is represented by a point-to-point reference point/interface. FIG. 4 can be viewed as one particular implementation of the system 300 of FIG. 3.

Seen from the access side the 5G network architecture shown in FIG. 4 comprises a plurality of UEs 312 connected to either a RAN 302 or an Access Network (AN) as well as an AMF 400. Typically, the R(AN) 302 comprises base stations, e.g. such as eNBs or gNBs or similar. Seen from the core network side, the 5GC NFs shown in FIG. 4 include a NSSF 402, an AUSF 404, a UDM 406, the AMF 400, a SMF 408, a PCF 410, and an Application Function (AF) 412.

Reference point representations of the 5G network architecture are used to develop detailed call flows in the normative standardization. The N1 reference point is defined to carry signaling between the UE 312 and AMF 400. The reference points for connecting between the AN 302 and AMF 400 and between the AN 302 and UPF 414 are defined as N2 and N3, respectively. There is a reference point, N11, between the AMF 400 and SMF 408, which implies that the SMF 408 is at least partly controlled by the AMF 400. N4 is used by the SMF 408 and UPF 414 so that the UPF 414 can be set using the control signal generated by the SMF 408, and the UPF 414 can report its state to the SMF 408. N9 is the reference point for the connection between different UPFs 414, and N14 is the reference point connecting between different AMFs 400, respectively. N15 and N7 are defined since the PCF 410 applies policy to the AMF 400 and SMF 408, respectively. N12 is required for the AMF 400 to perform authentication of the UE 312. N8 and N10 are defined because the subscription data of the UE 312 is required for the AMF 400 and SMF 408.

The 5GC network aims at separating User Plane (UP) and Control Plane (CP). The UP carries user traffic while the CP carries signaling in the network. In FIG. 4, the UPF 414 is in the UP and all other NFs, i.e., the AMF 400, SMF 408, PCF 410, AF 412, NSSF 402, AUSF 404, and UDM 406, are in the CP. Separating the UP and CP guarantees each plane resource to be scaled independently. It also allows UPFs to be deployed separately from CP functions in a distributed fashion. In this architecture, UPFs may be deployed very close to UEs to shorten the Round Trip Time (RTT) between UEs and data network for some applications requiring low latency.

The core 5G network architecture is composed of modularized functions. For example, the AMF 400 and SMF 408 are independent functions in the CP. Separated AMF 400 and SMF 408 allow independent evolution and scaling. Other CP functions like the PCF 410 and AUSF 404 can be separated as shown in FIG. 4. Modularized function design enables the 5GC network to support various services flexibly.

Each NF interacts with another NF directly. It is possible to use intermediate functions to route messages from one NF to another NF. In the CP, a set of interactions between two NFs is defined as service so that its reuse is possible. This service enables support for modularity. The UP supports interactions such as forwarding operations between different UPFs.

Figure 5:
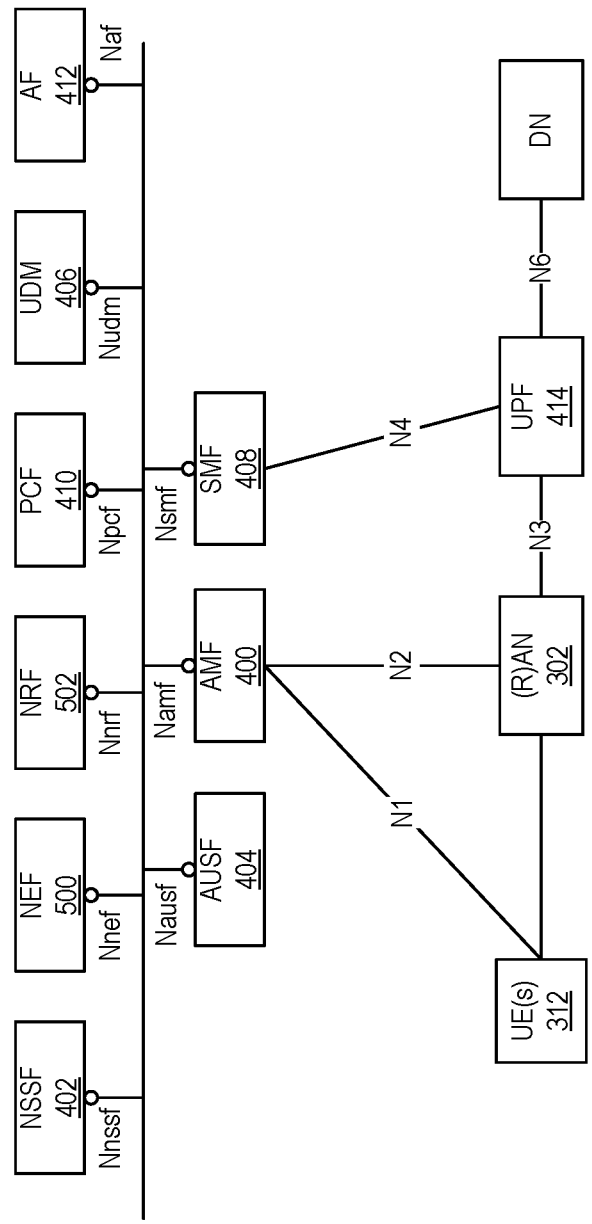
FIG. 5 illustrates a 5G network architecture using service-based interfaces between the NFs in the Control Plane (CP), instead of the point-to-point reference points/interfaces used in the 5G network architecture of FIG. 4.

FIG. 5 illustrates a 5G network architecture using service-based interfaces between the NFs in the CP, instead of the point-to-point reference points/interfaces used in the 5G network architecture of FIG. 4. However, the NFs described above with reference to FIG. 4 correspond to the NFs shown in FIG. 5. The service(s) etc. that a NF provides to other authorized NFs can be exposed to the authorized NFs through the service-based interface. In FIG. 5 the service based interfaces are indicated by the letter "N" followed by the name of the NF, e.g. Namf for the service based interface of the AMF 400 and Nsmf for the service based interface of the SMF 408, etc. The NEF 500 and the NRF 502 in FIG. 5 are not shown in FIG. 4 discussed above. However, it should be clarified that all NFs depicted in FIG. 4 can interact with the NEF 500 and the NRF 502 of FIG. 5 as necessary, though not explicitly indicated in FIG. 4.

Some properties of the NFs shown in FIGS. 4 and 5 may be described in the following manner. The AMF 400 provides UE-based authentication, authorization, mobility management, etc. A UE 312 even using multiple access technologies is basically connected to a single AMF 400 because the AMF 400 is independent of the access technologies. The SMF 408 is responsible for session management and allocates Internet Protocol (IP) addresses to UEs. It also selects and controls the UPF 414 for data transfer. If a UE 312 has multiple sessions, different SMFs 408 may be allocated to each session to manage them individually and possibly provide different functionalities per session. The AF 412 provides information on the packet flow to the PCF 410 responsible for policy control in order to support QoS. Based on the information, the PCF 410 determines policies about mobility and session management to make the AMF 400 and SMF 408 operate properly. The AUSF 404 supports authentication function for UEs or similar and thus stores data for authentication of UEs or similar while the UDM 406 stores subscription data of the UE 312. The Data Network (DN), not part of the 5GC network, provides Internet access or operator services and similar.

An NF may be implemented either as a network element on a dedicated hardware, as a software instance running on a dedicated hardware, or as a virtualized function instantiated on an appropriate platform, e.g., a cloud infrastructure.

Figure 6:
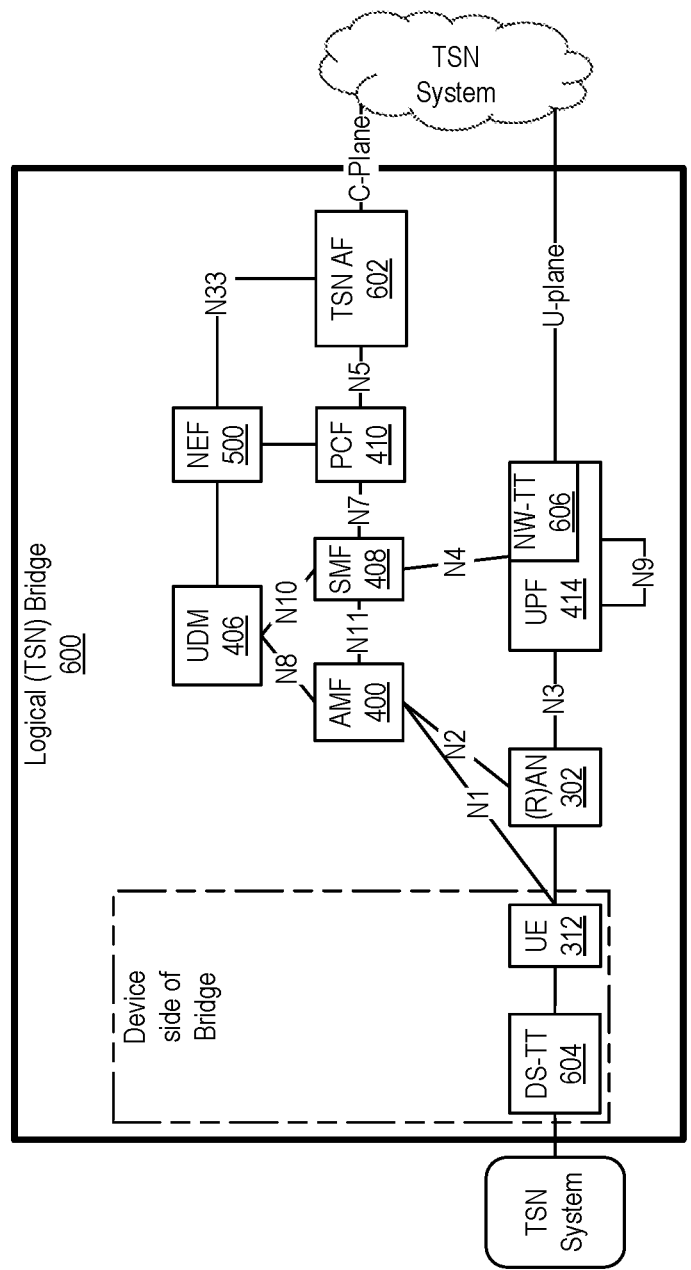
FIG. 6, which is a reproduction of FIG. 4.4.8.2-1 Third Generation Partnership Project (3GPP) Technical Specification (TS) 23.501 V16.3.0 with the addition of reference numbers, shows one example of an architecture in which a 5G System (5GS) appears as a virtual, or logical, Time Sensitive Networking (TSN) bridge.

Embodiments of the present disclosure more specifically relate to the 5GS appearing as a virtual TSN bridge(s) for integration with a TSN. In this regard, FIG. 6, which is a reproduction of FIG. 4.4.8.2-1 3GPP Technical Specification (TS) 23.501 V16.3.0 with the addition of reference numbers, shows one example of an architecture in which a 5GS appears as a virtual, or logical, TSN bridge 600. As shown in FIG. 6 and discussed above, the 5GS includes a UE 312, a (R)AN including one or more RAN nodes (shown as reference number 302 in this example, which corresponds to a base station 302), and a number of core network nodes (also referred to herein as core network functions). As illustrated, the core network nodes include the AMF 400, the UDM 406, the SMF 408, the PCF 410, the NEF 500, and the UPF 414. Further, in this example, there is also a TSN AF 602, a TSN Translator (TT) at the UE side which is denoted in FIG. 6 as a DS-TT 604 (also referred to herein as UE side TT or UE/TT), and a TSN TT at the UPF side which is denoted in FIG. 6 as NW-TT 606 (also referred to herein as UPF side TT or UPF/TT). In this example, the DS-TT 604 is shown outside of the UE 312, and the NW-TT 606 is shown inside of the UPF 414. However, in other embodiments, the DS-TT 604 is alternatively implemented within the UE 312 and/or the NW-TT 606 is alternatively implemented outside of the UPF 414.

First Aspects of the Present Disclosure

There currently exist certain challenge(s) in relation to the 5GS-TSN network interworking. A TSN Traffic Class (TC) consists of one or more TSN streams managed by the TSN network. When TC information is provided to the 5GS in support of 5GS-TSN network interworking, the 5GS needs to convey it to different nodes inside the 5GS using 5GS internal signaling and protocols. This allows for realizing 5GS Protocol Data Unit (PDU) sessions consisting of one or more 5GS QoS flows appropriate for supporting each TSN traffic class, wherein each 5GS QoS flow is transmitted using a Data Radio Bearer (DRB) and a General Packet Radio System (GPRS) Tunneling Protocol User Plane (GTP-U) tunnel. The 5GS therefore performs QoS mapping between a TSN traffic class and one or more 5GS QoS flows to ensure that TSN stream performance attributes are realized whenever TSN traffic is transferred using a 5GS PDU session.

3GPP Release 16 TS 23.501 has agreed that the mapping tables between the TC and 5GS QoS Profile is provisioned and further used to find a suitable 5GS QoS profile to transfer TSN traffic over the PDU session. QoS mapping procedures are performed in two phases: (1) QoS capability report phase as described in 3GPP TS 23.501 V16.3.0 clause 5.28.1 and (2) QoS configuration phase as in 3GPP TS 23.501 clause 5.28.2.

Figure 7:
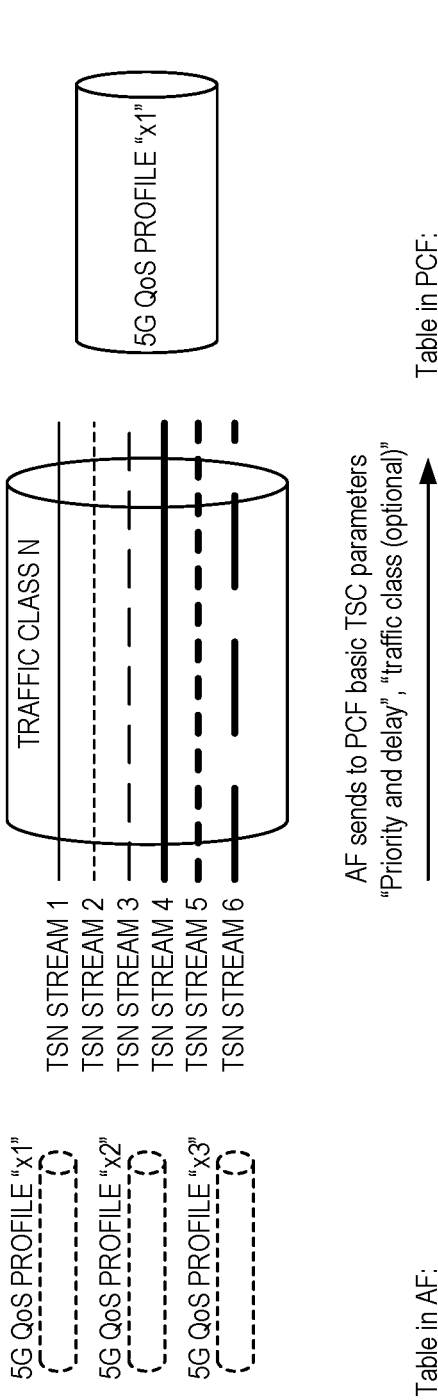
FIG. 7 shows an example of the baseline Time Sensitive Communication (TSC)—5G Quality of Service (QoS) mapping using basic TSC QoS parameters (priority and delay)

FIG. 7 shows an example of the baseline Time Sensitive Communication (TSC)—5G QoS mapping using basic TSC QoS parameters (priority and delay). The report from the AF is per traffic class per port pair. FIG. 7 only shows an example with limited parameters.

FIG. 7 provides an example of the baseline QoS mapping, as described in 3GPP TS 23.501 clause 5.28.4. During the capability report phase, in this example, three different 5G QoS profiles have been reported to the TSN AF. The TSN AF sends basic TSC/TSN QoS parameters (e.g., priority and delay) to the PCF, and the PCF finds a suitable 5G QoS profile for mapping the TSN QoS requirements corresponding to TC N=7 is a mapping from TC #7 into 5G QoS profile "x1". Conversely, the mapping for TC #5 is a mapping into QoS profile "x5".

Whether a TSC/TSN TC needs to be broken down into multiple QoS flows or not is a consequence of 5G-TSC QoS mapping.

Current 3GPP specifications version 16.2.0 are unclear about how TSN QoS parameters are mapped into a 5G QoS Identifier (5QI), where a 5QI is an identifier or index that points to a set of 5G QoS parameters (i.e., a 5G QoS profile). Currently, the 3GPP specifications only define a mapping between TSN QoS parameters corresponding to a TC and a 5G QoS profile.

3GPP TS 23.501 V16.2.0 clause 5.28.4 states:
CNC distributes the TSN QoS requirements and TSN scheduling parameters to 5G virtual bridge via TSN AF.
and
The PCF mapping table provides a mapping from TSN QoS information to 5GS QoS profile. Based on trigger from TSN AF, the PCF may trigger PDU session modification procedure to establish a new 5G QoS flow for the requested traffic class according to the selected QoS policies from the TSN AF traffic requirements.

3GPP TS 23.503 clause 6.1.3.23 states:
The PCF receives a request from the TSN AF that includes UE MAC address and the TSN QoS parameters, i.e. priority and maximum delay. The PCF performs Session binding using both the UE MAC address and port number, and then the PCF derives the TSN QoS parameters into a 5QI. (emphasis added).

According to 3GPP TS 23.503 V16.2.0 text, the mapping of a TSN TC to a 5QI can be derived. TSN QoS parameters are defined as: "priority and maximum delay". A TC between a pair of ingress/egress ports shares the same priority and maximum delay (e.g., bridge delay).

3GPP TS 23.501 clause 5.28.4 states:
The minimum set of TSN QoS-related parameters that are relevant for mapping the TSN QoS requirements in the 5GS are: traffic classes and their priorities per port, bridge delays per port pair and traffic class (independentDelayMax, independentDelayMin, dependentDelayMax, dependentDelayMin), and propagation delay per port (txPropagationDelay).
and
QoS mapping table between port traffic classes and 5QI should be matching the delay and priority, while preserving the priorities in the 5GS.

Thus, based on the discussion above it can be seen that, if the PCF derives the TSN QoS parameters into a 5QI, then a 5QI and a QoS flow using this 5QI is mapped to a TC. In other words, the current 3GPP specifications v16.2.0 only define a 1:1 mapping procedure between a TSN TC and a 5G QoS profile. There is a need for the 5GS to break down a TC and handle the TSN traffic at the TSN stream level.

Approved S2-1910758 Change Request (CR) to 3GPP TS 23.501 clause 5.27.2 states "Multiple TSN Streams can be mapped to a QoS Flow." Further, with respect to clause 5.27.3, the CR states: "For each instance of Periodicity, within each Period (defined by periodicity value), TSC QoS Flows are required to transmit only one burst of maximum size MDBV within the AN-PDB."

A TSN TC consists of one or more TSN streams that may have different periodicity. CR S2-1910758 statement implies that the TSN streams sharing the same periodicity may need to be transmitted in one 5G TSC QoS flow. This means that a TC may need to be broken down into several subgroups, where TSN streams in each subgroup share the same periodicity value. Thus, there is a need for 5GS to map a TSN TC to multiple 5G TSC QoS flows. However, the current 3GPP standards do not define any mechanism by which the PCF can derive the TSN QoS parameters into multiple 5QIs.

A short summary of the problems is as follows:

TSC traffic may have more characteristics as listed below:
1. All TSN streams inside a particular TC between a pair of ingress/egress ports share the same priority (Priority Code Point (PCP)) when the number of TCs supported in a port is eight.
2. All TSN streams inside a particular TC between a pair of ingress/egress ports share the same priority (PCP) and one or more PCPs may share a common TC when the number of TCs supported in a port is less than eight.
3. All TSN streams inside a particular TC between a pair of ingress/egress ports share the same delay requirement (e.g., bridge delay).
4. TSC traffic may have additional QoS parameters other than priority (PCP) and delay noted above, which also may need to be considered by the 5GS.
5. TSC traffic may also have additional attributes (non-QoS related), e.g. periodicity, TSC flow direction, etc. These attributes may also have an impact on the 5GS configuration.

As discussed below in detail, in the present disclosure, priority and delay are referred to herein as "basic TSC/TSN QoS parameters", the QoS parameters noted in item 4 above are referred to herein as "additional TSC QoS attributes", and the attributes noted in item 5 above are referred to herein as "additional TSC attributes (non-QoS related)".

Current 3GPP specifications map TSN traffic to a 5G QoS profile based on the basic TSC/TSN QoS parameters. However, the 5GS may need to consider additional TSC QoS attributes and/or additional TSC attributes for QoS mapping and Policy and Charging Control (PCC) rule generation. New QoS mapping based on these new parameters will lead to a case that a TC can be mapped to multiple 5G QoS profiles and/or multiple QoS flows.

Certain aspects of the present disclosure and their embodiments may provide solutions to the aforementioned or other challenges. First aspects of the present disclosure deal with QoS mapping at the PCF and generation of PCC rules where it is proposed to use additional parameters from the AF (e.g., reliability, periodicity) in order to generate the authorized QoS for the PCC rule. The QoS mapping can be provided per group of streams sharing same reliability/periodicity. The PCF performs QoS mapping of the AF QoS and provides a list of parameters in PCC rules to the SMF for QoS flow binding.

The SMF derives the QoS parameters, using the parameters in the PCC rule, for a new QoS flow, binds the PCC rule to the QoS flow, and then proceeds, e.g., as described 3GPP TS 23.501 (e.g., V16.2.0 or V16.3.0) clause 5.7. If a QoS flow with QoS parameters identical to the binding parameters exists, the SMF updates the QoS flow so that the new PCC rule is bound to this QoS flow.

Alternatives of QoS mapping at the AF, or jointly between the PCF and AF, are also provided.

Some of the first aspects of the present disclosure are as follows:

Aspect 1(1):
In some embodiments, an example of how TSC traffic characteristics (e.g., "periodicity") can be mapped in the 5GS is provided.

There is no 5QI parameter existing for mapping "periodicity". In some embodiments, even if it is not a QoS parameter, it can be used for QoS flow binding, where different periodicities can be mapped to different QoS flows where those flows have the same 5QI. The PCF includes "periodicity" in the PCC rule as a QoS flow binding parameter. SMF use is for QoS flow setup/modification.

Aspect 1(2): In some embodiments, TC break down is provided. (mapping granularity)

Current mapping method in 3GPP TS 501 and 3GPP TS 503 is only based on one-to-one mapping between TC and 5G QoS profile (5QI), i.e. one TC: one 5QI: one QoS flow.

In some embodiments, an option is added for mapping one TC: one 5QI: "N" QoS flows, for example adding periodicity as an add on to the QoS flow binding parameters in 3GPP TS 23.503 (e.g., V16.2.0 or V16.4.0) clause 6.1.3.2.4 of 23.503.

Aspect 1(3):
In some embodiments, TSC stream aggregation is provided.

When a TC is broken down into multiple streams, the several ways of aggregation are proposed herein. The stream aggregation can be either based on the additional QoS parameter (e.g., maximum burst size, reliability) or traffic characteristics (e.g., periodicity). The streamID information (which identifies a stream) is included in the PCC rule for flow binding.

Aspect 1(4):
In some embodiments, reliability/availability can be used for QoS mapping purposes, where TSC "reliability" can be mapped to 5QI packet error rate or packet loss rate. In this case, there is no need to add a new parameter in the PCC rule because 5QI can already represent it.

In some embodiments, reliability can be optionally used as a flow binding parameter (same as Aspect 1(1) where periodicity is used as a flow binding parameter). In this case, the PCF includes reliability in the PCC rules and provides it to the SMF for flow binding.

Aspect 1(5):
In some embodiments, different ways of mapping ethernet priority (PCP) are provided.

Aspect 1(6):
In some embodiments, the AF can potentially provide more parameters (x, y, z) than current 3GPP defined "burst size" and "periodicity". In some embodiments, a general method of how a 5GS can use those parameters for mapping is proposed. A 5GS can indicate to the PCF or AF about which parameter needs special treatment (e.g., traffic with the special parameter x needs a separate QoS flow, even if from the QoS perspective, traffic with x, y, z can be in the same QoS flow).

The first aspects of the disclosure relate to QoS mapping using additional TSC parameters. These first aspects will now be described in detail. In the present disclosure, examples are provided based on an assumption that a port supports eight (8) traffic classes, which gives a 1:1 mapping between TC to priority. The priority information of TSN traffic can be found in ethernet frame PCP. However, the methods and mechanisms disclosed herein can apply to any other cases (e.g., number of supported TCs per port is less than eight), for which the mapping between TC and priority (PCP) is based on the IEEE 802.1Q TC and priority mapping table.

For TSC traffic characteristics, the description herein divides them into three categories:

1. "Basic TSC/TSN QoS parameters", which refer to priority and delay related parameters, and TC number (which identifies a TC) is optional.
2. "Additional TSC QoS attributes", which refer to QoS related parameters other than those covered by the first bullet (i.e., QoS related parameters other than the basic TSC/TSN QoS parameters). The examples of "additional TSC QoS attributes" can be "maximum TSC traffic burst size", or "reliability" or "availability", or "maximum TSC flow bitrate". The additional TSC QoS attributes are also referred to herein as additional TSC QoS parameters.
3. "Additional traffic attributes (non-QoS related)", examples of which are: "packet/frame transfer interval (also called periodicity)", "TSC flow directions", or any other attributes that 5GS may have interest for a special treatment. These attributes help in finding an optimal resource scheduling at the air interface.

The present disclosure only uses a few example parameters to show how the proposed methods work. However, the proposed methods and mechanisms can be applied on other TSC parameters too.

Method 1: Multi-Step Mapping Operation (First Do Baseline QoS Mapping, Then Based On Additional TSC QoS Attributes Setup Additional PCC Rules, e.g. Multiple QoS Flows For a TC)

Figure 8:
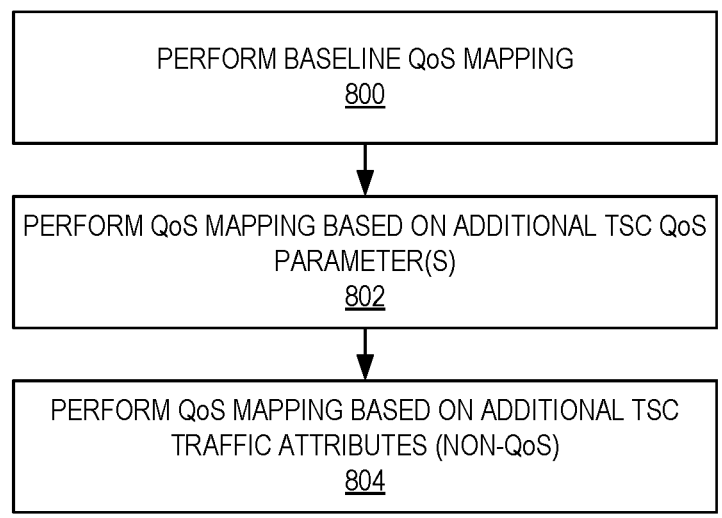
FIG. 8 is a flow chart that illustrates a method (referred to herein as "Method 1") performed by a network node to provide multi-step QoS mapping in accordance with some embodiments of the present disclosure.

FIG. 8 is a flow chart that illustrates a method (referred to herein as "Method 1") performed by a network node (e.g., PCF 410) to provide multi-step QoS mapping in accordance with some embodiments of the present disclosure. As illustrated, the PCF 410 performs a baseline QoS mapping using basic TSC QoS parameters (e.g., priority and delay) (step 800). The PCF 410 then uses additional TSC QoS attributes (e.g., reliability and/or maximum TSC burst size) to perform QoS mapping (step 802). Optionally, the PCF 410 uses additional TSC traffic attributes (e.g., periodicity) to perform QoS mapping (step 804). Each of these steps is described in more detail below.

Step 800: In the first step (step 800) of this method, the baseline QoS mapping (using basic TSC QoS parameters, e.g. priority and delay) is performed. The baseline QoS mapping is described above and illustrated in FIG. 7. The mapping relation is 1 TC: 1 Priority (PCP): One 5QI: 1 (maximum delay requirement): one QoS flow.

Step 802—second step mapping: Now besides the basic TSC QoS parameters, the TSN AF 602 sends to the PCF 410 "additional TSC QoS attributes". Based on this additional information, the QoS mapping results from step 800 (one priority PCP is mapped to one 5QI) may not be sufficient. Thus, in step 802, these additional TSC QoS parameters are used by the PCF 410 for QoS mapping. The PCF 410 uses the "basic TSC QoS parameter" (e.g., priority and delay) together with additional TSC QoS parameters (e.g., reliability and/or maximum TSC burst size) to find a suitable 5G QoS profile.

In this example, "reliability/availability" is used as the additional QoS parameter. TSC QoS parameter "reliability" may be mapped to 5QI parameter Packet Error Rate (PER) in the 5GS. There can be several use cases.

The additional TSC QoS parameters can be associated to:
a TC that all streams within the TC share the same "additional TSC QoS parameters", or
a TSN stream, or
a list of TSN streams that share the same additional TSC QoS parameters.

If the additional TSC QoS parameters are the same for all streams in a TC, the TSN AF 602 provides these parameters to the PCF 410, and the PCF 410 will update the QoS profile found in the step 800 and find a new 5QI for the TC. If the additional TSC QoS parameters are different for different TSN stream(s), the TSN AF 602 provides the list of TSN streams, the identification of each TSN stream, and the additional TSC QoS parameters that apply to each list of TSN streams.

Figure 9A:
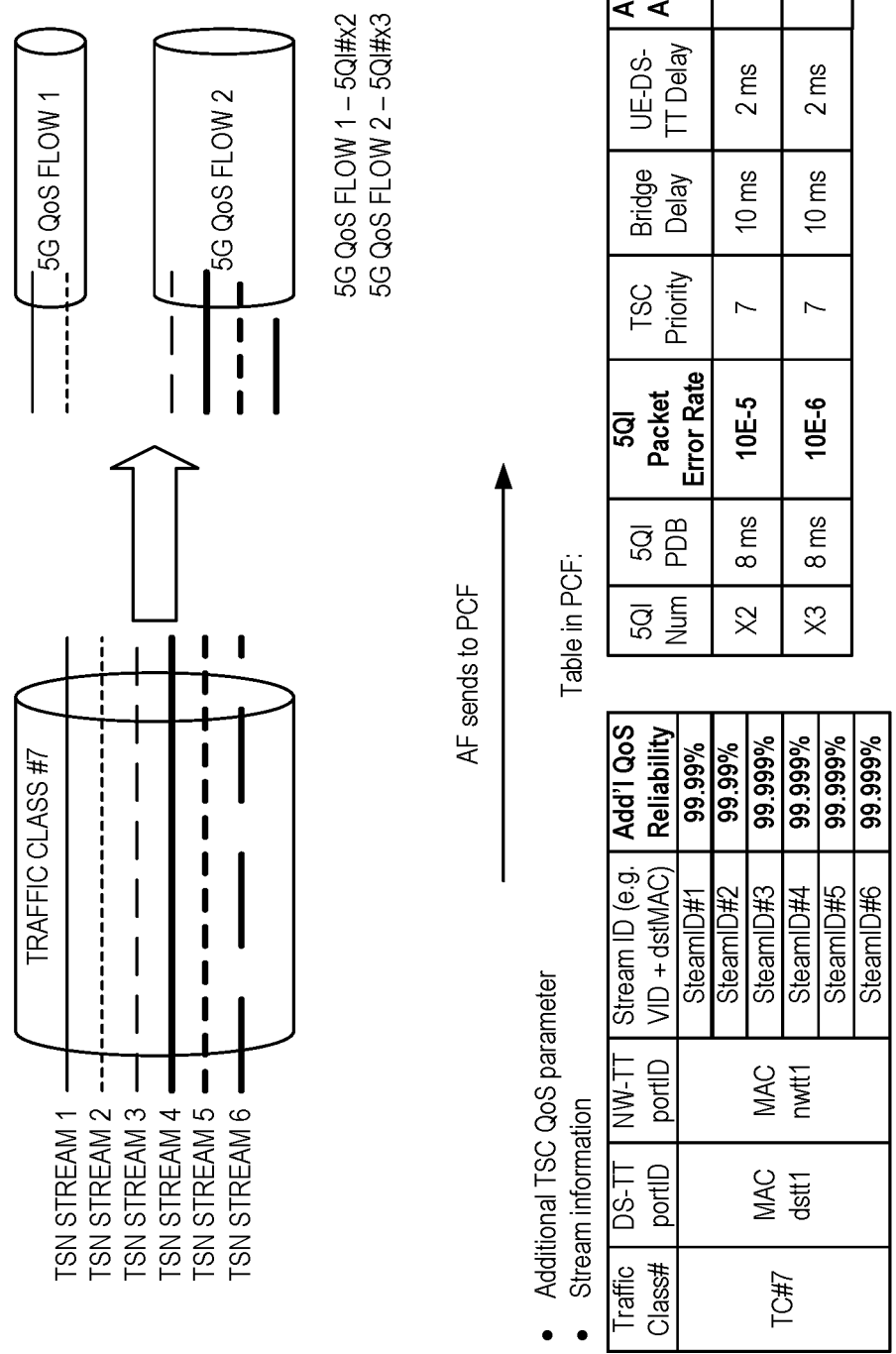
FIGS. 9A and 9B show an example QoS mapping using an additional TSC QoS parameter in accordance with one embodiment of the present disclosure.
Figure 9B:
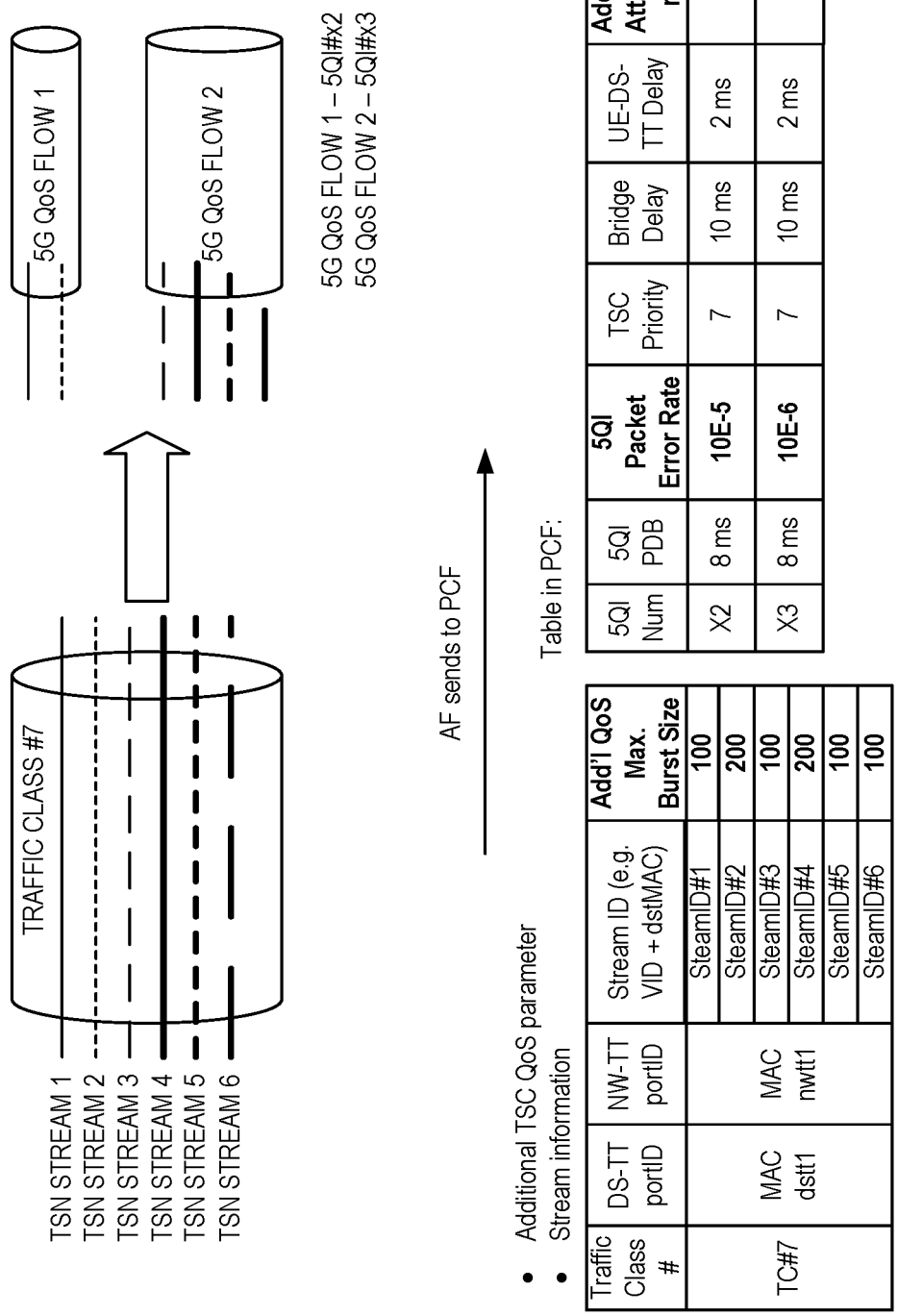

FIGS. 9A and 9B show an example QoS mapping using an additional TSC QoS parameter, 1:1 (TC: priority (PCP)), 1:x (priority(PCP):5QI), 1:1 (5QI:QoS flow). FIG. 9A shows mapping with reliability, and FIG. 9B shows mapping with maximum value of TSC burst size to Maximum Data Burst Volume (MDBV). In the example of FIGS. 9A and 9B, streams inside TC 7 may have different reliability requirements. In particular, stream #1 and #2 have a reliability requirement of 99.99%, while streams #3, #4, #5, #6 share the reliability of 99.999%. Streams #1 and #2 can be aggregated into one subgroup and mapped to a 5QI "x2", and streams #3, #4, #5, and #6 are aggregated into another subgroup and mapped to QoS profile "x3". Both QoS profiles x2 and x3 are assigned the same QoS parameters (on, e.g., priority code point and delay) except the PER. Since the TSN AF 602 also provided the TSN streamID(s) (e.g., which can be alternatively identified by Virtual Local Area Network (VLAN) Identifier (ID) and destination Medium Access Control (MAC) address of the end station), the PCF 410 is able to generate PCC rules for streamID #1#2 to use profile x2, streams #3, #4, #5, and #6 to use QoS profile x3. The Service Data Flow (SDF) template in the PCC rule allows identification of StreamIDs #1 and #2 by means of the VLAN ID and the destination MAC address.

The PCF 410 may find a 5QI matching the QoS characteristics defined in 3GPP TS 23.501 (e.g., V16.2.0 or V16.3.0), otherwise the PCF 410 may either send the PER value as well as the 5QI or may signal the full signaled QoS profile to the SMF 408, as defined in 3GPP TS 23.501.

Figure 10A:
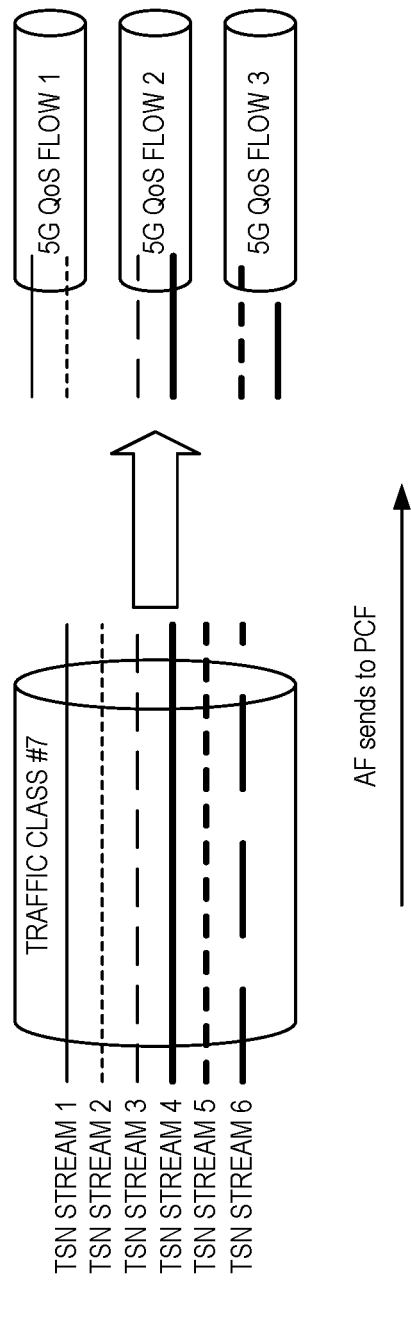
FIGS. 10A and 10B show an example of QoS mapping using additional traffic attributes (non-QoS related) in accordance with one embodiment of the present disclosure.
Figure 10B:
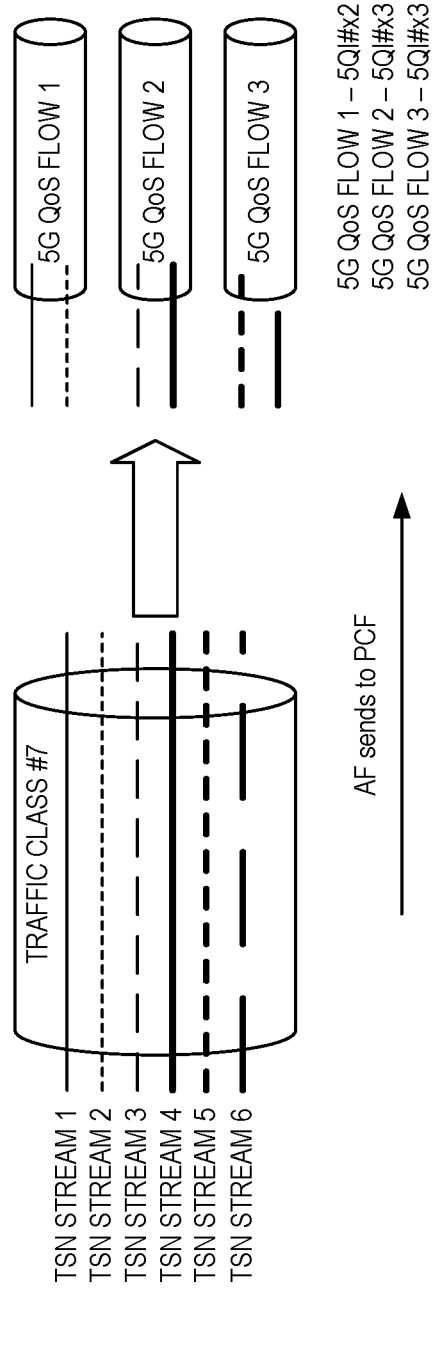

Step 804—"additional TSC traffic attributes (non-QoS)": Even if the basic TSC QoS and additional QoS parameters can be satisfied by the step 800 and step 802 mapping processes, there might be other needs for special 5G treatment (e.g., TSC streams inside a TC may need to be treated separately even if they all share the same QoS parameters). In this regard, FIGS. 10A and 10B show an example of the step 804 mapping using additional traffic attributes (non-QoS related). More specifically, FIGS. 10A and 10B illustrate an example of QoS mapping using additional traffic attributes 1:1 (TC:Priority), 1:x (priority:5QI), 1:x (5QI:QoS flow). In this example, packet/frame periodicity is used. The periodicity information distinguishes the streams #3, #4, #5, and #6 further. With the periodicity information, streams #3, #4, #5, and #6 are further divided into two groups due to the difference on periodicity value. Since streams #3, #4, #5, and #6 have the same basic and additional TSC QoS parameters, they can still share a common 5G QoS profile (x3). However, due to the periodicity difference, the 5GS may want to treat them into different QoS flows (e.g., for 5GS optimization purposes). As a result, streams #3 and #4 are mapped to 5G QoS flow#2, and streams #4 and #5 are mapped to 5G QoS flow#3. In order to achieve this, there are two options: either the PCF 410 includes a parameter "bind to a separate QoS flow" or the PCF 410 includes the "periodicity information", and then the SMF 408 binds PCC rules with the same QoS profile but different "periodicity information" to separate QoS flows.

Note 1: Step 804 can be optional. It can depend on certain pre-configuration of 5GS. For example, an operator can preconfigure certain sensitive "traffic attributes" in the PCF 410 or other 5GS nodes so that the PCF 410 or other nodes know that these attributes require special treatment (e.g., special PCC rules for transmitting in a separate QoS flow). When the PCF 410 receives such attributes from the AF 602, the PCC rules include the parameters that require a separate mapping into the PCC rule, and then the SMF 408 binds the PCC rules with the same QoS profile but different "periodicity" or "special attribute" to a PCC rule.

A use case can be that RAN nodes want to treat the TSC streams with different periodicity separately. In this case, either the RAN may indicate to the PCF 410 about the parameter, or the PCF 410 can be preconfigured with the indication of "periodicity" treatment.

Note 2: A similar mechanism may apply for Step 802, "additional TSC QoS parameters". Certain QoS parameters may be less critical, then it is optional for the PCF 410 to find an exact match of 5G QoS profiles for those additional QoS parameters.

Note 3: Steps 802 and 804 may be combined as one step.

Method 2: One-Step Mapping Operation (AF Provide All TSC QoS Parameter and Traffic Attributes to PCF in One Step)

Figure 11:
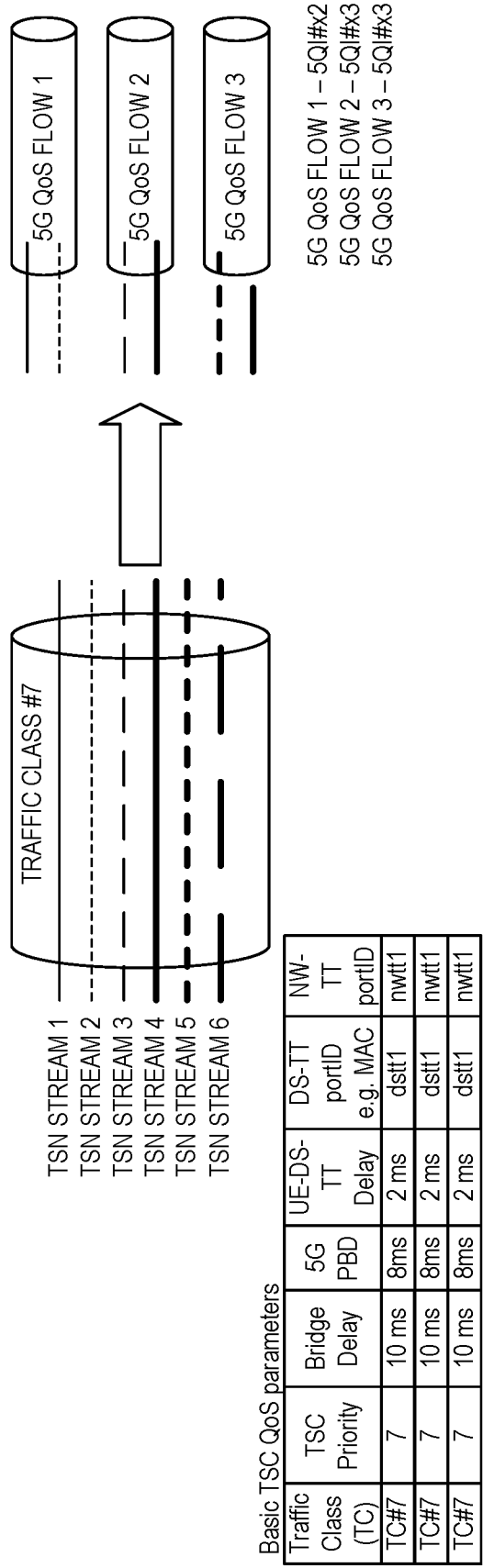
FIG. 11 illustrates an example of a one-step QoS mapping process (an example of "Method 2") with consideration of all TSC QoS parameters and traffic attributes (non-QoS related) in accordance with some embodiments of the present disclosure.

FIG. 11 illustrates an example of a one-step QoS mapping process (an example of "Method 2") with consideration of all TSC QoS parameters and traffic attributes (non-QoS related) in accordance with some embodiments of the present disclosure. In this method, the TSN AF 602 provides all basic TSC QoS parameters, additional TSC QoS parameters, and traffic attributes as well as the stream ID information to the PCF 410. The PCF 410 finds a match of 5G QoS profiles and generates PCC rules for setting up QoS flows according to the information provided by the TSN AF 602, under the considerations described above with respect to Method 1.

The difference on the additional TSC QoS attributes is an implicit indication that the TC needs to be mapped to different 5G QoS profiles. The difference on the additional traffic attributes is an implicit indication that certain TSN streams need to be mapped into one or more separate QoS flows. Some additional TSC QoS attributes and traffic attributes (non-QoS) can be preconfigured at the PCF 410 or the TSN AF 602 as an indication of needs for special 5GS configuration or treatment.

Figure 12:
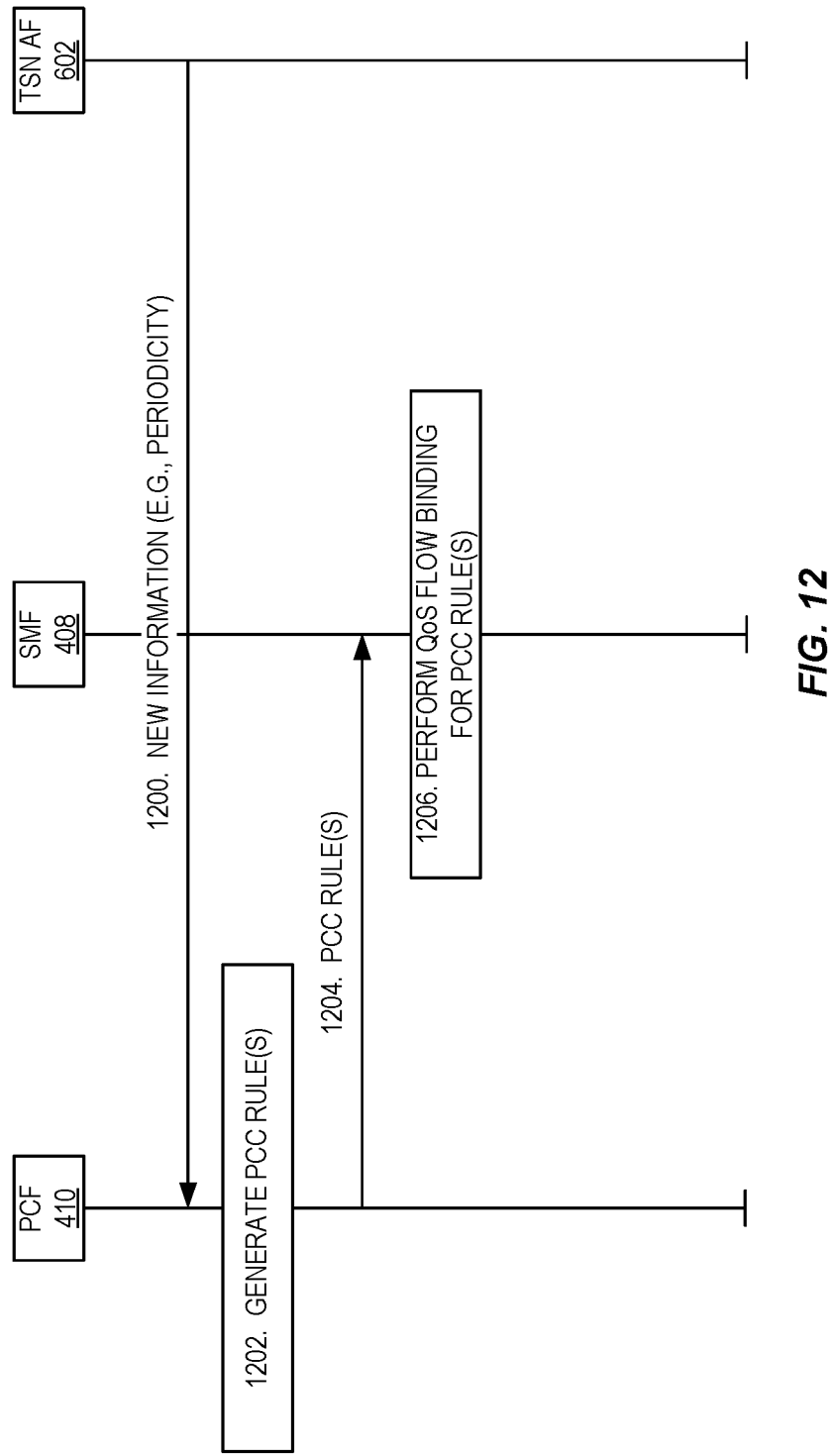
FIG. 12 illustrates a procedure that is generally applicable to both Method 1 and Method 2 in accordance with some embodiments of the present disclosure.

FIG. 12 illustrates a procedure that is generally applicable to both Method 1 and Method 2 in accordance with some embodiments of the present disclosure. As illustrated, the TSN AF 602 sends to the PCF 410 information, including baseline TSC QoS parameters (e.g., priority and/or delay) and either or both of: (a) one or more additional TSC QoS attributes (e.g., reliability and/or maximum TSC burst size) and (b) one or more additional TSC traffic attributes (e.g., periodicity) (step 1200). Based on this information, the PCF 410 performs PCC rule authorization, including QoS mapping as described above with respect to Method 1 or Method 2, to, in this example, thereby generate one or more PCC rules (step 1202). The PCF 410 sends the PCC rule(s) to the SMF 408 (step 1204). The SMF 408 then performs QoS flow binding for each of the PCC rule(s) (step 1206). Operation may then continue, e.g., in the manner currently defined in the 3GPP standards.

Method 3 (AF Does the QoS Mapping)

Figure 13:
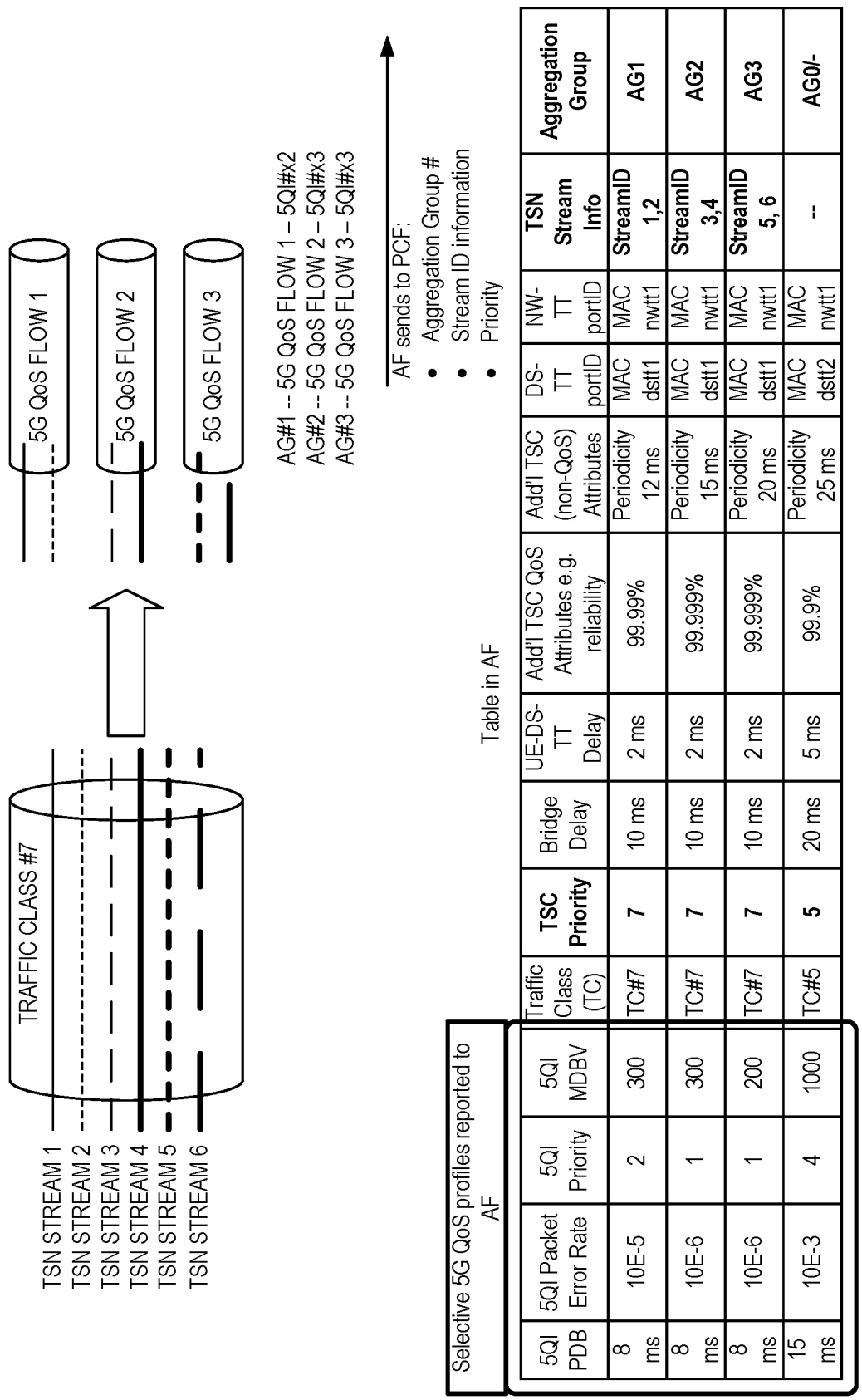
FIG. 13 illustrates an example of a method (referred to herein as "Method 3") performed by a TSN Application Function (AF) to perform QoS mapping in accordance with some embodiments of the present disclosure.

FIG. 13 illustrates an example of a method (referred to herein as "Method 3") performed by the TSN AF 602 to perform QoS mapping in accordance with some embodiments of the present disclosure. A new parameter "Aggregation group number" is introduced for the TSN AF 602 to break down a TSC TC into multiple subgroups (referred to herein as "aggregation groups" or "AGs"). Then, individual streams can be aggregated into those subgroups and handled by the 5GS. An AG consists of one or more TSC streams. AG #0 can be considered as same as a TC, which means a 5QI is assigned to a TC.

Figure 14:
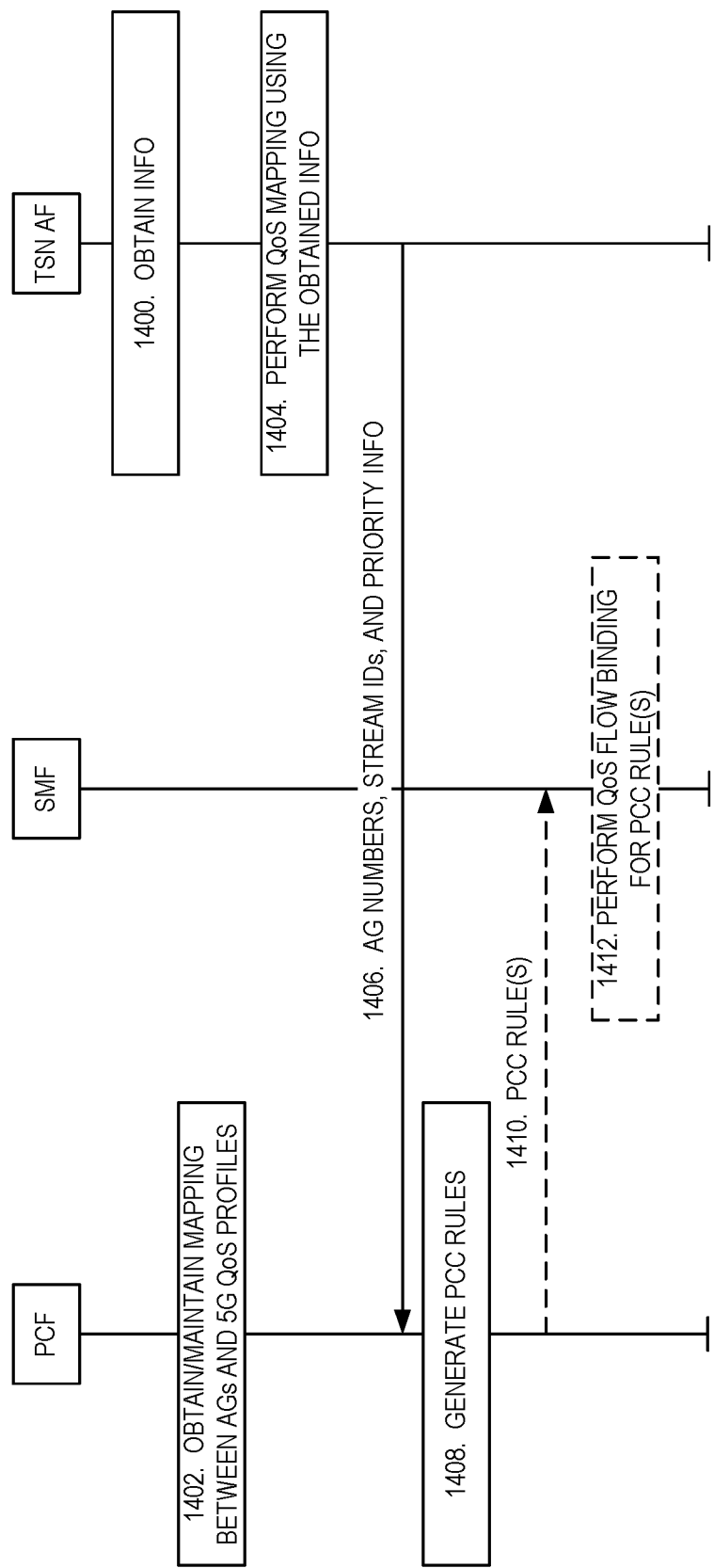
FIG. 14 illustrates the procedure of Method 3 in accordance with some embodiments of the present disclosure.

FIG. 14 illustrates the procedure of Method 3 in accordance with some embodiments of the present disclosure. The steps of the procedure are as follows:

Step 1400: The TSN AF 602 is aware of or otherwise obtains the following information:
  a. Basic TSC QoS parameter (e.g., priority and delay)
  b. Additional TSC QoS parameter (e.g., burst size, reliability/availability)
  c. Additional TSC traffic attributes (e.g., periodicity, flow direction)
  d. 5G QoS profiles that the 5GS reported to the TSN AF 602 during the capability report phase Step 1402: The PCF 410 obtains or maintains a table between Aggregation Group (AG) and 5G QoS profiles (e.g., 5QIs). The number of 5G QoS profiles that are pre-selected for TSC services can be preconfigured at the PCF 410 with a mapping to the corresponding AG# numbers. The mapping between 5QI and AG number can one to one (one 5QI maps to one AG #) or one to multiple (a 5QI can have multiple AG#s). The table is reported by the TSN AF 602 to the PCF 410 in a separate message for configuration purposes or preconfigured at the TSN AF 602. An example of mapping table is shown in FIG. 15.

Step 1404: Using the provided information, the TSN AF 602 does QoS mapping and decides if a TC needs to be broken down to handle the inside streams separately or not (i.e., the TSN AF 602 decides if TSC streams in a TC needs different 5QIs or not, and also decides if the streams that have same QoS requirement (same 5QI) need to be separated into subgroups or not). The TSN AF 602 breaks down a TC into multiple AGs, so that individual streams can be aggregated into those subgroups and handled by 5GS.

Step 1406: The TSN AF 602 provides AG numbers together with stream ID information and priority information to the PCF 410.

Step 1408: The PCF 410 uses the AG numbers for matching the correct 5QIs, and then together with StreamID and priority information to generate PCC rules for the SMF 408 to setup QoS flows.

Step 1410 (optional): The PCF 410 sends the PCC rules to the SMF 408.

Step 1412 (optional): The SMF 408 performs QoS flow binding for the PCC rules.

Method 4 (AF Decides If Certain TSN Streams Needs Special 5GS Treatment, PCF Perform QoS Related Mapping)

Method 1 and 2 are about the TSN AF 602 providing TSC information to the PCF 410, and then the PCF 410 decides whether streams inside a TC need to be mapped differently. Method 4 proposes an alternative in which the TSN AF 602 can perform an intermediate decision about whether streams need or do not need a special treatment (i.e., if a TC needs to be broken down, in which granularity the streams need to be handled in 5GS).

FIG. 13 illustrates an example of information for use when the TSN AF 602 decides if TSN streams within a TC need aggregation/regrouping or not based on TSC traffic attributes. In this example, the TSN AF 602 uses the information to decide that the streams of the TC should be broken down into three aggregation groups (AG1, AG2, and AG3). FIG. 15 is a table that is hosted in the PCF based on the TSN stream aggregation/regrouping of FIG. 13. FIG. 16 illustrates an example of information for use when the TSN AF 602 decides if a TC needs aggregation or not based on TSC traffic attributes.

Figure 17:
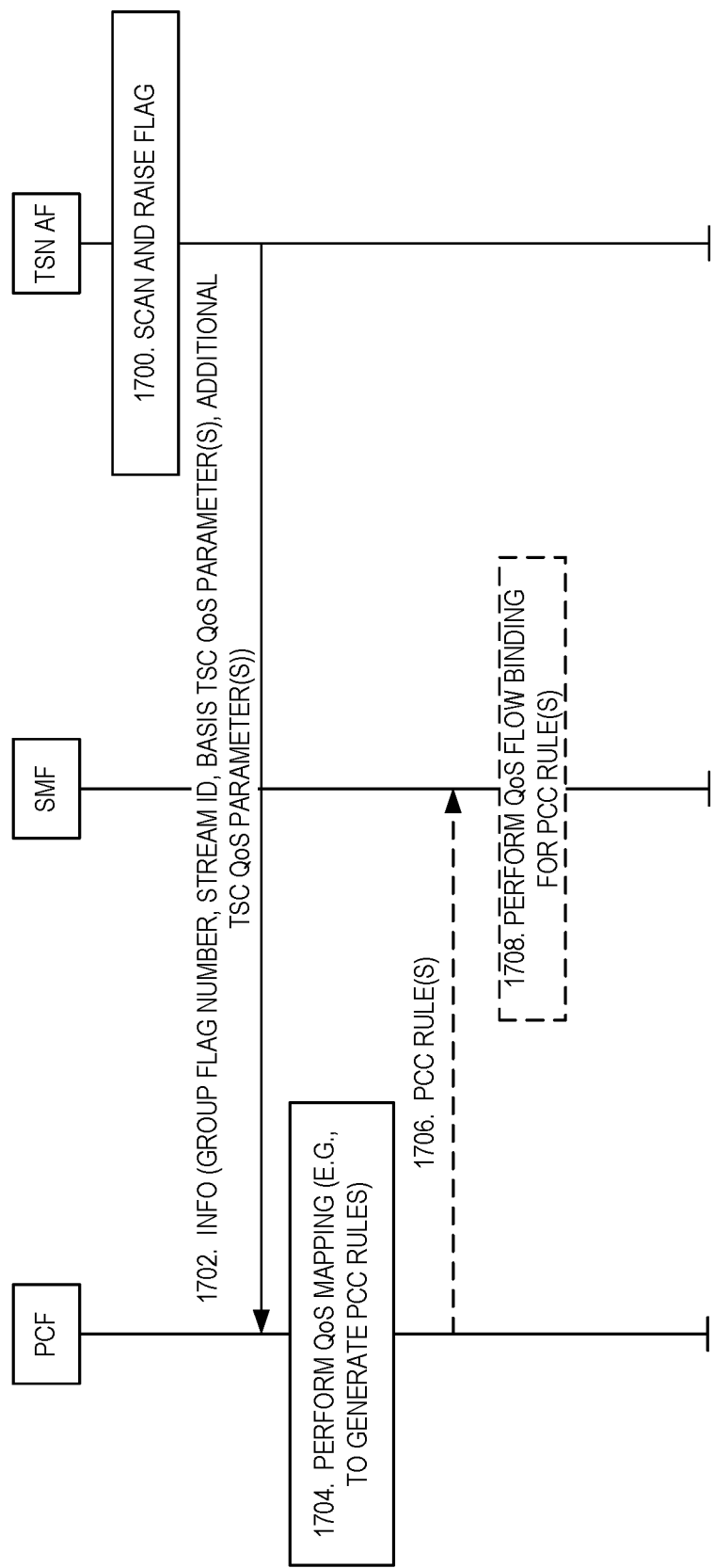
FIG. 17 illustrates the procedure of Method 4 in accordance with some embodiments of the present disclosure.

FIG. 17 illustrates the procedure of Method 4 in accordance with some embodiments of the present disclosure. The steps of the procedure are as follows:

Step 1700: The TSN AF 602 scans for the non-QoS related attributes, if TSC streams with a certain attribute that 5GS needs to treat them separately. Then, the TSN AF 602 raises a flag (Group Flag (GF)).

Note: Similar to the Note 2 and Note 3 above, 5GS nodes (e.g., RAN nodes) can optionally indicate their interested attributes (e.g., periodicity) to the TSN AF 602 via the NEF 500 if they want special configuration/treatment of those attributes. The indication can include a rank of those attributes in terms of importance.

Step 1702: The TSN AF 602 sends to the PCF 410 the following information:

GF number,

Stream ID (e.g., VLAN ID and destination MAC), and

Basic TSC QoS parameter (e.g., priority and delay) and/or additional TSC QoS parameters (e.g., "reliability/availability", "TSC burst size").

Step 1704: The PCF 410 performs QoS mapping using TSC QoS related information, and generates PCC rules using GF number, StreamID, and priority for the SMF 408 to setup QoS flows (e.g., thereby generating PCC rules).

Step 1706 (optional): The PCF 410 sends the PCC rules to the SMF 408.

Step 1708 (optional): The SMF 408 performs QoS flow binding for the PCC rules.

The advantage of Method 4 in contrast to Method 1 and 2 is that the TSN AF 602 does not need to send non-QoS related parameters to the PCF 410. In this case, the PCF 410 only handles QoS mapping (e.g., finding suitable 5G QoS profiles). The TSN AF 602 processes the non-QoS related TSC information and decides if certain TSN traffic (streams) are to be transmitted in separated QoS flows (or maybe even separate PDU sessions).

Others

As described in above on QoS mapping using basic TSC parameters, the TSN AF 602 sets a different priority for each TSN TC and this allows the SMF 408 and UPF 414 to identify the ethernet frames using the SDF that contains the priority and apply the QoS profile as provided in the PCC rule.

When the number of TCs supported by a port is smaller than eight, this means that TC and priority do not have a one to one mapping. Therefore, multiple priorities will be mapped to one TC.

When a TC contains streams with multiple priorities (PCPs), there are several ways of mapping, which are:

a. 1 TC: N priorities (PCPs): one 5QI: 1 QoS flow.

b. 1 TC: "N" priorities (PCPs): "N" 5QI: "N" QoS flow, where "N" 5QI is based on the mapping between a PCP and a "priority" value of a 5QI.

c. 1 TC: N priorities (PCPs): one 5QI: "N" QoS flow, where "N" is used to aggregate the streams that has the same PCP value into one group, and PCP can be used for flow binding.

d. 1 TC: N priorities (PCPs): one 5QI: "N" ARP, where PCP is mapped to an ARP.

In case of c above, even where traffic with different priorities can share the same QoS profile, if the 5GS wants to handle them differently (e.g., for optimization traffic scheduling), the priority value can be used for an indication of the need for separated QoS flow configuration. Then, the PCF 410 can use it for generating corresponding PCC rules. In case of c above, the PCP has a new function which needs to be sent from the PCF 410 to the SMF 408 for flow binding.

Note: 5GS nodes may indicate certain parameters to the PCF 410 or the TSN AF 602 for special treatment (e.g., individual QoS flow handling). In this case, the priority (PCP) can be such a parameter.

Figure 22:
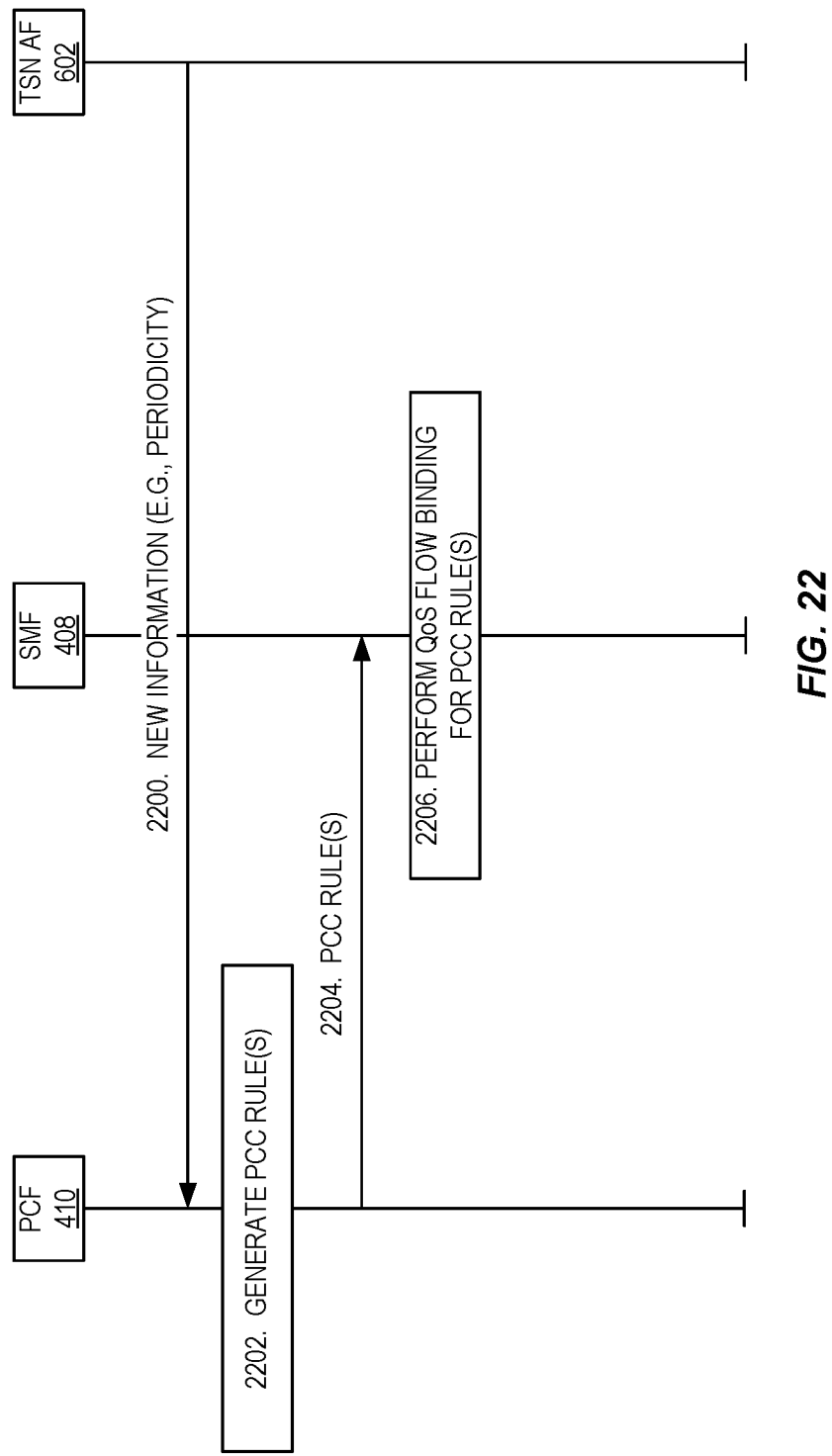
FIG. 22 illustrates the operation of a Policy Control Function (PCF), a Session Management Function (SMF), and a TSN AF in accordance with an embodiment of the present disclosure.

FIG. 22 illustrates the operation of the PCF 410, the SMF 408, and the TSN AF 602 in accordance with at least some of the first aspects described above. As illustrated, the TSN AF 602 sends information, including new information (e.g., periodicity), to the PCF 410 (step 2200). As described above, this new information may include periodicity values and stream IDs (e.g., the VLAN ID and destination MAC address of the end station) which are associated to every periodicity value. The PCF 410 can include such parameter(s), e.g., periodicity, and stream IDs in the PCC rule for QoS flow binding. Based on the new information (and optionally additional information), the PCF 410 performs PCC rule authorization to thereby generate one or more PCC rules (step 2202). As discussed above, the manner in which the PCC rule(s) are generated may vary for different cases. The PCF 410 sends the PCC rule(s) to the SMF 408 (step 2204). The SMF 408 then performs QoS flow binding for each of the PCC rule(s) (step 2206). Operation may then continue, e.g., in the manner currently defined in the 3GPP standards.

Second Aspects of the Present Disclosure

There currently exist certain challenge(s) with respect 5G-TSN interworking. The following use cases exist:

1. In current 3GPP specifications, a TSC TC is mapped to a 5QI.

a. In one use case, a TC is mapped to a 5QI, and ethernet frames in the TC are marked with the same priority (PCP) by the AF. (1 TC: one 5QI: 1 priority (PCP): 1 QoS flow)

b. In another use case, a TC is mapped to a 5QI, and ethernet frames in the same TC may be assigned different priorities (PCPs) and not a single one. In this use case, the PCC rule contains multiple priorities within the SDF template. Thus, the mapping is 1 TC: one 5QI: N priorities (PCPs): 1 QoS flow. The mapping between N priorities and 1 TC follows IEEE 802.1Q TC/priority table, i.e., from the IEEE 802.1Q perspective, those N PCPs can share one TC which corresponds to one QoS profile.

i. A variation of this use case can be as follows. Multiple PCPs can be further mapped to multiple 5QIs according to 5QI priority level or Allocation and Retention Priority (ARP) value. The IEEE 802.1Q mapping table cannot assign an individual PCP to a dedicated TC queue due to hardware queue limitations, but 5GS can provide better treatment for different PCPs even though they are in the same TC. Thus, the mapping is 1 TC: N priorities (PCPs): N 5QI: N QoS flows.
   c. A TC is mapped to a 5QI and contains traffic flows with multiple priorities. QoS flow setup is based on priorities, where these different QoS flows share the same 5QI. Thus, the mapping is 1 TC: one 5QI: N priorities (PCPs): N QoS flows.
2. A TSC TC is broken down into several TSN streams.
   a. A TSN stream (or a set of TSN streams) within the same TSN TC are mapped to different 5QIs, or
   b. A TSN stream (or a set of TSN streams) within the same TSN TC share the same 5QI value but require separate QoS flows.

3GPP TS 23.501 V16.3.0 clause 5.7.6.3 states:

---

5.7.6.3 Ethernet Packet Filter Set

For Ethernet PDU Session Type, the Packet Filter Set shall support Packet Filters based on at least any combination of:
   Source/destination MAC address.
   Ethertype as defined in IEEE 802.3.
   Customer-VLAN tag (C-TAG) and/or Service-VLAN tag (S-TAG) VID fields as defined in IEEE 802.1Q [98].
   Customer-VLAN tag (C-TAG) and/or Service-VLAN tag (S-TAG) PCP/DEI fields as defined in IEEE 802.1Q [98].
   IP Packet Filter Set, in the case that Ethertype indicates IPv4/IPv6 payload.
   Packet Filter direction.
   NOTE 1: The MAC address may be specified as address ranges.
   NOTE 2: A value left unspecified in a Packet Filter matches any value of the corresponding information in a packet.

---

Some problems are as follows:
1. The existing SDF detection allows the UPF to detect ethernet frames using the VLAN tag that is part of a SDF template. How the PCF determines which information is included in a SDF template for SDF detection is not clear.
2. Considering the above different mapping use cases, the existing parameters used for QoS flow binding are not enough.
3. How the PCF learns the different ethernet priorities of a TC, and how PCC rules interact with the TC and priority mapping table (e.g., FIG. 1) is not clear.
4. How PCC rules interact with an ethernet port of the 5GS is not clear.

In a 5GS, the physical ethernet port in some cases is independent from the PDU session and QoS flows.

Certain second aspects of the present disclosure and their embodiments may provide solutions to the aforementioned or other challenges. The second aspects of the present disclosure relate to PCC rules for QoS flow binding depending on 5G-TSC QoS mapping results.

For a one-to-one TSN/TSC TC to 5QI mapping, the PCC rule contains information for the detection of a SDF (e.g., PCP at ethernet frame header) and parameters for policy control (e.g., QoS parameters and the assigned 5QI).

If QoS mapping involves TSC stream handling (e.g., a TSN/TSC TC includes multiple TSC streams, while one or more streams need to be aggregated into several subgroups), in addition to the above information (e.g., PCP, policy control information), stream IDs and associated data frame specifications (e.g., MAC addresses, VLAN tag, IPv4-tuple, IPv6-tuple to identify the TSN stream) are needed to be included in the SDF filters.

The stream ID provides a unique identifier of the stream, and includes two elements: source MAC address and unique ID. A unique ID is used to distinguish between multiple streams within the end station.

The stream data frame specification is used to identify a stream's frames. The stream data frame specification is provided as a list of fields including: MAC addresses, VLAN tag, IPv4-tuple, and IPv6-tuple.

If multiple TSN streams need to be aggregated based on certain parameter(s) (e.g., TSC traffic periodicity, TSN streams that have the same periodicity value need to be aggregated into one QoS flow), the TSN AF 602 provides, to the PCF 410, additional information, e.g. periodicity values and stream IDs (e.g., VLAN ID, source & destination MAC address of end station) which are associated to every periodicity value. The PCF 410 can include such parameter(s), e.g. periodicity and stream IDs in the PCC rule for QoS flow binding.

The PCF 410 may need take the IEEE 802.1Q TC/priority table as an input for to generate the QoS mapping and PCC rules (e.g., SDF filters). In some cases, the IEEE 802.1Q TC and priority mapping table may need to be forward to the 5GS virtual bridge port (e.g., UPF 414 (or NW-TT 606) and the UE 312 (DS-TT 604) port). In some other cases, the PCF 410 may convert/translate the TC/priority mapping table to some other format (e.g., 5QI/priority table).

Summary of some of the second aspects of the present disclosure:
   Aspect 2(1): In some embodiments, a new parameter(s) such as "periodicity" is added in the PCC rules that are indicated from the PCF 410 to the SMF 408 compared to the PCC rules specified today in 3GPP for ethernet traffic, in order to influence the QoS flow binding performed at the SMF 408.
   Aspect 2(2): In some embodiments, when TSC stream(s) within a TC need to be aggregated in a QoS flow based on a certain TSC parameter(s) (e.g., periodicity), then stream IDs associated to the TSC parameter are included in the packet filtering set for ethernet type PDU session.
   Aspect 2(3): In some embodiments, optionally, IEEE 802.1Q traffic tables (e.g., as defined by IEEE 802.1Q clause 12.6.3 and clause 8.6.6.) can be included either as a new parameter in PCC rules or added in the packet filter set (for ethernet PDU traffic) as in 3GPP TS 23.501, clause 5.7.6.3.

In some embodiments, multiple priorities (PCPs) belong to one TC (e.g., as IEEE 802.1 TC/priority table defined), and then, when those PCPs are mapped to one 5QI, the PCF 410 considers the TC/priority mapping table for PCC rule generation, e.g. ethernet frames with those PCPs should be mapped to the same 5QI. Here, the PCF 410 considers TC/priority table.

Aspect 2(4): In some embodiments, any other TSC parameters, depending on operator configuration and if used for flow binding purpose, together with the corresponding packet filters are added to the PCC rules (e.g., as defined in TS 23.503 clause 6.1.3.2.4, and table 6.3.1).

Aspect 2(5): In some embodiments, during capability report phase, port related information (number of TCs) may be reported to multiple TSN AFs 606. Current 3GPP specifications assume only one TSN AF per UPF.

In the following, examples are provided based on an assumption that a port supports eight TCs, which gives a 1:1 mapping between TC and priority. The priority information of TSN traffic can be found in the ethernet frame header field PCP. However, the methods and mechanisms described herein can apply to any other case (e.g., number of supported TCs per port is less than eight), for which the mapping between TC and priority can refer to the IEEE 802.1Q TC and priority mapping table.

During the bridge and port capability report phase (stage/step 1), every 5GS port reports its capability of how many TCs (queues) the port can support. The "TC support" capability can be carried in the "port management information container" as defined in 3GPP TS 23.501 (see, e.g., V16.3.0).

Embodiment A1: In the 5GS, a port can be either a physical ethernet port or a virtual port. A physical ethernet port can be a DS-TT port or a NW-TT port as defined in 3GPP TS 23.501 (see, e.g., V16.3.0). A virtual port can be a PDU session or a QoS flow, or even a node (e.g., UE). The binding between a virtual port and a physical port can be one to one, or one to multiple, or multiple to one, or multiple to multiple, depending on the use cases. For example, 3GPP TS 23.501 clause 5.27 specifies that, at the UE side, a PDU session (a virtual port) is bound to a physical DS-TT port. Note that the ports recognized by the TSN system are the physical ports at DS-TT and NW-TT.

Embodiment A2: In the 5GS, the capability of "number of TC supported" (i.e., the supported number of TCs) can be also based on either physical port or a virtual port.

In the case of a physical port, the capability of number of TCs supported can be based on the number of queues that are implemented. Sometimes, it is linked to the hardware implementation, e.g. number of buffers per queue.

For a virtual port,
 if a PDU session is a virtual port, capability of number of TCs supported can be number of 5G QoS profiles or number of QoS flows;
 if a node (e.g., UE) is a virtual port, number of TCs supported can be number of PDU sessions, number of QoS profiles, or number of QoS flows.
 IEEE 802.1Q only defines that the maximum "number of queue/TC" for a port is eight. Although a virtual port can have more than eight PDU sessions, QoS profiles, and QoS flows, in order to match the IEEE use case (e.g., 5G-TSN integration), the virtual port can only report (e.g., to the TSN AF 602) a limited (maximum eight) pre-selected/preconfigured PDU sessions/QoS profiles/QoS flows, during the capability report phase.

Non-3GPP network (e.g., TSN) can use the TC support capability information for planning (e.g., generate the priority and TC mapping table).

Embodiment A3: A hold/forward buffer may be implemented per port queue/TC/5QI.

Case 1: Physical Port Traffic Class Maps to 5QI
(5GS Virtual Bridge Port is a Physical Port)

In this case, the IEEE 802.1 Q defined TC/priority mapping table can be distributed to the physical port. Meanwhile, the PCF 410 generates PCC rules. The SMF 408 binds each PCC rule to a QoS flow. The number of PCC rules sent from the PCF 410 to the SMF 408 depends on the results of QoS mapping at the PCF 410 (e.g., whether there is a need to bind SDF with the same 5QI to different QoS flows).

Figure 18:
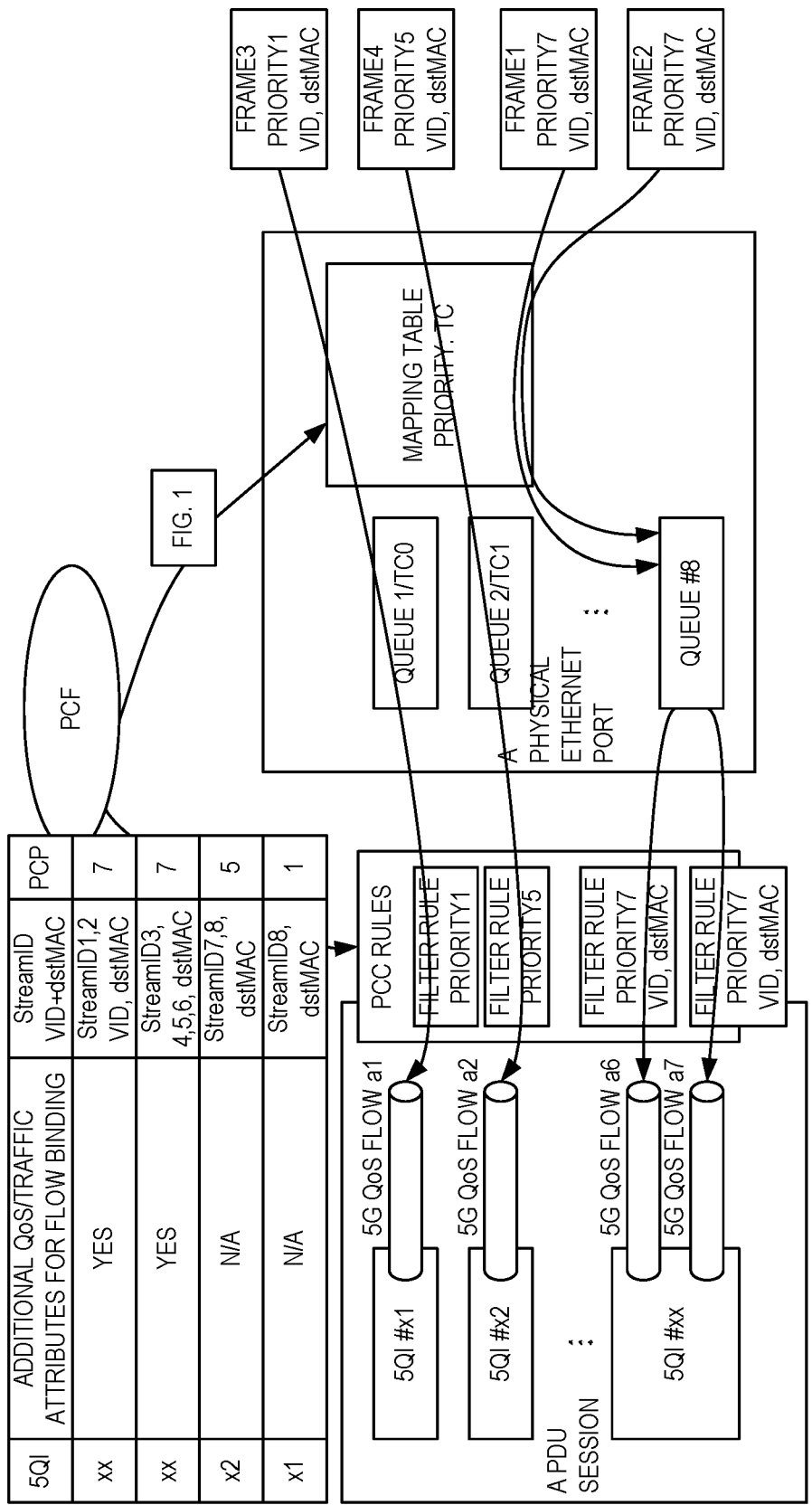
FIG. 18 shows an example in which a TC maps to a 5G QoS Identifier (5QI), the 5GS virtual bridge port is a physical port, and the port is bound to a Protocol Data Unit (PDU) session.

In this alternative, the PCF 410 may need take the IEEE 802.1Q TC/priority table as an input of QoS mapping and PCC rules, as shown in the example of FIG. 18. Specifically, FIG. 18 shows an example in which a TC maps to a 5QI, the 5GS virtual bridge port is a physical port, and the port is bound to a PDU session (the port can be either UPF side NW-TT port, or UE side DS-TT port).

For different mapping use cases, as described above:
 For 1 (a) use case, priority information is sent from the TSN AF 602 to the PCF 410. The PCF 410 has the link between TSC priority and 5QI values. Therefore, the PCC rules generated by the PCF 410 can each contain, within the SDF template, both priority (e.g., PCP at ethernet frame) and the policy control information containing the assigned 5QI.
 For 1 (b) use case, the PCC rule can contain 5QI and priority (e.g., PCP). Since the QoS mapping already decides 5QI, multiple different priorities are mapped to the same 5QI. Packet Detection Rule (PDR) detects the ethernet frames with PCPs and binds the ethernet frames to the QoS flow with 5QI included in the corresponding PCC rule.
 For 1 (c) use case, if a TC includes multiple priorities (PCPs) which are mapped to a common 5QI, but different PCPs need to be in separate QoS flows (1 TC: one 5QI: N priorities (PCPs): N QoS flows):
  The PCF 410 can include "PCP" as a binding parameter (as TS 23.503, clause 6.1.3.2.4) in the PCC rule for QoS flow binding. The PCC rule contains, within the SDF template, both multiple priorities (e.g., PCPs) and the policy control information containing the assigned 5QI. Additionally, PCPs may be added as new parameter to indicate from the PCF 410 to the SMF 408 to influence the QoS flow binding.
 For 2 (a) and (b) use cases, the PCC rule for every subgroup of TSN streams of a TC contains, within the SDF template, both priority (e.g., PCP) and the policy control information containing the assigned 5QI, and stream ID information (e.g., VLAN ID and destination MAC). PCC rules detect stream IDs using VLAN ID and destination MAC, then bind streams that are mapped to the same 5QI to a group. The priority and NW-TT and/or DS-TT ports may also be used for identifying which streams belong to which TC.

If multiple TSN streams need to be aggregated based on certain parameter(s) (e.g., TSC traffic periodicity), TSN streams that have the same periodicity value need to be aggregated into one QoS flow. The TSN AF 602 provides the PCF 410 with additional information, e.g. periodicity values and stream IDs (e.g., VLAN ID and destination MAC address of end station), which are associated to every periodicity value. The PCF 410 can include such parameter(s), e.g. periodicity, and stream IDs in the PCC rule for QoS flow binding.

Case 2: Report 5QI as Ethernet Port TC Queue (5GS Bridge Port is a Physical Port, the Port is Bound to a PDU Session)

Since the physical port and PDU session are bound together, an alternative way is simulating IEEE 802.1Q queue behavior with 5G QoS profile.

Figure 19:
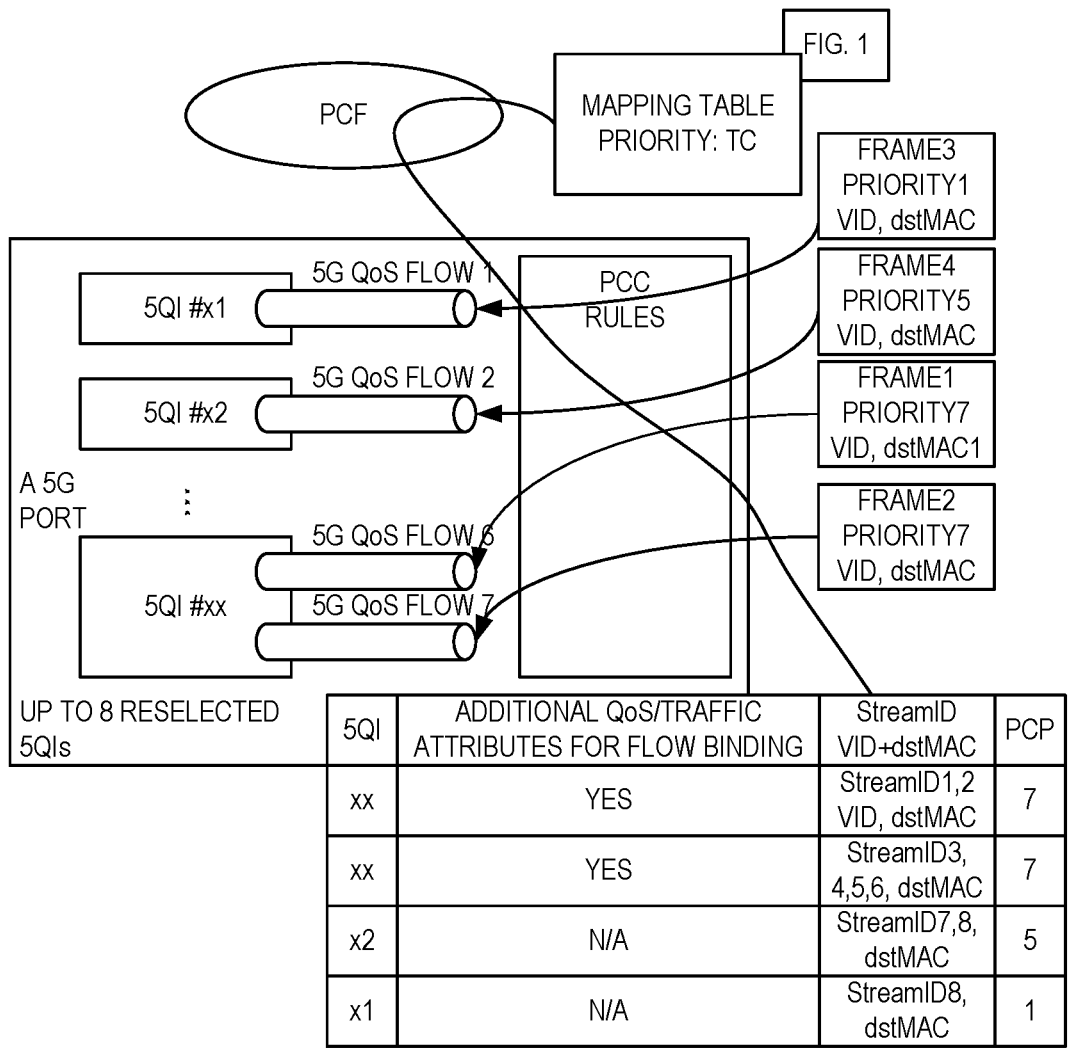
FIG. 19 shows an example in which a PDU session is a virtual 5GS bridge port, and a 5QI is reported as an ethernet TC queue (or a 5GS virtual bridge port is a physical port, the port is bound to a PDU session)

During the capability report phase, the "traffic class capability support" in 5GS may be considered similar to the "available 5G QoS profile (e.g., 5QI)" report. 5GS can report "N" (N<=8) different 5G QoS profiles between a pair of ingress/egress ports. A 5QI may correspond to a TC, as shown in the example of FIG. 19. More specifically FIG. 19 shows an example in which a PDU session is a virtual port, and a 5QI is reported as an ethernet TC queue (or if a 5GS bridge port is a physical port, the port is bound to a PDU session).

The TC and priority mapping table may be distributed to the PCF 410 via the TSN AF 602. The PCF 410 can use the table to generate PCC rules for QoS mapping and flow binding. The traditional ethernet port "queue" concept can be mapped to a 5QI; therefore, the IEEE 802.1 TC/priority mapping table is converted to 5QI/priority mapping table.

In this case, the PCC rule contains a 5G virtual bridge port ID (e.g., NW-TT port and/or DS-TT port MAC), 5QI, and priority.

If a TC is broken down into TSC streams, the PCC rule contains 5G virtual bridge port ID (e.g., NW-TT port and/or DS-TT port MAC), 5QI, priority (TSC priority, e.g. PCP), TC (TC number), and stream ID.

Note: In this case, the ethernet port may not need to be bounded to a hardware implementation of port queues. For example, even if only one queue is supported in the physical port, the 5GS can still report more than one queue, since the 5GS may be able to simulate the multiple queues using 5G QoS profile.

Case 3: a Physical Port is Shared With Multiple PDU Sessions

Figure 20:
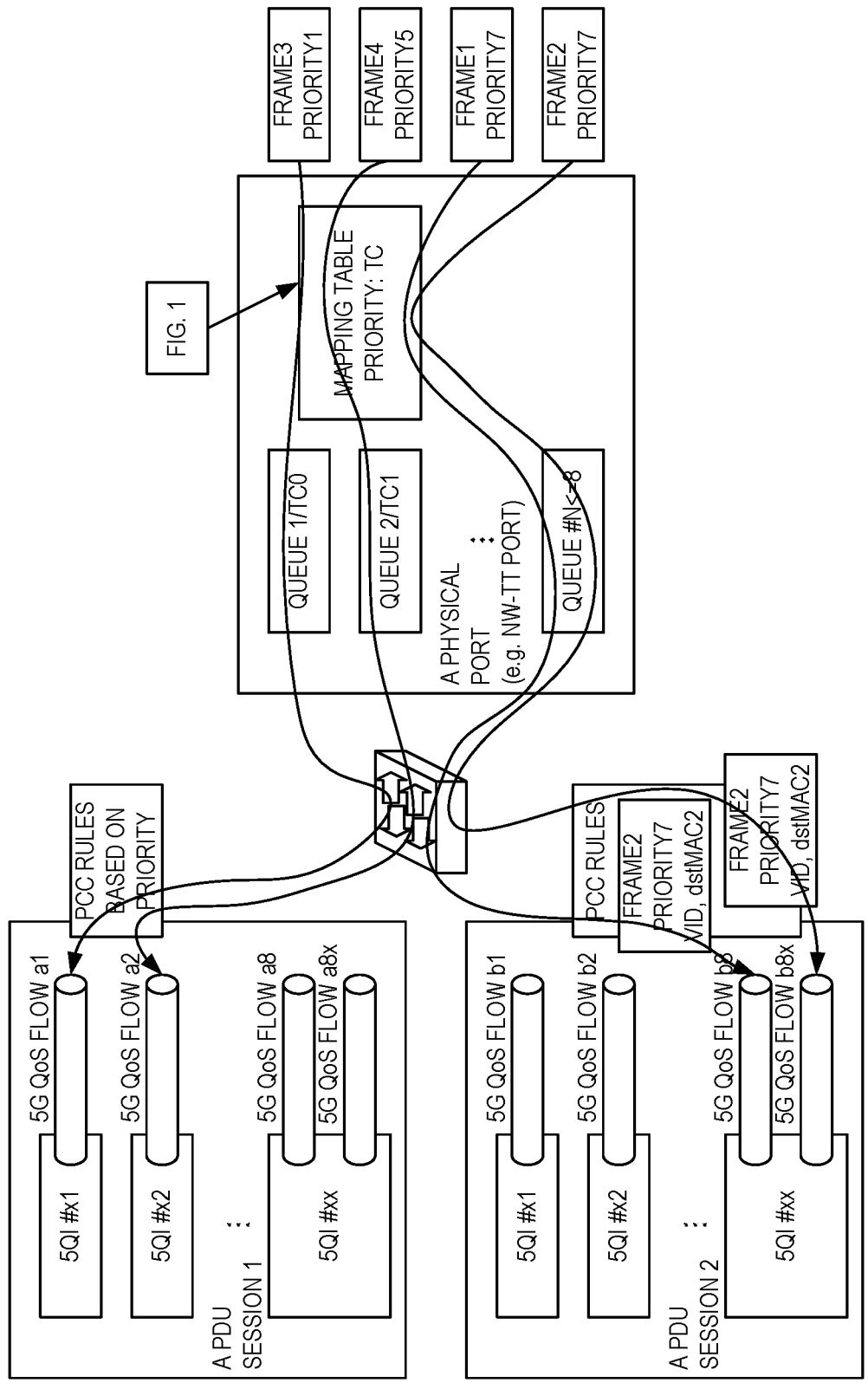
FIG. 20 shows an example in which a physical port is shared with multiple PDU sessions.

In this case, a physical ethernet port is shared by multiple PDU sessions. A physical port can report "N" (N<=8) TC queues. The 802.1Q TC/priority mapping table is sent to the physical port. In principle, the method for use case 1 introduced above can apply here. FIG. 20 shows an example.

In an example case, the UPF 414 may have an internal switch between NW-TT ports and UPF function. The internal switch may decide which frame/packet should go to which PDU session (e.g., based on destination address and network instance). Similarly, at UE side, if the UE 312 serves several DS-TTs, an internal switch can be also applied.
Variations:
Every PDU session can report "N" 5QI map to "N" TC, "N" is the same as the number of queues supported by the physical port. Every PDU session reports "N" different 5QIs (a set of 5QIs), but PDU sessions share the same set of 5QIs. For example, if eight PDU sessions are sharing one port, one value of 5QI can be mapped to one TC at physical port, but every PDU sessions of these eight can have the same 5QI value preconfigured.

Example Procedures Related to Second Aspects

Figure 21:
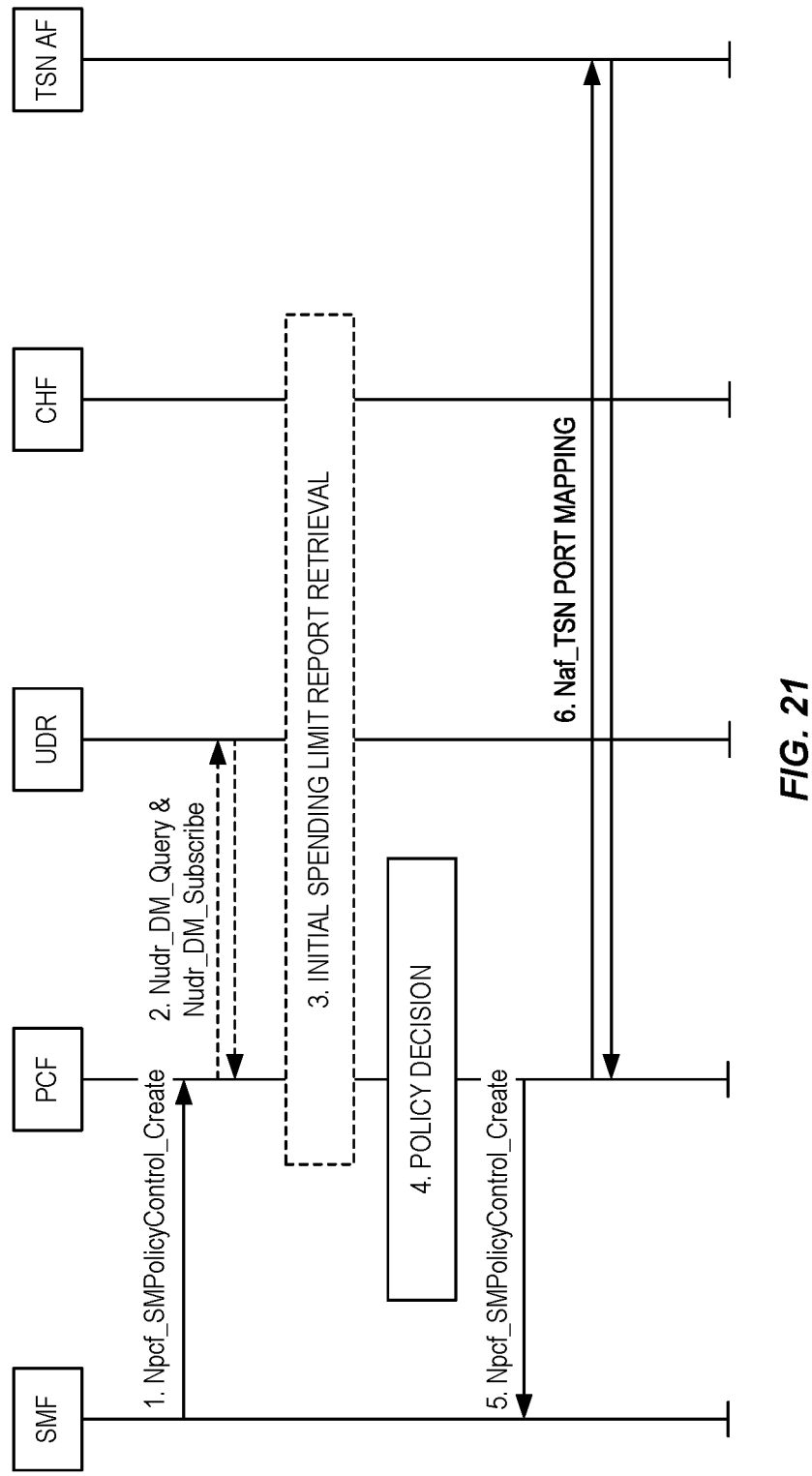
FIG. 21 illustrates a variation of the Session Management (SM) policy association establishment procedure in 3GPP TS 23.502 V16.3.0 that includes some of the second aspects of the present disclosure.

FIG. 21 illustrates a variation of the Session Management (SM) policy association establishment procedure in 3GPP TS 23.502 V16.3.0 that includes some of the second aspects of the present disclosure. Steps 1 to 5 remains as is, e.g., as specified in 3GPP TS 23.502 clause 4.16.4. In step 6, the PCF 410 sends the port information for the assigned PDU session information to the TSN AF 602, e.g., using a new service operation. The port information includes any of the port related information described above (e.g., for each port, information that indicates its capability of how many TCs (queues) the port can support). The PCF 410 sends this message to multiple TSN AFs 602, if present (there may be more than one TSN AF). Another alternative is that the SMF 408 sends the port information to the TSN AF 602 directly, and in this case the PCF 410 does not store the port mapping table.

QoS mapping and flow binding to port information (i.e., binding of QoS flows to the port information) may be performed at the TSN AF 602, the PCF 410, or the UPF 414. When the PDU session is mapped to a port that supports a number N of TCs (1<N<8), there is a need to further map the traffic to each of the TCs supported by the port (e.g., traffic with differing PCP values may need to share one TC).

Figure 30:
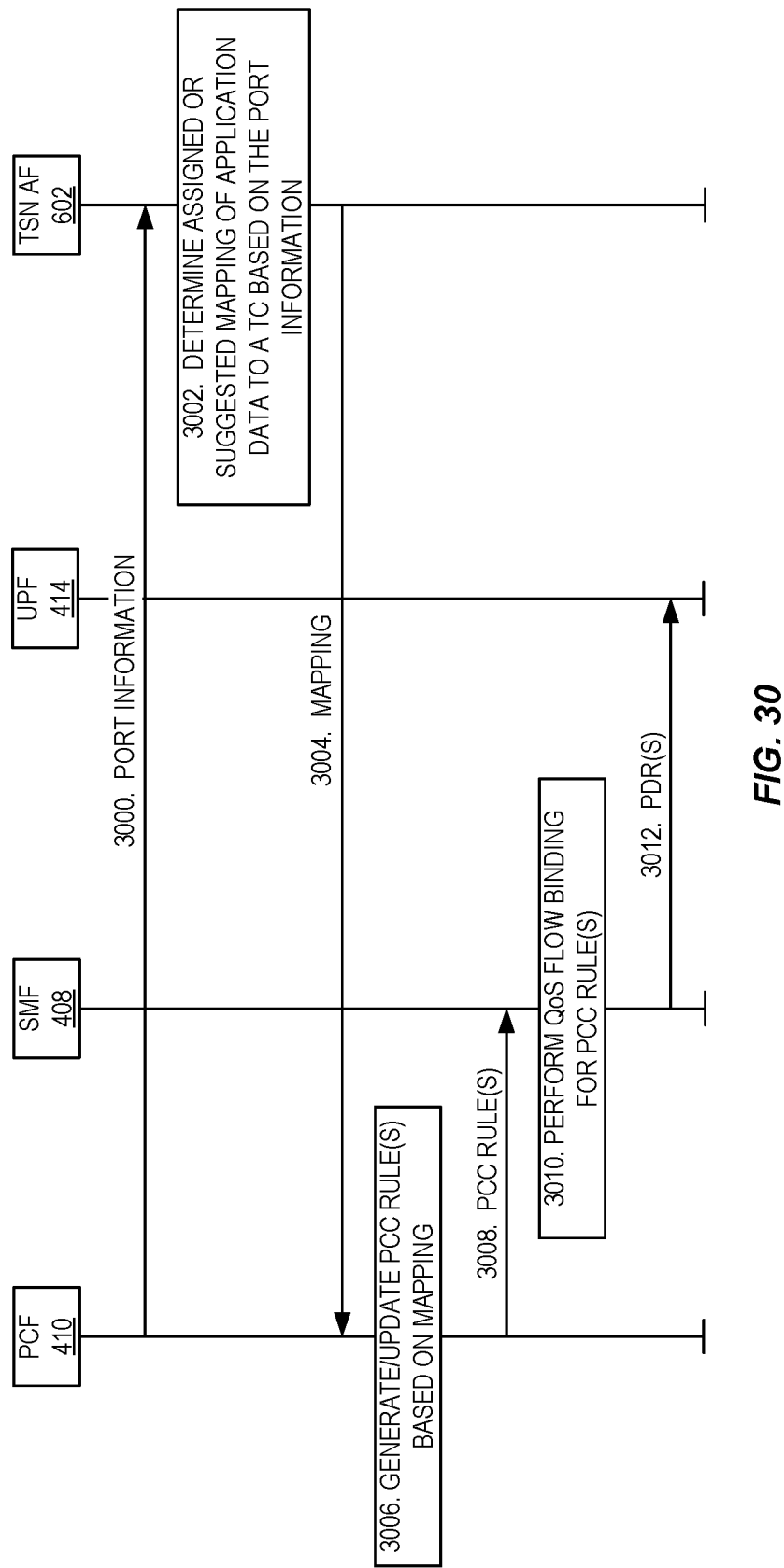
FIG. 30 illustrates the operation of a PCF, SMF, User Plane Function (UPF), and TSN AF in accordance with an embodiment of the present disclosure.
Figure 31:
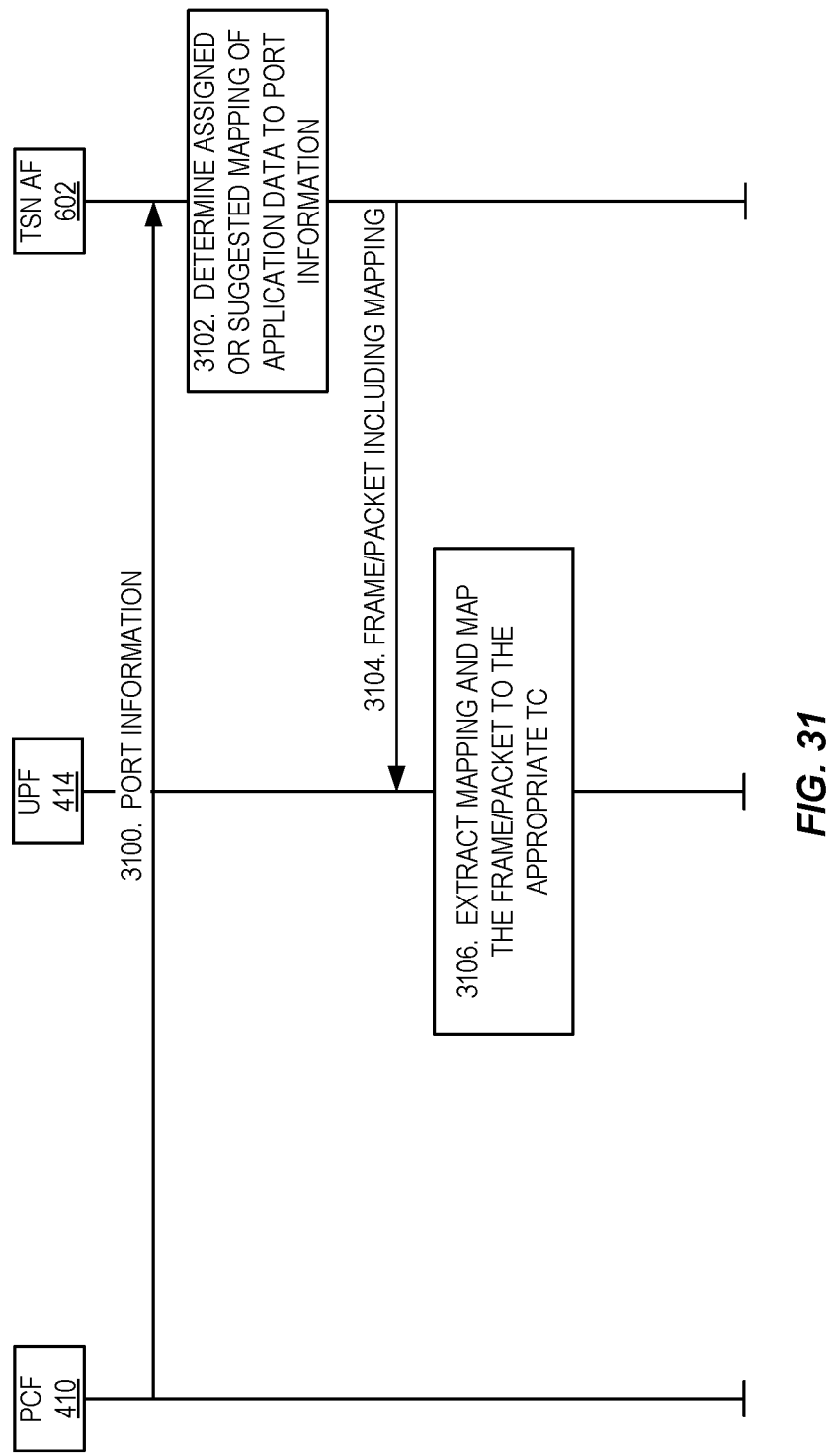
FIG. 31 illustrates the operation of a PCF, UPF, and TSN AF in accordance with another embodiment of the present disclosure.

QoS Mapping and Binding of QoS Flows to the Port Information at the TSN AF 602: As illustrated in FIG. 30, in one embodiment, the TSN AF 602 obtains the port information (e.g., number N>1 of TC supported by the physical port and their related priorities) assigned for the PDU session (step 3000). Note that the port information comes from the UE and/or UPF 414, but transparently passes through the PCF 410 to the TSN AF 602. The TSN AF 602 assigns or suggests a mapping of application data (e.g., PCP values of received packets) to one of the TCs based on the obtained port information (step 3002) and signals the mapping to the PCF 410 (step 3004). The PCF 410 uses the mapping to generate or update the PCC rules (step 3006) which are then provisioned into the SMF 408 which performs QoS flow binding (steps 3008 and 3010). The SMF 408 signals the mapping of the PDU session to the port information (i.e., TC) to the UPF 414 using an updated PDR or other appropriate mapping rule(s) (step 3012). As illustrated in FIG. 31, in another embodiment, the TSN AF 602 obtains the port information (e.g., number N>1 of TC supported by the physical port and their related priorities) assigned for the PDU session (step 3100). The TSN AF 602 assigns or suggests a mapping of the application data (e.g., PCP values of received packets) to a TC based on the port information (step 3102) and includes the mapping together with the frame/packet before transmitting downstream to the UPF 414 (step 3104). The mapping information may be included in a header field as the frame is encapsulated for transmission. Generic Routing Encapsulation (GRE) or other appropriate encapsulation mechanism can be used. The UPF 414 extracts the mapping information from the encapsulation header and maps the frame to the appropriate TC in the port (step 3106).

Figure 32:
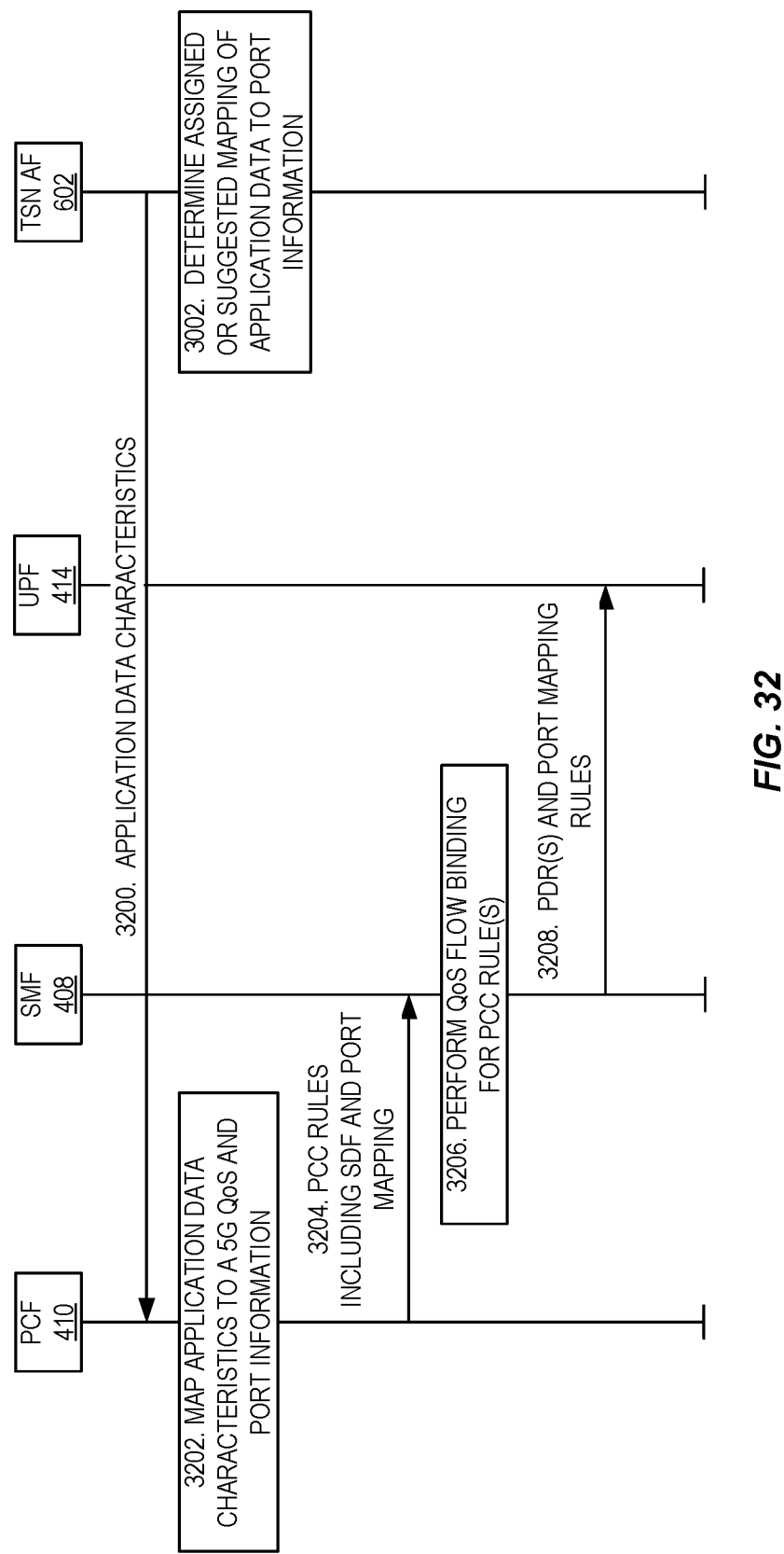
FIG. 32 illustrates the operation of a PCF, SMF, UPF, and TSN AF in accordance with another embodiment of the present disclosure.

QoS Mapping and Binding of QoS Flows to the Port Information at the PCF 410: As illustrated in FIG. 32, in this case, the TSN AF 602 provides the application data characteristics to the PCF 410 (step 3200). The PCF 410 maps the application characteristics to the 5G QoS and to the appropriate port information (step 3202) and provides the PCC rules comprising the SDF and the port mapping to the SMF W108 (step 3204). The SMF 408 performs QoS binding based on the PCC rules (step 3206) and provisions PDRs and the port mapping rules into the UPF 414 (step 3208).

QoS Mapping and Binding of QoS Flows to the Port Information at the UPF 414: If the port supports N TCs, the UPF 414 may assign a 5QI for each of the TCs based on the priority and perform the binding accordingly, else the UPF 414 can use other parameters to map the traffic of a PDU session to each TC.

A port of 5GS bridge (can be either at the UPF 414 or at UE 312 side), if it supports N TCs, and is receiving traffic that has a number M of priorities (e.g., PCP values of an ethernet frame) may operate as follows:

- When N=M, and or N>M, every priority of the received traffic corresponds to a dedicated TC, a 5QI is assigned for each of TC, each 5QI has a dedicated priority value that maps to the priority of the received traffic, and the 5GS performs the binding accordingly.
- When N<M, multiple priorities (number "x", x<M) of the received traffic may need to share one TC as follows:
  - Option (1): A 5QI is assigned for each of TC. This may lead to multiple priorities of receiving traffic sharing one 5QI.
    - Option (1a): The QoS flow binding can be based on the number of 5QIs (equivalent to flow binding based on number of TC). In this case, a QoS flow is setup for each 5QI.
    - Option (1b): The QoS flow binding can be based on received traffic priority. For example, for a TC that contains a number "x" of priorities of received traffic, a number "x" QoS flows are setup, where these QoS flows share a common 5QI.
  - Option 2: A 5QI is assigned for each priority of received traffic. If standardized 5QI is not available, customized 5QI can be created. 5GS performs flow binding accordingly.

Note that an example implementation of some of the second aspects described above is provided below as a CR to 23.502 V16.3.0.

First Change 6.1.3.23 Support of Integration With Time Sensitive Networking

Time Sensitive Networking (TSN) support is defined in TS 23.501 [2], where the 5GS represents virtual TSN bridge(s) based on the defined granularity model. The TSN AF and PCF interact to perform QoS mapping as described in clause 5.28.4 of TS 23.501 [2].

The PCF provides the following parameters to the TSN AF: Port Management Container, port numbers associated with the NW-TT and DS-TT, and a UE MAC address (i.e. MAC address of the DS-TT port). The TSN AF may use this information to construct IEEE managed objects, to interwork with IEEE TSN networks.

The TSN AF decides the TSN QoS information (i.e. priority, delay and maximum TSC burst size) based on the received the configuration information of 5GS Bridge from the CNC as defined in clause 5.28.2 of TS 23.501 [2] and the bridge delay information at the TSN AF.

The PCF receives a request from the TSN AF that includes UE MAC address (i.e. MAC address of the DS-TT port) for PDU session and the TSN QoS parameters, i.e. priority and delay. The PCF performs Session binding using the UE MAC address, and then the PCF derives the TSN QoS parameters into a 5QI. The PCF generates a PCC Rule with service data flow filter containing the UE MAC address and the mapped 5QI. The SMF binds the PCC Rule to a QoS Flow as defined in clause 6.1.3.2.4. If multiple TSN Streams need to be aggregated based on the same periodicity and traffic class as described in TS 23.501 clause 5.27.2. TSN AF provides PCF additional information e.g. periodicity values and Stream IDs (i.e. VLAN ID and destination MAC address of end station) which are associated to every periodicity value. PCF can include periodicity and stream IDs in the PCC Rules for QoS flow binding.

Second Change 6.1.3.2.4 QoS Flow Binding

QoS Flow binding is the association of a PCC rule to a QoS Flow within a PDU Session. The binding is performed using the following binding parameters:

- 5QI;
- ARP;
- QNC (if available in the PCC rule);
- Priority Level (if available in the PCC rule);
- Averaging Window (if available in the PCC rule);
- Maximum Data Burst Volume (if available in the PCC rule).
- TSCAI peridocity (if available in the PCC rule);

When the PCF provisions a PCC Rule, the SMF shall evaluate whether a QoS Flow with QoS parameters identical to the binding parameters exists unless the PCF requests to bind the PCC rule to the QoS Flow associated with the default QoS rule. If no such QoS Flow exists, the SMF derives the QoS parameters, using the parameters in the PCC Rule, for a new QoS Flow, binds the PCC Rule to the QoS Flow and then proceeds as described TS 23.501 [2] clause 5.7. If a QoS Flow with QoS parameters identical to the binding parameters exists, the SMF updates the QoS Flow, so that the new PCC Rule is bound to this QoS Flow.

NOTE 1: For PCC rules containing a delay critical GBR 5QI value, the SMF can bind PCC Rules with the same binding parameters to different QoS Flows to ensure that the GFBR of the QoS Flow can be achieved with the Maximum Data Burst Volume of the QoS Flow.

The SMF shall identify the QoS Flow associated with the default QoS rule based on the fact that the PCC rule(s) bound to this QoS Flow contain:

- 5QI and ARP values that are identical to the PDU Session related information Authorized default 5QI/ARP; or
- a Bind to QoS Flow associated with the default QoS rule and apply PCC rule parameters Indication.

NOTE 2: The Bind to QoS Flow associated with the default QoS rule and apply PCC rule parameters Indication has to be used whenever the PDU Session related information Authorized default 5QI/ARP (as described in clause 6.3.1) cannot be directly used as the QoS parameters of the QoS Flow associated with the default QoS rule, for example when a GBR 5QI is used or the 5QI priority level has to be changed.

When a QoS Flow associated with the default QoS rule exists, the PCF can request that a PCC rule is bound to this QoS Flow by including the Bind to QoS Flow associated with the default QoS rule Indication in a dynamic PCC rule. In this case, the SMF shall bind the dynamic PCC rule to the QoS Flow associated with the default QoS rule (i.e. ignoring the binding parameters) and keep the binding as long as this indication remains set. When the PCF removes the association of a PCC rule to the QoS Flow associated with the default QoS rule, a new binding may need to be created between this PCC rule and the QoS Flow as described above.

The binding created between a PCC Rule and a QoS Flow causes the downlink part of the service data flow to be directed to the associated QoS Flow at the UPF (as described in TS 23.501 [2] clause 5.7.1). In the UE, the QoS rule associated with the QoS Flow (which is generated by the SMF and explicitly signalled to the UE as described in TS 23.501 [2] clause 5.7.1) instructs the UE to direct the uplink part of the service data flow to the QoS Flow in the binding.

Whenever the authorized QoS of a PCC rule changes, the existing bindings shall be re-evaluated. The re-evaluation may, for a service data flow, require a new binding with another QoS Flow.

NOTE 2: A QoS change of the PDU Session related information Authorized default 5QI/ARP values doesn't cause the QoS Flow rebinding for PCC rules with the Bind to QoS Flow associated with the default QoS rule Indication set.

When the PCF removes a PCC Rule, the SMF shall remove the association of the PCC Rule to the QoS Flow.

The SMF shall report to the PCF that the PCC Rules bound to a QoS Flow are removed when the corresponding QoS Flow is removed.

Third Change 6.3 Policy and Charging Control Rule 6.3.1 General

The Policy and charging control rule (PCC rule) comprises the information that is required to enable the user plane detection of, the policy control and proper charging for a service data flow. The packets detected by applying the service data flow template of a PCC rule form a service data flow.

Two different types of PCC rules exist: Dynamic rules and predefined rules. The dynamic PCC rules are provisioned by the PCF to the SMF, while the predefined PCC rules are configured into the SMF, as described in TS 23.501 [2], and only referenced by the PCF.

NOTE 1: The procedure for provisioning predefined PCC rules is out of scope for this specification.

The operator defines the PCC rules.

Table 6.3.1 lists the information contained in a PCC rule, including the information name, the description and whether the PCF may modify this information in a dynamic PCC rule which is active in the SMF. The Category field indicates if a certain piece of information is mandatory or not for the construction of a PCC rule, i.e. if it is possible to construct a PCC rule without it.

The differences with table 6.3 in TS 23.203 [4] are shown, either "none" means that the IE applies in 5GS or "removed" meaning that the IE does not apply in 5GS, this is due to the lack of support in the 5GS for this feature or "modified" meaning that the IE applies with some modifications defined in the IE.

TABLE 6.3.1

The PCC rule information in 5GC

| Information name | Description | Category | PCF permitted to modify for a dynamic PCC rule in the SMF | Differences compared with table 6.3. in TS 23.203 [4] |
|---|---|---|---|---|
| Rule identifier | Uniquely identifies the PCC rule, within a PDU Session. It is used between PCF and SMF for referencinq PCC rules. | Mandatory | No | None |
| Service data flow detection | This part defines the method for detecting packets belonging to a service data flow. | | | |
| Precedence | Determines the order, in which the service data flow templates are applied at service data flow detection, enforcement and charging. (NOTE 1). | Conditional (NOTE 2) | Yes | None |
| Service data flow template | For IP PDU traffic: Either a list of service data flow filters or an application identifier that references the corresponding application detection filter for the detection of the service data flow. For Ethernet PDU traffic: Combination of traffic patterns of the Ethernet PDU traffic. It is defined in TS 23.501 [2], clause 5.7.6.3 | Mandatory (NOTE 3) | Conditional (NOTE 4) | Modified (packet filters for Ethernet PDU traffic added) |
| IEEE 802.1Q Traffic class table | IEEE 802.1Q clause 12.6.3 and clause 8.6.6. | | | added |
| Mute for notification | Defines whether application's start or stop notification is to be muted. | Conditional (NOTE 5) | No | None |
| Charging | This part defines identities and instructions for charging and accounting that is required for an access point where flow based charging is configured | | | |

TABLE 6.3.1-continued

The PCC rule information in 5GC

| Information name | Description | Category | PCF permitted to modify for a dynamic PCC rule in the SMF | Differences compared with table 6.3. in TS 23.203 [4] |
|---|---|---|---|---|
| Charging key (NOTE 22) | The charging system (CHF) uses the charging key to determine the tariff to apply to the service data flow. | | Yes | None |
| Service identifier | The identity of the service or service component the service data flow in a rule relates to. | | Yes | None |
| Sponsor Identifier | An identifier, provided from the AF which identifies the Sponsor, used for sponsored flows to correlate measurements from different users for accounting purposes. | Conditional (NOTE 6) | Yes | None |
| Application Service Provider Identifier | An identifier, provided from the AF which identifies the Application Service Provider, used for sponsored flows to correlate measurements from different users for accounting purposes. | Conditional (NOTE 6) | Yes | None |
| Charging method | Indicates the required charging method for the PCC rule. Values: online, offline or neither. | Conditional (NOTE 7) | No | None |
| Service Data flow handling while requesting credit | Indicates whether the service data flow is allowed to start while the SMF is waiting for the response to the credit request. Only applicable for charging method online. Values: blocking or non-blocking | | No | New |
| Measurement method | Indicates whether the service data flow data volume, duration, combined volume/duration or event shall be measured. This is applicable to reporting, if the charging method is online or offline. Note: Event based charging is only applicable to predefined PCC rules and PCC rules used for application detection filter (i.e. with an application identifier). | | Yes | None |
| Application Function Record Information | An identifier, provided from the AF, correlating the measurement for the Charging key/Service identifier values in this PCC rule with application level reports. | | No | None |
| Service Identifier Level Reporting | Indicates that separate usage reports shall be generated for this Service Identifier. Values: mandated or not required | | Yes | None |
| Policy control | This part defines how to apply policy control for the service data flow. | | | |
| Gate status | The gate status indicates whether the service data flow, detected by the service data flow template, may pass (Gate is open) or shall be discarded (Gate is closed). | | Yes | None |
| 5G QoS Identifier (5QI) | The 5QI authorized for the service data flow. | Conditional (NOTE 10) | Yes | Modified (corresponds to QCI in TS 23.203 [4]) |
| QoS Notification Control (QNC) | Indicates whether notifications are requested from 3GPP RAN when the GFBR can no longer (or can again) be guaranteed for a QoS Flow during the lifetime of the QoS Flow. | Conditional (NOTE 15) | Yes | Added |
| Reflective QoS Control | Indicates to apply reflective QoS for the SDF. | | Yes | Added |
| UL-maximum bitrate | The uplink maximum bitrate authorized for the service data flow | | Yes | None |
| DL-maximum bitrate | The downlink maximum bitrate authorized for the service data flow | | Yes | None |
| UL-guaranteed bitrate | The uplink guaranteed bitrate authorized for the service data flow | | Yes | None |
| DL-guaranteed bitrate | The downlink guaranteed bitrate authorized for the service data flow | | Yes | None |

TABLE 6.3.1-continued

The PCC rule information in 5GC

| Information name | Description | Category | PCF permitted to modify for a dynamic PCC rule in the SMF | Differences compared with table 6.3. in TS 23.203 [4] |
|---|---|---|---|---|
| UL sharing indication | Indicates resource sharing in uplink direction with service data flows having the same value in their PCC rule | | No | None |
| DL sharing indication | Indicates resource sharing in downlink direction with service data flows having the same value in their PCC rule | | No | None |
| Redirect | Redirect state of the service data flow (enabled/disabled) | Conditional (NOTE 8) | Yes | None |
| Redirect Destination | Controlled Address to which the service data flow is redirected when redirect is enabled | Conditional (NOTE 9) | Yes | None |
| ARP | The Allocation and Retention Priority for the service data flow consisting of the priority level, the pre-emption capability and the pre-emption vulnerability | Conditional (NOTE 10) | Yes | None |
| Bind to QoS Flow associated with the default QoS rule | Indicates that the dynamic PCC rule shall always have its binding with the QoS Flow associated with the default QoS rule (NOTE 11). | | Yes | Modified (corresponds to bind to the default bearer in TS 23.203 [4]) |
| Bind to QoS Flow associated with the default QoS rule and apply PCC rule parameters | Indicates that the dynamic PCC rule shall always have its binding with the QoS Flow associated with the default QoS rule. It also indicates that the that the QoS related attributes of the PCC rule shall be applied to derive the QoS parameters of the QoS Flow associated with the default QoS rule instead of the PDU Session related parameters Authorized default 5QI/ARP. | Conditional (NOTE 17) | Yes | Added |
| PS to CS session continuity | Indicates whether the service data flow is a candidate for vSRVCC. | | | Removed |
| Priority Level | Indicates a priority in scheduling resources among QoS Flows (NOTE 14). | | Yes | Added |
| Averaging Window | Represents the duration over which the guaranteed and maximum bitrate shall be calculated (NOTE 14). | | Yes | Added |
| Maximum Data Burst Volume | Denotes the largest amount of data that is required to be transferred within a period of 5G-AN PDB (NOTE 14). | | Yes | Added |
| TSCAI periodicity | Denotes the the time Deriod between start of two bursts as defined in TS 23.501 cluase 5.27.2 | | Yes | Added |
| Access Network Information Reporting | This part describes access network information to be reported for the PCC rule when the corresponding QoS Flow is established, modified or terminated. | | | |
| User Location Report | The serving cell of the UE is to be reported. When the corresponding QoS Flow is deactivated, and if available, information on when the UE was last known to be in that location is also to be reported. | | Yes | None |
| UE Timezone Report | The time zone of the UE is to be reported. | | Yes | None |
| Usage Monitoring Control | This part describes identities required for Usage Monitoring Control. | | | None |
| Monitoring key (NOTE 23) | The PCF uses the monitoring key to group services that share a common allowed usage. | | Yes | None |

TABLE 6.3.1-continued

The PCC rule information in 5GC

| Information name | Description | Category | PCF permitted to modify for a dynamic PCC rule in the SMF | Differences compared with table 6.3. in TS 23.203 [4] |
|---|---|---|---|---|
| Indication of exclusion from session level monitoring | Indicates that the service data flow shall be excluded from PDU Session usage monitoring | | Yes | None |
| N6-LAN Traffic Steering Enforcement Control (NOTE 18) | This part describes information required for N6-LAN Traffic Steering. | | | |
| Traffic steering policy identifier(s) | Reference to a pre-configured traffic steering policy at the SMF (NOTE 12). | | Yes | None |
| AF influenced Traffic Steering Enforcement Control (NOTE 18) | This part describes information required for AF influenced Traffic Steering. | | | |
| Data Network Access Identifier | Identifier(s) of the target Data Network Access (DNAI). It is defined in TS 23.501 [2], clause 5.6.7. | | Yes | Added |
| Per DNAI: Traffic steering policy identifier | Reference to a pre-configured traffic steering policy at the SMF (NOTE 19). | | Yes | Added |
| Per DNAI: N6 traffic routing information | Describes the information necessary for traffic steering to the DNAI. It is described in TS 23.501 [2], clause 5.6.7 (NOTE 19). | | Yes | Added |
| Information on AF subscription to UP change events | Indicates whether notifications in case of change of UP path are requested and optionally indicates whether acknowledgment to the notifications shall be expected (as defined in TS 23.501 [2] clause 5.6.7). | | Yes | Added |
| Indication of UE IP address preservation | Indicates UE IP address should be preserved. It is defined in TS 23.501 [2], clause 5.6.7. | | Yes | Added |
| Indication of traffic correlation | Indicates that the target PDU Sessions should be correlated via a common DNAI in the user plane. It is described in TS 23.501 [2], clause 5.6.7. | | Yes | Added |
| NBIFOM related control Information | This part describes PCC rule information related with NBIFOM | | | |
| Allowed Access Type | The access to be used for traffic identified by the PCC rule | | | Removed |
| RAN support information | This part defines information supporting the RAN for e.g. handover threshold decision. | | | |
| UL Maximum Packet Loss Rate | The maximum rate for lost packets that can be tolerated in the uplink direction for the service data flow. It is defined in TS 23.501 [2], clause 5.7.2.8. | Conditional (NOTE 13) | Yes | None |
| DL Maximum Packet Loss Rate | The maximum rate for lost packets that can be tolerated in the downlink direction for the service data flow. It is defined in TS 23.501 [2], clause 5.7.2.8. | Conditional (NOTE 13) | Yes | None |
| MA PDU Session Control (NOTE 20) | This part defines information supporting control of MA PDU Sessions | | Yes | New |
| Steering Functionality | Indicates the applicable traffic steerinq functionality. | Conditional (NOTE 21) | Yes | New |
| Steering mode | Indicates the rule for distributing traffic between accesses together with associated parameters (if any). | Conditional (NOTE 21) | Yes | New |
| Charging key for Non-3GPP access (NOTE 22) | Indicates the Charging key used for charging packets carried via Non-3GPP access for a MA PDU Session. | | Yes | New |

TABLE 6.3.1-continued

The PCC rule information in 5GC

| Information name | Description | Category | PCF permitted to modify for a dynamic PCC rule in the SMF | Differences compared with table 6.3. in TS 23.203 [4] |
|---|---|---|---|---|
| Monitoring key for Non-3GPP access (NOTE 23) | Indicates the Monitoring key used to monitor usage of the packets carried via Non-3GPP access for a MA PDU Session. | | Yes | New |
| QoS Monitoring for URLLC | This part describes PCC rule information related with QoS Monitoring for URLLC. | | | |
| QoS parameter(s) to be measured | UL packet delay, DL packet delay or round trip packet delay. | | Yes | Added |
| Reporting frequency | Defines the frequency for the reporting, such as event triggered, periodic, or when the PDU Session is released. | | Yes | Added |
| Target of reporting | Defines the target of the QoS Monitoring reports, it can be either the PCF or the AF, decided by the PCF. | | Yes | Added |
| Alternative QoS Parameter Sets (NOTE 24) | This part defines Alternative QoS Parameter Sets for the service data flow. | | | |
| 5G QoS Identifier (5QI) | The 5QI in this Alternative QoS Parameter Set. | | Yes | Modified (corresponds to QCI in TS 23.203 [4]) |
| UL-maximum bitrate | The uplink maximum bitrate in this Alternative QoS Parameter Set. | | Yes | None |
| DL-maximum bitrate | The downlink maximum bitrate in this Alternative QoS Parameter Set. | | Yes | None |
| UL-guaranteed bitrate | The uplink guaranteed bitrate in this Alternative QoS Parameter Set. | | Yes | None |
| DL-guaranteed bitrate | The downlink guaranteed bitrate in this Alternative QoS Parameter Set. | | Yes | None |
| TSN AF QoS container | This part defines parameters provided by TSN AF. Following are the parameters: Burst Arrival Time - Indicates the burst arrival time in reference to TSN GM and ingress port. Periodicity The time period (in reference to TSN GM) between start of two bursts. Flow Direction: Direction of the flow. | | No | Added |

NOTE 1:
For PCC rules based on an application detection filter, the precedence is only relevant for the enforcement, i.e. when multiple PCC rules overlap, only the enforcement, reporting of application starts and stops, monitoring, and charging actions of the PCC rule with the highest precedence shall be applied.
NOTE 2:
The Precedence is mandatory for PCC rules with SDF template containing SDF filter(s). For dynamic PCC rules with SDF template containing an application identifier, the precedence is either preconfigured in SMF or provided in the PCC rule from PCF.
NOTE 3:
Either service data flow filter(s) or application identifier shall be defined per each rule.
NOTE 4:
YES, in case the service data flow template consists of a set of service data flow filters. NO in case the service data flow template consists of an application identifier
NOTE 5:
Optional and applicable only if application identifier exists within the rule.
NOTE 6:
Applicable to sponsored data connectivity.
NOTE 7:
Mandatory if there is no default charging method for the PDU Session.
NOTE 8:
Optional and applicable only if application identifier exists within the rule.
NOTE 9:
If Redirect is enabled.
NOTE 10:
Mandatory when Bind to QoS Flow associated with the default QoS rule is not present.
NOTE 11:
The presence of this attribute causes the 5QI/ARP/QNC/Priority Level/Averaging Window/Maximum Data Burst Volume of the rule to be ignored for the QoS Flow binding.
NOTE 12:
The Traffic steering policy identifier can be different for uplink and downlink direction. If two Traffic steering policy identifiers are provided, then one is for uplink direction, while the other one is for downlink direction.

TABLE 6.3.1-continued

The PCC rule information in 5GC

| Information name | Description | Category | PCF permitted to modify for a dynamic PCC rule in the SMF | Differences compared with table 6.3. in TS 23.203 [4] |
|---|---|---|---|---|

NOTE 13:
Optional and applicable only for voice service data flow in this release.
NOTE 14:
Optional and applicable only when a value different from the standardized value for this 5QI in Table 5.7.4-1 TS 23.501 [2] is required.
NOTE 15:
Optional and applicable only for GBR service data flow.
NOTE 16:
Usage of the charging information in described in TS 32.255 [21].
NOTE 17:
Only one PCC rule can contain this attribute and this PCC rule shall not contain the attribute Bind to QoS Flow associated with the default QoS rule.
NOTE 18:
Only one of the two shall be present in a PCC rule.
NOTE 19:
Per DNAI, a Traffic steering policy identifier and/or N6 traffic routing information can be provided. If the pre-configured traffic steering policy (that is referenced by the Traffic steering policy identifier) contains information that is overlapping with the N6 traffic routing information, the N6 traffic routing information shall take precedence.
NOTE 20:
Only applicable to a PCC Rules provided to a MA PDU session.
NOTE 21:
Mandatory when MA PDU Session Control information is provided.
NOTE 22:
When a Charging key for Non-3GPP access is provided, the parameters in the Charging Clause (other than the Charging key) apply to both accesses and the Charging key (in the Charging Section) shall be used for charging packets carried via the 3GPP access.
NOTE 23:
When a Monitoring key for Non-3GPP access is provided, the Monitoring key (in the Usage Monitoring Control Section) shall be used to monitor usage of the packets carried via the 3GPP access.
NOTE 24:
Optional and applicable only for GBR service data flow with QoS Notification Control enabled.
The Rule identifier shall be unique for a PCC rule within a PDU Session. A dynamically provided PCC rule that has the same Rule identifier value as a predefined PCC rule shall replace the predefined rule within the same PDU Session.
The Precedence defines in what order the activated PCC rules within the same PDU Session shall be applied at the UPF for service data flow detection. When a dynamic PCC rule and a predefined PCC rule have the same precedence, the dynamic PCC rule takes precedence.
NOTE 2:
The operator shall ensure that overlap between the predefined PCC rules can be resolved based on precedence of each predefined PCC rule in the SMF. The PCF shall ensure that overlap between the dynamically allocated PCC rules can be resolved based on precedence of each dynamically allocated PCC rule.
For downlink packets all the service data flow templates, activated for the PDU Session shall be applied for service data flow detection and for the mapping to the correct QoS Flow. For uplink packets the service data flow templates activated on their QoS Flow shall be applied for service data flow detection (further details are provided in clause 6.2.2.2).
The Service data flow template may comprise any number of Service data flow filters or an application identifier as is defined in table 6.3.1.
NOTE 3:
Predefined PCC rules may include service data flow templates, which support extended capabilities, including enhanced capabilities to identify events associated with application protocols.
A Service data flow filter contains information for matching user plane packets for IP PDU traffic or Ethernet PDU traffic. All Service data flow filters of a Service data flow template shall be of the same type, i.e. either Packet Filters for IP or Ethernet PDU traffic (defined in TS 23.501 [2] clause 5.7.6). The Service data flow template information within an activated PCC rule is applied by the SMF to instruct the UPF to identify the packets belonging to a particular service data flow.
For the IP PDU Session type only, the Service data flow template may consist of an application identifier that references an application detection filter that is used for matching user plane packets. The application identifier is also identifying the application, for which the rule applies. The same application identifier value can occur in a dynamic PCC rule and one or multiple predefined PCC rules. If so, the PCF shall ensure that there is at most one PCC rule active per application identifier value at any time.
The Mute for notification defines whether notification to the PCF of application's starts or stops shall be muted. Absence of this parameter means that start/stop notifications shall be sent.
The Charging key is the reference to the tariff for the service data flow. Any number of PCC Rules may share the same charging key value. The Charging key values for each service shall be operator configurable.
NOTE 4:
Assigning the same Charging key for several service data flows implies that the charging does not require the credit management to be handled separately.
The Service identifier identifies the service. PCC Rules may share the same service identifier value. The service identifier provides the most detailed identification, specified for flow-based charging, of a service data flow.
NOTE 5:
The PCC rule service identifier need not have any relationship to service identifiers used on the AF level, i.e. is an operator policy option.
The Sponsor Identifier indicates the (3rd) party organization willing to pay for the operator's charge for connectivity required to deliver a service to the end user.
The Application Service Provider Identifier indicates the (3rd) party organization delivering a service to the end user.
The Charging method indicates whether online charging, offline charging, or both are required, or the service data flow is not subject to any end user charging. If the charging method identifies that the service data flow is not subject to any end user charging, a Charging key shall not be included in the PCC rule for that service data flow, along with other charging related parameters. If the charging method is omitted the SMF shall apply the default charging method provided within the PDU Session related policy information (see clause 6.4). The Charging method is mandatory if there is no default charging method for the PDU Session.
The Service Data Flow handling while requesting credit indicates either "blocking" if a credit for the Charging Key needs to be granted as a condition for the PCC Rule to be active or "non-blocking" if a credit for the Charging Key has been requested as a condition for the PCC Rule to be active.
The Measurement method indicates what measurements apply to charging for a PCC rule.
The Service Identifier Level Reporting indicates whether the SMF shall generate reports per Service Identifier. The SMF shall accumulate the measurements from all PCC rules with the same combination of Charging key/Service Identifier values in a single report.
The Application Function Record Information identifies an instance of service usage. A subsequently generated usage report (i.e. CDR), generated as a result of the PCC rule by the SMF, may include the Application Function Record Information, if available. The Application Function Record Information may contain the AF Charging Identifier and/or the Flow identifiers. If exclusive charging information related to the Application function record information is required, the PCF shall provide a service identifier, not used by any other PCC rule of the PDU Session at this point in time, for the AF session.
NOTE 6:
For example, the PCF may be configured to maintain a range of service identifier values for each service which require exclusive per instance charging information. Whenever a separate counting or credit management for an AF session is required, the PCF shall select a value, which is not used at this point in time, within that range. The uniqueness of the service identifier in the SMF ensures a separate accounting/credit management while the AF record information identifies the instance of the service.

TABLE 6.3.1-continued

The PCC rule information in 5GC

| Information name | Description | Category | PCF permitted to modify for a dynamic PCC rule in the SMF | Differences compared with table 6.3. in TS 23.203 [4] |
|---|---|---|---|---|

The Gate indicates whether the SMF shall instruct the UPF to let a packet identified by the PCC rule pass through (gate is open) to discard the packet (gate is closed).
NOTE 7:
A packet, matching a PCC Rule with an open gate, may be discarded due to credit management reasons.
The 5G QoS Identifier, 5QI, represents the QoS parameters for the service data flow. The 5G QoS identifier is scalar and accommodates the need for differentiating QoS in both 3GPP and non-3GPP access type.
The bitrates indicate the authorized bitrates at the IP packet level of the SDF, i.e. the bitrates of the IP packets before any access specific compression or encapsulation.
The UL maximum-bitrate indicates the authorized maximum bitrate for the uplink component of the service data flow.
The DL maximum-bitrate indicates the authorized maximum bitrate for the downlink component of the service data flow.
The UL guaranteed-bitrate indicates the authorized guaranteed bitrate for the uplink component of the service data flow.
The DL guaranteed-bitrate indicates the authorized guaranteed bitrate for the downlink component of the service data flow.
The 'Maximum bitrate' is used for enforcement of the maximum bit rate that the SDF may consume, while the 'Guaranteed bitrate' is used by the SMF to determine resource allocation demands.
The UL sharing indication indicates that resource sharing in uplink direction for service data flows with the same value in their PCC rule shall be applied by the SMF as described in clause 6.2.2.4.
The DL sharing indication indicates that resource sharing in downlink direction for service data flows with the same value in their PCC rule shall be applied by the SMF as described in clause 6.2.2.4.
The Allocation and Retention Priority indicates the allocation, retention and priority of the service data flow. The ARP contains information about the priority level, the pre-emption capability and the pre-emption vulnerability. The Allocation and Retention Priority resolves conflicts of demands for network resources.
The Priority Level is signalled together with the 5QI to the (R)AN and UPF, only when a value different from the standardized value in the QoS characteristics Table 5.7.4-1 in TS 23.501 [2] is required.
The Averaging Window is signalled together with the 5QI to the (R)AN and UPF, only when a value different from the standardized value in the QoS characteristics Table 5.7.4-1 in TS 23.501 [2] is required.
The Maximum Data Burst Volume is signalled together with the 5QI to the (R)AN, only when a value different from the standardized value in the QoS characteristics Table 5.7.4-1 in TS 23.501 [2] is required.
The Bind to QoS Flow associated with the default QoS rule indicates that the SDF shall be bound to the QoS Flow associated with the default QoS rule. The presence of this parameter attribute causes the 5QI/ARP of the rule to be ignored by the SMF during the QoS Flow binding.
The Bind to QoS Flow associated with the default QoS rule and apply PCC rule parameters indicates that the SDF shall be bound to the QoS Flow associated with the default QoS rule and that the QoS related attributes of the PCC rule shall be applied by the SMF to derive the QoS parameters of the QoS Flow associated with the default QoS rule instead of the PDU Session related information Authorized default 5QI/ARP.
NOTE 8:
The Bind to QoS Flow associated with the default QoS rule and apply PCC rule parameters Indication has to be used whenever the PDU Session related information Authorized default 5QI/ARP (as described in clause 6.3.1) cannot be directly used as the QoS parameters of the QoS Flow associated with the default QoS rule, for example when a GBR 5QI is used or the 5QI priority level has to be changed.
The QoS Notification Control, QNC, indicates whether notifications are requested from the access network (i.e. 3GPP RAN) when the GFBR can no longer (or can again) be guaranteed for a QoS Flow during the lifetime of the QoS Flow. If it is set and the GFBR can no longer (or can again) be guaranteed, the access network (i.e. 3GPP RAN) sends a notification towards the SMF, which then notifies the PCF.
The Reflective QoS Control indicates to apply reflective QoS for the service data flow. The indication is used to control the RQI marking in the DL packets of the service data flow and may trigger the sending of the RQA parameter for the QoS Flow the service data flow is bound to. Reflective QoS is defined in TS 23.501 [2] clause 5.7.5.
NOTE 9:
While the UE applies a standardized value for the precedence of all UE derived QoS rules, PCC rules require different precedence values and PCF configuration has to ensure that there is a large enough value range for the precedence of PCC rules corresponding to UE derived QoS rules. To avoid that the precedence of network provided QoS rules need to be changed when Reflective QoS is activated and filters are overlapping, the PCF will take the standardized value for the precedence of UE derived QoS rules into account when setting the precedence value of PCC rules subject to Reflective QoS.
The Reflective QoS Control parameter shall not be used for the PCC rule with match-all SDF template. If PCC rule with match-all SDF template is present, the Reflective QoS Control parameter shall not be used for PCC rules which contain the Bind to QoS Flow of the default QoS rule parameter, either.
The N6-LAN Traffic Steering Enforcement Control contains Traffic steering policy identifier(s) for steering traffic onto N6-LAN to the appropriate N6 service functions deployed by the operator.
The access network information reporting parameters (User Location Report, UE Timezone Report) instruct the SMF about what information to forward to the PCF when the PCC rule is activated, modified or removed.
The Monitoring Key is the reference to a resource threshold. Any number of PCC Rules may share the same monitoring key value. The monitoring key values for each service shall be operator configurable.
The Indication of exclusion from session level monitoring indicates that the service data flow shall be excluded from the PDU Session usage monitoring.
The AF influenced Traffic Steering Enforcement Control contains:
a set of DNAI(s) (i.e. a reference to the DNAI(s) the SMF needs to consider for UPF selection/reselection), an optional Indication of traffic correlation and, per DNAI, a corresponding Traffic steering policy identifier (i.e. a reference to a pre-configured traffic steering policy at the SMF), and/or a corresponding N6 traffic routing information (when the N6 traffic routing information is provided explicitly as part of the AF influence request, as described in TS 23.501 [2], clause 5.6.7), or;
an AF subscription to UP change events parameter which contains subscription information defined in TS 23.502 [3] clause 5.2.8.3 for the change of UP path Event Id i.e. an Indication of early and/or late notification and information on where to provide the corresponding notifications (Notification Target Address + Notification Correlation ID as specified in TS 23.502 [3] clause 4.15.1) and optionally an indication of "AF acknowledgment to be expected" to the corresponding notifications as described in TS 23.501 [2], clause 5.6.7.
The Traffic Steering Enforcement Control may contain Indication of UE IP address preservation. The SMF takes this indication into account when determining whether to reselect PSA UPF, as specified in TS 23.501 [2], clause 5.6.7.
The Redirect indicates whether the uplink part of the service data flow should be redirected to a controlled address.
The Redirect Destination indicates the target redirect address when Redirect is enabled.
The UL Maximum Packet Loss Rate indicates the maximum rate for lost packets that can be tolerated in the uplink direction.
The DL Maximum Packet Loss Rate indicates the maximum rate for lost packets that can be tolerated in the downlink direction.
The Steering Functionality indicates the method for how traffic matching the SDF template is sent over the MA PDU Session. The method ATSSS_LL indicates that the traffic matching the SDF template is sent over the MA PDU Session without additional tunnelling, e.g. with IP flow switching. The method MPTCP indicates that the traffic matching the SDF template is sent over the MA PDU Session using MPTCP.
The Steering mode indicates the rule for distributing traffic between accesses, together with the associated parameters. The PCF may indicate separate values for up-link and down-link directions. The available steering modes are defined in TS 23.501 [2].
The Charging key for Non-3GPP access indicates the Charging key that shall be used for charging the detected service data flow traffic carried via Non-3GPP access. The other charging related parameters apply for both accesses.
The Monitoring key for Non-3GPP access indicates the Monitoring key that shall be used for monitoring the usage of the detected service data flow traffic carried via Non-3GPP access.
The QoS parameter(s) to be measured indicates the UL packet delay, DL packet delay or round trip packet delay between the UE and the UPF is to be monitored when the QoS Monitoring for URLLC is enabled for the service data flow.
The Reporting frequency indicates the frequency for the reporting, such as event triggered, periodic, or when the PDU Session is released.
The following applies:
If the Reporting frequency indicates "periodic", the reporting time period shall also be included in the PCC rule.

TABLE 6.3.1-continued

The PCC rule information in 5GC

| Information name | Description | Category | PCF permitted to modify for a dynamic PCC rule in the SMF | Differences compared with table 6.3. in TS 23.203 [4] |
|---|---|---|---|---|

If the Reporting frequency indicates "event triggered", the Reporting threshold(s) and the minimum waiting time shall also be included in the PCC rule. The Reporting threshold(s) indicates the measurement threshold for each of the included QoS parameter(s) to be measured, i.e. the UL packet delay, DL packet delay or round trip packet delay. When Reporting threshold(s) is exceeded, the UPF shall report to the SMF and the SMF shall report to the PCF or to the AF. If more than one value is received at one given point of time for UL packet delay, DL packet delay or round trip packet delay respectively, the SMF reports the minimum and maximum packet delays to the PCF or the AF. The SMF sends the first report when the Reporting threshold is exceeded and the minimum waiting time is applied for the subsequent report (if the threshold is exceeded after the waiting time).
The Target of reporting indicates the target for the QoS Monitoring reports sent as notifications. It can be either the PCF or the AF (the NEF may be on the path between SMF and AF). The PCF shall include Notification Target Address + Notification Correlation ID as specified in TS 23.502 [3] clause 4.15.1.
The Alternative QoS Parameter Set(s) define alternative set(s) of QoS parameters for the service data flow. Every set consists of a 5QI, an UL and a DL maximum-bitrate as well as an UL and a DL guaranteed-bitrate QoS parameter.
The TSN AF container contains the following parameters:
The Burst Arrival Time is sent to the SMF to indicate burst arrival time at the ingress port of 5GS for a given flow direction (DS-TT for UL, NW-TT for DL). It is used by the SMF to determine TSCAI burst arrival time as defined in TS 23.501 [2], clause 5.27.2 to assist transmission of deterministic flows on Uu.
The Periodicity is sent to the SMF to indicate the time between bursts. It is used by the SMF to forward to RAN as part of TSCAI in order to assist transmission of deterministic flows on Uu.
The Flow direction is sent to SMF to indicate the direction of the flow (UL or DL).
\*\*\*\*\*\*\*\*\*\* END OF CHANGES \*\*\*\*\*\*\*\*\*

Further Aspects of the Disclosure

Figure 23:
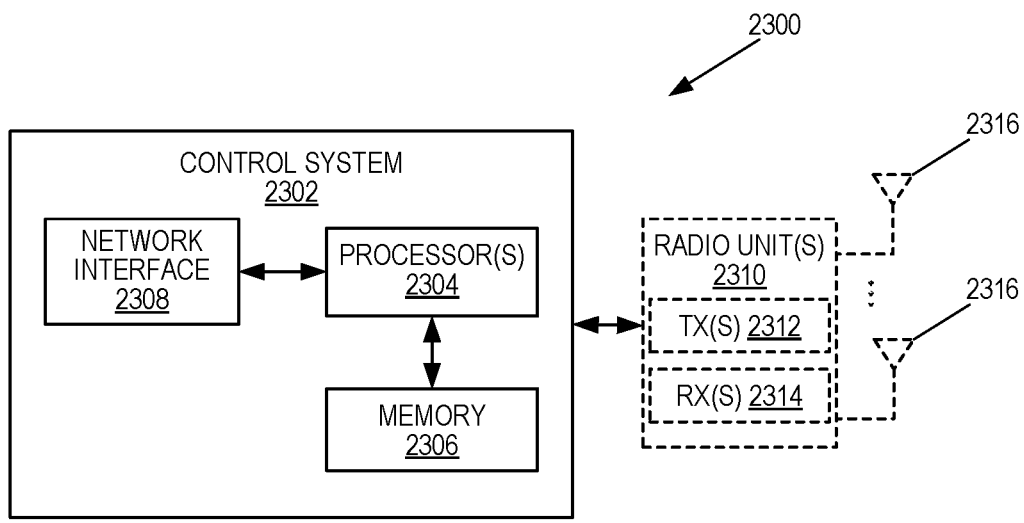

FIG. 23 is a schematic block diagram of a network node 2300 according to some embodiments of the present disclosure. The network node 2300 may be, for example, a base station 302 or 306 (e.g., a gNB) or a network node that implements a core network entity such as, e.g., a UPF, a UPF-side TT that is separate from the UPF, a TSN AF, an SMF, a PCF, or some other core network entity. As illustrated, the network node 2300 includes a control system 2302 that includes one or more processors 2304 (e.g., Central Processing Units (CPUs), Application Specific Integrated Circuits (ASICs), Field Programmable Gate Arrays (FPGAs), and/or the like), memory 2306, and a network interface 2308. The one or more processors 2304 are also referred to herein as processing circuitry. In addition, if the network node 2300 is a radio access node, the network node 2300 includes one or more radio units 2310 that each includes one or more transmitters 2312 and one or more receivers 2314 coupled to one or more antennas 2316. The radio units 2310 may be referred to or be part of radio interface circuitry. In some embodiments, the radio unit(s) 2310 is external to the control system 2302 and connected to the control system 2302 via, e.g., a wired connection (e.g., an optical cable). However, in some other embodiments, the radio unit(s) 2310 and potentially the antenna(s) 2316 are integrated together with the control system 2302.

The one or more processors 2304 operate to provide one or more functions of the network node 2300 as described herein (e.g., one or more functions of a gNB, UPF, UPF-side TT, TSN AF, AMF, SMF, PCF, NEF, or the like, as described herein). In some embodiments, the function(s) are implemented in software that is stored, e.g., in the memory 2306 and executed by the one or more processors 2304.

FIG. 24 is a schematic block diagram that illustrates a virtualized embodiment of the network node 2300 according to some embodiments of the present disclosure. As used herein, a "virtualized" network node is an implementation of the network node 2300 in which at least a portion of the functionality of the network node 2300 is implemented as a virtual component(s) (e.g., via a virtual machine(s) executing on a physical processing node(s) in a network(s)). As illustrated, in this example, the network node 2300 includes one or more processing nodes 2400 coupled to or included as part of a network(s) 2402 via the network interface 2308.

Each processing node 2400 includes one or more processors 2404 (e.g., CPUs, ASICs, FPGAs, and/or the like), memory 2406, and a network interface 2408. If the network node 2300 is a radio access node, the network node 2302 also includes the radio unit(s) 2310 and, optionally, the control system 2302 and/or the one or more radio units 2310. Note that if the radio access node includes the radio unit(s) 2310 but not the control system 2302, then the radio unit(s) 2310 includes a network interface that communicatively couples the radio unit(s) 2310 to the network 2402.

In this example, functions 2410 of the network node 2300 described herein (e.g., one or more functions of a gNB, UPF, UPF-side TT, TSN AF, AMF, SMF, PCF, NEF, or the like, as described herein) are implemented at the one or more processing nodes 2400 or distributed across the control system 2302 and the one or more processing nodes 2400 in any desired manner. In some particular embodiments, some or all of the functions 2410 of the radio access node 2300 described herein (e.g., one or more functions of a gNB, UPF, UPF-side TT, TSN AF, AMF, SMF, PCF, NEF, or the like, as described herein) are implemented as virtual components executed by one or more virtual machines implemented in a virtual environment(s) hosted by the processing node(s) 2400.

In some embodiments, a computer program including instructions which, when executed by at least one processor, causes the at least one processor to carry out the functionality of the network node 2300 or a node (e.g., a processing node 2400) implementing one or more of the functions 2410 of the network node 2300 in a virtual environment according to any of the embodiments described herein is provided. In some embodiments, a carrier comprising the aforementioned computer program product is provided. The carrier is one of an electronic signal, an optical signal, a radio signal, or a computer readable storage medium (e.g., a non-transitory computer readable medium such as memory).

Figure 25:
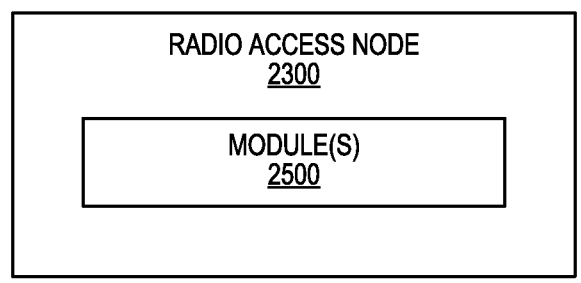

FIG. 25 is a schematic block diagram of the network node 2300 according to some other embodiments of the present disclosure. The network node 2300 includes one or more modules 2500, each of which is implemented in software. The module(s) 2500 provide the functionality of the network node 2300 described herein. This discussion is equally applicable to the processing node 2400 of FIG. 24 where the modules 2500 may be implemented at one of the processing nodes 2400 or distributed across multiple processing nodes 2400 and/or distributed across the processing node(s) 2400 and the control system 2302.

Figure 26:
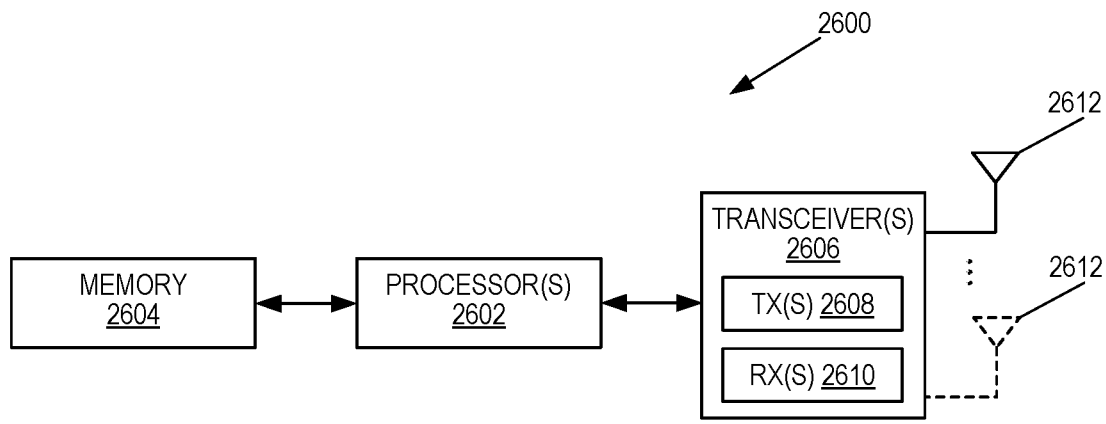
FIGS. 26 and 27 are schematic block diagrams of example embodiments of a User Equipment (UE)

FIG. 26 is a schematic block diagram of a UE 2600 according to some embodiments of the present disclosure. As illustrated, the UE 2600 includes one or more processors 2602 (e.g., CPUs, ASICs, FPGAs, and/or the like), memory 2604, and one or more transceivers 2606 each including one or more transmitters 2608 and one or more receivers 2610 coupled to one or more antennas 2612. The transceiver(s) 2606 includes radio-front end circuitry connected to the antenna(s) 2612 that is configured to condition signals communicated between the antenna(s) 2612 and the processor(s) 2602, as will be appreciated by on of ordinary skill in the art. The processors 2602 are also referred to herein as processing circuitry. The transceivers 2606 are also referred to herein as radio circuitry. In some embodiments, the functionality of the UE 2600 (and/or the UE-side TT) described above may be fully or partially implemented in software that is, e.g., stored in the memory 2604 and executed by the processor(s) 2602. Note that the UE 2600 may include additional components not illustrated in FIG. 26 such as, e.g., one or more user interface components (e.g., an input/output interface including a display, buttons, a touch screen, a microphone, a speaker(s), and/or the like and/or any other components for allowing input of information into the UE 2600 and/or allowing output of information from the UE 2600), a power supply (e.g., a battery and associated power circuitry), etc.

In some embodiments, a computer program including instructions which, when executed by at least one processor, causes the at least one processor to carry out the functionality of the UE 2600 according to any of the embodiments described herein is provided. In some embodiments, a carrier comprising the aforementioned computer program product is provided. The carrier is one of an electronic signal, an optical signal, a radio signal, or a computer readable storage medium (e.g., a non-transitory computer readable medium such as memory).

Figure 27:
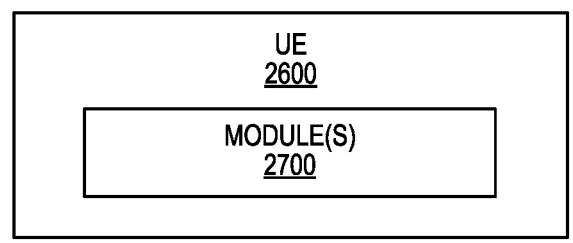
Figure 28:
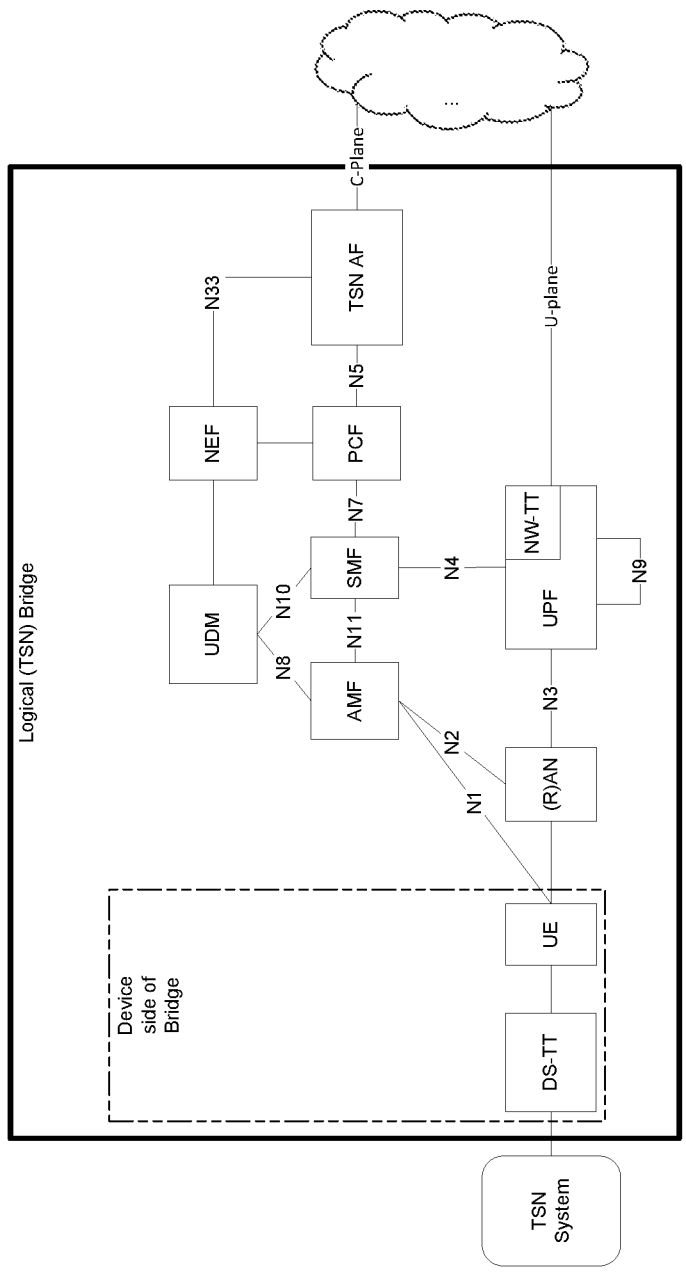
FIG. 28 is a reproduction of FIG. 4.4.8.2-1 of 3GPP TS 23.501 V16.3.0.
Figure 29:
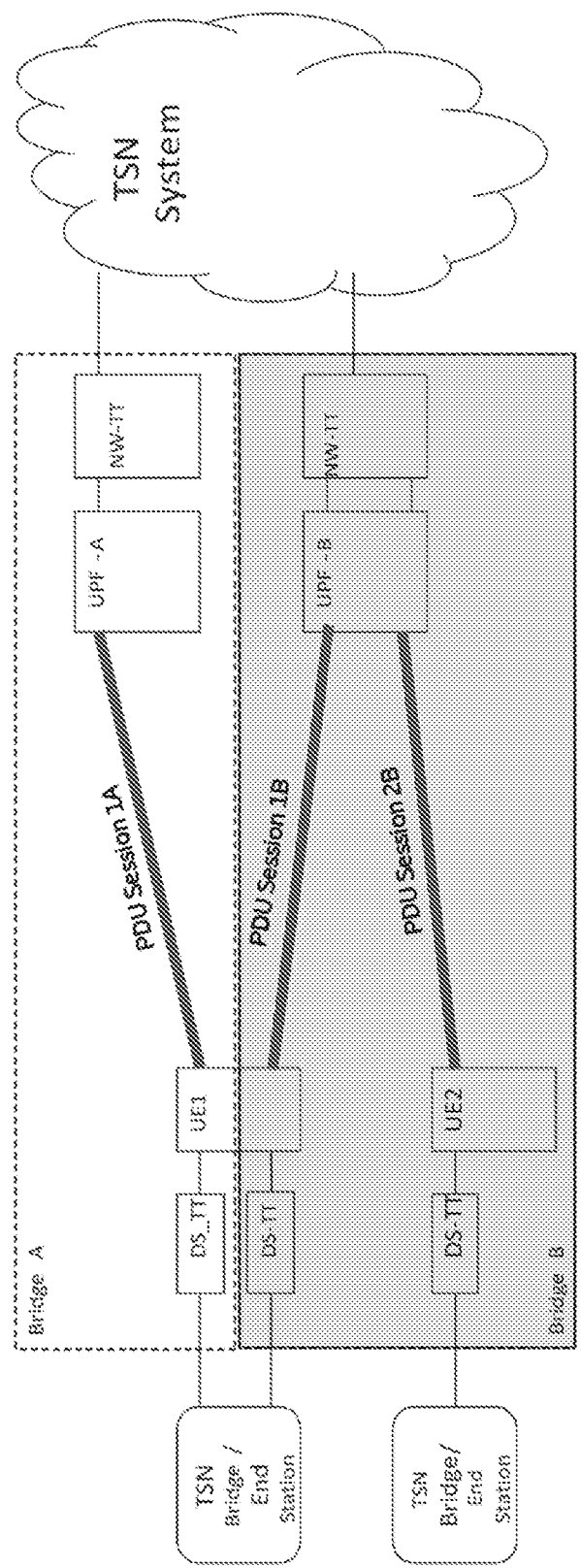
FIG. 29 is a reproduction of FIG. 5.28.1-1 of 3GPP TS 23.501 V16.3.0.

FIG. 27 is a schematic block diagram of the UE 2600 according to some other embodiments of the present disclosure. The UE 2600 includes one or more modules 2700, each of which is implemented in software. The module(s) 2700 provide the functionality of the UE 2600 described herein.

Any appropriate steps, methods, features, functions, or benefits disclosed herein may be performed through one or more functional units or modules of one or more virtual apparatuses. Each virtual apparatus may comprise a number of these functional units. These functional units may be implemented via processing circuitry, which may include one or more microprocessor or microcontrollers, as well as other digital hardware, which may include Digital Signal Processors (DSPs), special-purpose digital logic, and the like. The processing circuitry may be configured to execute program code stored in memory, which may include one or several types of memory such as Read Only Memory (ROM), Random Access Memory (RAM), cache memory, flash memory devices, optical storage devices, etc. Program code stored in memory includes program instructions for executing one or more telecommunications and/or data communications protocols as well as instructions for carrying out one or more of the techniques described herein. In some implementations, the processing circuitry may be used to cause the respective functional unit to perform corresponding functions according one or more embodiments of the present disclosure.

While processes in the figures may show a particular order of operations performed by certain embodiments of the present disclosure, it should be understood that such order is exemplary (e.g., alternative embodiments may perform the operations in a different order, combine certain operations, overlap certain operations, etc.).

Some example embodiments of the present disclosure are as follows.

Embodiment 1: A method performed by a first network function (e.g., PCF) for QoS mapping for TSN-5G integration, the method comprising:
  obtaining (1200; 2200), from a TSN AF, information comprising:
    baseline TSC QoS parameters (e.g., priority and/or delay); and
    one or more additional parameters comprising either or both of: (a) one or more additional TSC QoS attributes (e.g., reliability and/or maximum TSC burst size) and (b) one or more additional TSC traffic attributes (e.g., periodicity).
  generating (1202; 2202) one or more PCC rules based on the obtained information; and
  providing (1204; 2204) the one or more PCC rules to a second network function (e.g., SMF).

Embodiment 2: The method of embodiment 1 wherein generating (1202) the one or more PCC rules based on the information comprises performing (800-804; FIG. 11) QoS mapping based on the obtained information.

Embodiment 3: The method of embodiment 1 or 2 wherein TSN traffic classes are broken down such that one TSN traffic class is mapped to N QoS flows in the 5G system.

Embodiment 4: The method of any of embodiments 1 to 3 wherein TSC streams are aggregated.

Embodiment 5: The method of embodiment 4 wherein TSC stream IDs are included in the one or more PCC rules.

Embodiment 6: The method of any of embodiments 1 to 5 wherein the obtained information comprises reliability information, and the one or more PCC rules comprise the obtained reliability information.

Embodiment 7: The method of embodiment 6 wherein the one or more PCC rules comprise the obtained reliability information such that the reliability information is used by the second network function for QoS flow binding.

Embodiment 8: The method of any of embodiments 1 to 7 wherein the one or more PCC rules comprise at least one of the one or more additional parameters.

Embodiment 9: The method of embodiment 8 wherein the at least one of the one or more additional parameters comprises periodicity.

Embodiment 10: The method of any of embodiments 1 to 9 wherein TSC streams within a TSN traffic class are aggregated are to be aggregated into a QoS flow in the 5G system based on at least one of the one or more additional parameters, and the one or more PCC rules comprise TSC stream IDs.

Embodiment 11: The method of any of embodiments 1 to 10 wherein one or more traffic tables are included in the one or more PCC rules.

Embodiment 12: The method of any of embodiments 1 to 11 wherein the one or more PCC rules comprise additional TSC parameters, subject to operator configuration.

Embodiment 13: The method of any of embodiments 1 to 12 wherein port related information is reported to multiple TSN AFs.

Embodiment 14: A first network function (e.g., PCF) for QoS mapping for TSN-5G integration, the first network function adapted to perform the method of any of embodiments 1 to 13.

At least some of the following abbreviations may be used in this disclosure. If there is an inconsistency between abbreviations, preference should be given to how it is used above. If listed multiple times below, the first listing should be preferred over any subsequent listing(s).

3GPP Third Generation Partnership Project
5G Fifth Generation
5GC Fifth Generation Core
5GS Fifth Generation System
5QI Fifth Generation Quality of Service Identifier
AF Application Function
AG Aggregation Group
AMF Access and Mobility Management Function
AN Access Network
ARP Allocation and Retention Priority
ASIC Application Specific Integrated Circuit
AUSF Authentication Server Function
CP Control Plane
CPU Central Processing Unit
CR Change Request
DN Data Network
DRB Data Radio Bearer
DSP Digital Signal Processor
eNB Enhanced or Evolved Node B
FPGA Field Programmable Gate Array
GF Group Flag
gNB New Radio Base Station
GPRS General Packet Radio System
GRE Generic Routing Encapsulation
GTP-U General Packet Radio System Tunneling Protocol User Plane
HSS Home Subscriber Server
ID Identifier
IP Internet Protocol
LTE Long Term Evolution
MAC Medium Access Control
MDBV Maximum Data Burst Volume
MME Mobility Management Entity
MTC Machine Type Communication
NEF Network Exposure Function
NF Network Function
NG Next Generation
NR New Radio
NRF Network Function Repository Function
NSSF Network Slice Selection Function
PCC Policy and Charging Control
PCF Policy Control Function
PCP Priority Code Point
PDR Packet Detection Rule
PDU Protocol Data Unit
PER Packet Error Rate
P-GW Packet Data Network Gateway
QoS Quality of Service
RAM Random Access Memory
RAN Radio Access Network
ROM Read Only Memory
RRH Remote Radio Head
RTT Round Trip Time
SCEF Service Capability Exposure Function
SDF Service Data Flow
SM Session Management
SMF Session Management Function
TC Traffic Class
TR Technical Report
TS Technical Specification
TSC Time Sensitive Communication
TSN Time Sensitive Networking
TT Time Sensitive Networking Translator
UDM Unified Data Management
UE User Equipment
UP User Plane
UPF User Plane Function
VLAN Virtual Local Area Network Those skilled in the art will recognize improvements and modifications to the embodiments of the present disclosure. All such improvements and modifications are considered within the scope of the concepts disclosed herein.

The invention claimed is:

1. A method for Quality of Service (QOS) mapping in a Fifth Generation System (5GS) for a virtual Time Sensitive Networking (TSN) bridge, the method comprising:
at a first network function:
obtaining information from a TSN Application Function (AF), the information comprising:
baseline Time Sensitive Communication (TSC) QoS parameters; and
one or more additional parameters comprising either or both of:
one or more additional TSC QoS attributes and one or more additional traffic attributes;
generating one or more Policy and Charging Control (PCC) rules based on the obtained information; and
providing the one or more PCC rules to a second network function; and
at the second network function:
receiving the one or more PCC rules from the first network function; and
performing QoS binding based on the one or more PCC rules such that each PCC rule of the one or more PCC rules is associated to a respective QoS flow of a respective Protocol Data Unit (PDU) session,
wherein:
the one or more PCC rules provide a QoS mapping for one or more TSC traffic class;
each of the one or more TSC traffic class consists of a plurality of TSC streams; and
the one or more PCC rules are such that the TSC traffic class is mapped to N QoS flows in the 5GS based on at least one of the one or more additional parameters,
wherein N is an integer number greater than 1.

2. A method performed by a first network function for Quality of Service (QOS) mapping in a Fifth Generation System (5GS) for a virtual Time Sensitive Networking (TSN) bridge, the method comprising:
obtaining information from a TSN Application Function (AF), the information comprising:
baseline Time Sensitive Communication (TSC) QOS parameters; and
one or more additional parameters comprising either or both of: one or more additional TSC QoS attributes and one or more additional traffic attributes;
generating one or more Policy and Charging Control (PCC) rules based on the obtained information; and
providing the one or more PCC rules to a second network function,
wherein:
the one or more PCC rules provide a QoS mapping for one or more TSC traffic class;
each of the one or more TSC traffic class consists of a plurality of TSC streams; and the one or more PCC rules are such that the TSC traffic class is mapped to N QoS flows in the 5GS based on at least one of the one or more additional parameters, wherein N is an integer number greater than 1.

3. The method of claim 2 wherein:
the one or more PCC rules provide a QoS mapping for one or more TSC traffic class;
each of the one or more TSC traffic class consists of a plurality of TSC streams; and
the one or more PCC rules are such that different groups of the plurality of TSC streams are mapped to different QoS flows in the 5GS, the different groups of the plurality of streams being defined based on at least one of the one or more additional parameters.

4. The method of claim 2 wherein:
the one or more PCC rules provide a QoS mapping for one or more TSC traffic class;
each of the one or more TSC traffic class consists of a plurality of TSC streams;
the one or more PCC rules associate a first group of TSC streams from the plurality of TSC streams in the TSC traffic class to a first Fifth Generation (5G) QOS Identifier (5QI) and associate a second group of TSC streams from the plurality of TSC streams in the TSC traffic class to a second 5QI; and
at least one first parameter from the one or more additional parameters is comprised in QoS profiles indicated by the first and second 5QIs.

5. The method of claim 4 wherein the at least one first parameter comprises a reliability parameter.

6. The method of claim 4 wherein the at least one first parameter comprises a maximum burst size parameter.

7. The method of claim 2 wherein the one or more PCC rules provide a QoS mapping for a TSC traffic class and comprise at least one parameter from the one or more additional parameters.

8. The method of claim 7 wherein the at least one parameter comprises reliability, maximum burst size, periodicity parameter, or any combination of one or more thereof.

9. The method of claim 2 wherein the baseline TSC QoS parameters consist of priority and delay related parameters or a TSC traffic class number.

10. The method of claim 2 wherein the one or more additional TSC QoS attributes comprise one or more of a reliability parameter, a maximum burst size parameter, and periodicity.

11. The method of claim 2 wherein TSC stream Identifiers (IDs) are included in the one or more PCC rules.

12. The method of claim 2 wherein the first network function is a Policy Control Function (PCF) and the second network function is a Session Management Function (SMF).

13. A method performed by a second network function for Quality of Service (QOS) binding in a Fifth Generation System (5GS) for a virtual Time Sensitive Networking (TSN) bridge, the method comprising:
receiving one or more Policy and Control (PCC) rules from a first network function, the one or more PCC rules comprising information that enables QoS mapping from a Time Sensitive Communication (TSC) traffic class to N QoS flows in the 5GS based on a plurality of parameters, wherein N is an integer number greater than 1 and the plurality of parameters comprise: baseline QoS parameters; and
one or more additional parameters comprising either or both of: one or more additional TSC QoS attributes and one or more additional traffic attributes; and
performing QoS binding based on the one or more PCC rules such that each PCC rule of the one or more PCC rules is associated to a respective QoS flow of a respective Protocol Data Unit (PDU) session,
wherein:
the one or more PCC rules provide a QoS mapping for one or more TSC traffic class;
each of the one or more TSC traffic class consists of a plurality of TSC streams; and
the one or more PCC rules are such that the TSC traffic class is mapped to N QoS flows in the PDU session based on at least one of the one or more additional parameters,
wherein N is an integer number greater than 1.

14. The method of claim 13 wherein:
the one or more PCC rules provide a QoS mapping for one or more TSC traffic class;
each of the one or more TSC traffic class consists of a plurality of TSC streams; and
the one or more PCC rules are such that different groups of the plurality of TSC streams are mapped to different QoS flows in the PDU session, the different groups of the plurality of streams being defined based on at least one of the one or more additional parameters.

15. The method of claim 13 wherein:
the one or more PCC rules provide a QoS mapping for one or more TSC traffic class;
each of the one or more TSC traffic class consists of a plurality of TSC streams;
the one or more PCC rules associate a first group of TSC streams from the plurality of TSC streams in the TSC traffic class to a first Fifth Generation (5G) QOS Identifier (5QI) and associate a second group of TSC streams from the plurality of TSC streams in the TSC traffic class to a second 5QI; and
at least one first parameter from the one or more additional parameters is comprised in QOS profiles indicated by the first and second 5QIs.

16. The method of claim 13 wherein:
the one or more PCC rules provide a QoS mapping for one or more TSC traffic class;
each of the one or more TSC traffic class consists of a plurality of TSC streams;
the plurality of TSC streams are divided into two or more groups of TSC streams based on at least one first parameter from the one or more additional parameters; and
the one or more PCC rules associate at least two of the two or more groups of TSC streams to: a same Fifth Generation (5G) QOS Identifier (5QI) and different values of the at least one first parameter.

17. The method of claim 13 wherein the first network function is a Policy Control Function (PCF).

18. The method of claim 13 wherein the second network function is a Session Management Function (SMF).

* * * * *